United States Patent [19]
Katoh et al.

[11] Patent Number: 5,609,023
[45] Date of Patent: Mar. 11, 1997

[54] FUEL SUPPLY CONTROL SYSTEM FOR INTERNAL COMBUSTION ENGINES

[75] Inventors: Akira Katoh; Hiroshi Kitagawa; Toshiaki Hirota, all of Wako, Japan

[73] Assignee: Honda Giken Kogyo Kabushiki Kaisha, Tokyo, Japan

[21] Appl. No.: 353,201

[22] Filed: Dec. 1, 1994

[30] Foreign Application Priority Data

Dec. 1, 1993 [JP] Japan .................................. 5-329780

[51] Int. Cl.$^6$ .......................................................... F01N 3/28
[52] U.S. Cl. ........................................ 60/276; 60/277; 60/285
[58] Field of Search ........................... 60/274, 276, 277, 60/285

[56] References Cited

U.S. PATENT DOCUMENTS

| | | | |
|---|---|---|---|
| 4,656,829 | 4/1987 | Creps | 60/277 |
| 5,280,707 | 1/1994 | Nakashima | 60/277 |
| 5,325,664 | 7/1994 | Seki . | |

FOREIGN PATENT DOCUMENTS

| | | |
|---|---|---|
| 3520226A1 | 3/1986 | Germany . |
| 4024210A1 | 2/1992 | Germany . |
| 4024212A1 | 2/1992 | Germany . |
| 4128718A1 | 3/1993 | Germany . |
| 1-305142 | 12/1989 | Japan . |
| 2-11841 | 1/1990 | Japan . |
| 4-131762 | 5/1992 | Japan . |

*Primary Examiner*—Douglas Hart
*Attorney, Agent, or Firm*—Nikaido, Marmelstein, Murray & Oram LLP

[57] ABSTRACT

A fuel supply control system for an internal combustion engine having a catalytic converter arranged in the exhaust system, includes an ECU which estimates a storage amount of oxygen stored in the catalytic converter, calculates a physical amount having correlation with a purification rate of the catalytic converter, based on the estimated storage amount of oxygen, and controls the air-fuel ratio of an air-fuel mixture to be supplied to the engine, based on the calculated physical amount.

13 Claims, 37 Drawing Sheets

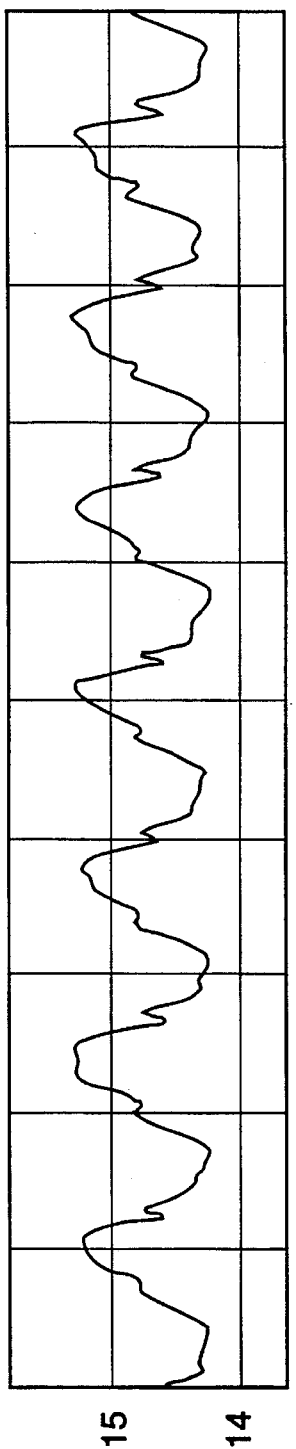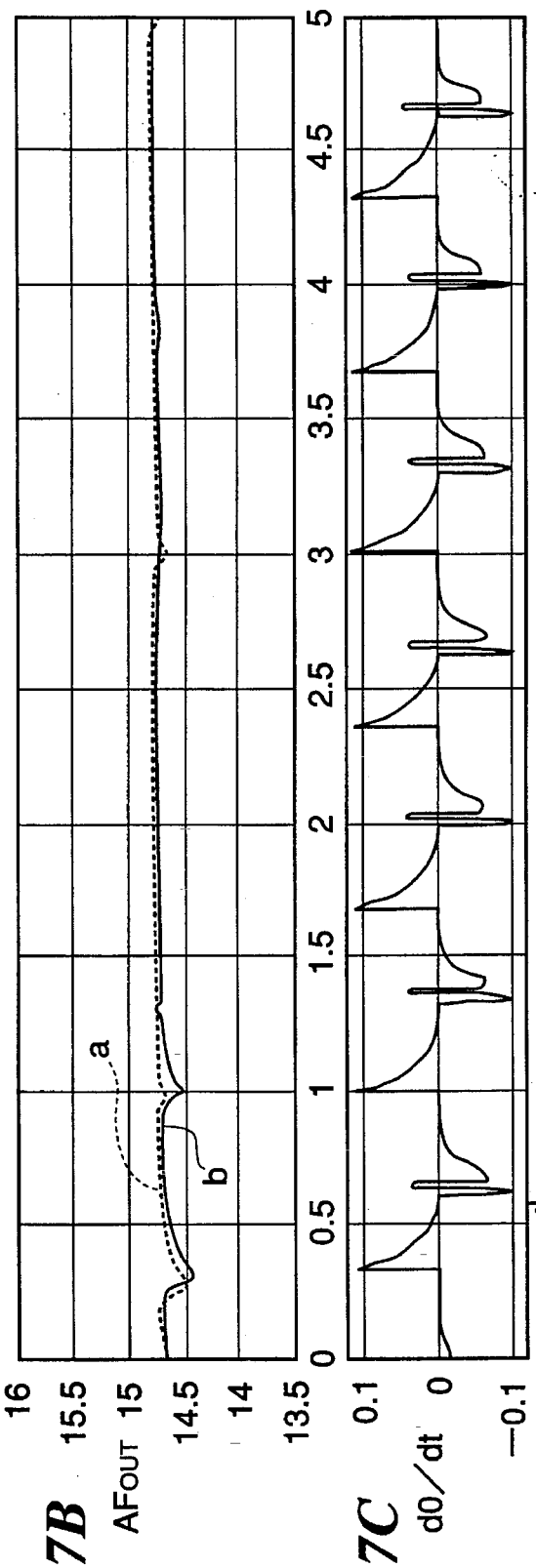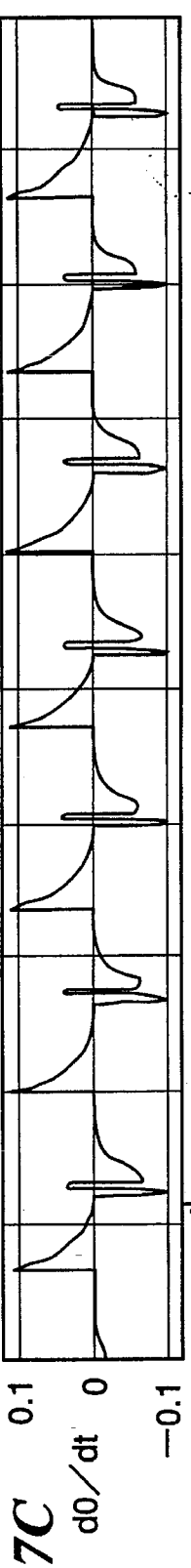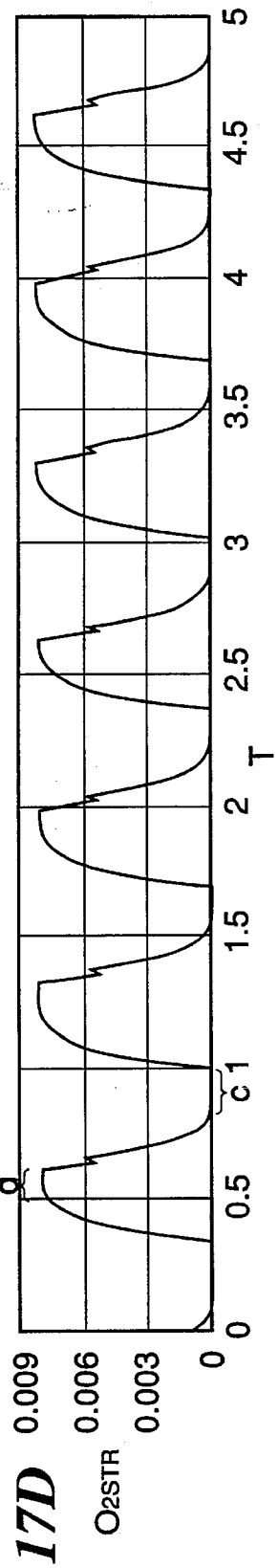
FIG.17A $AF_{IN}$
FIG.17B $AF_{OUT}$
FIG.17C $dO/dt$
FIG.17D $O_{2STR}$

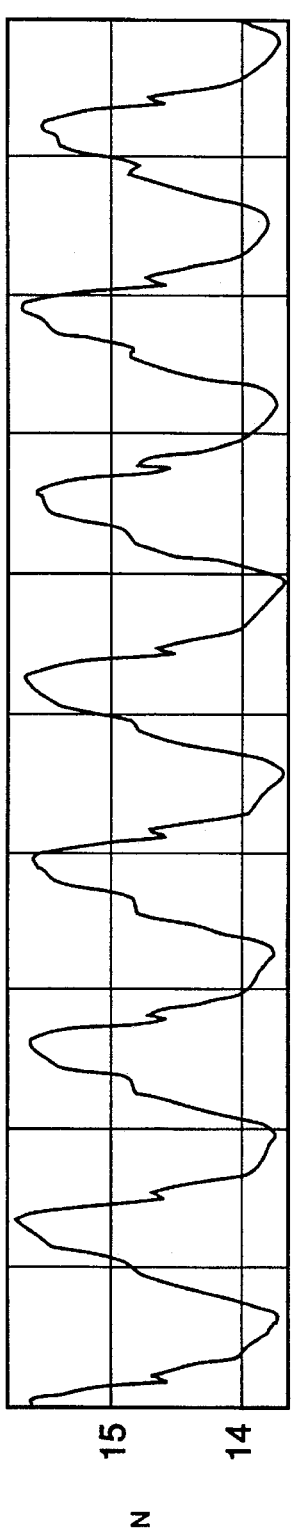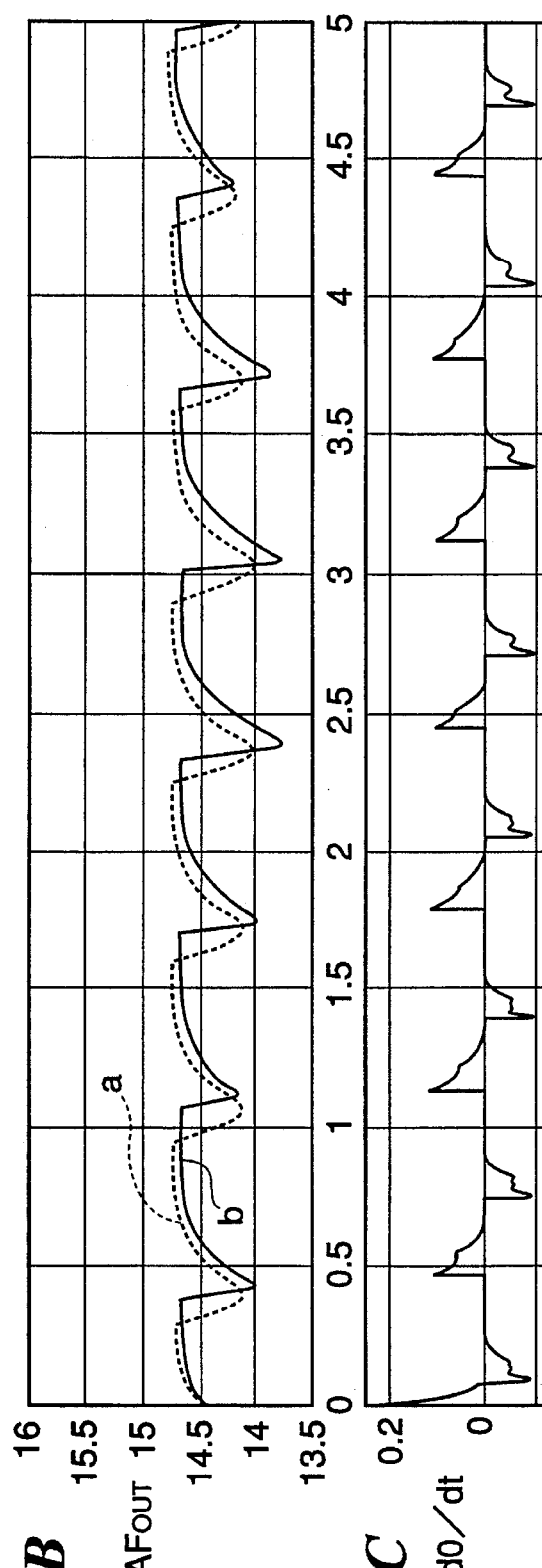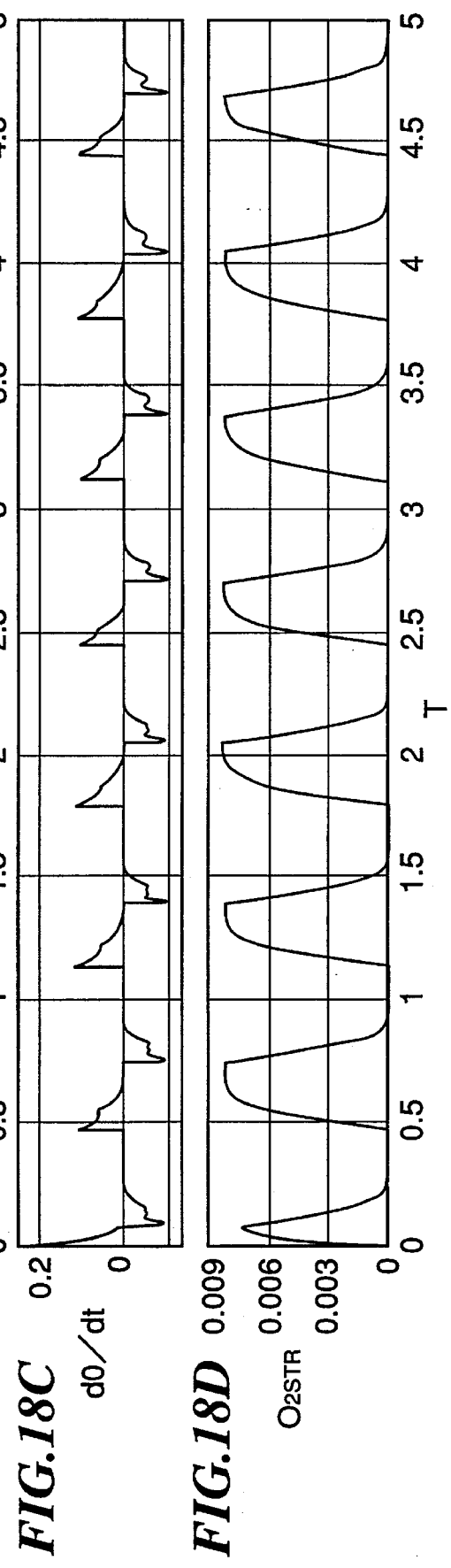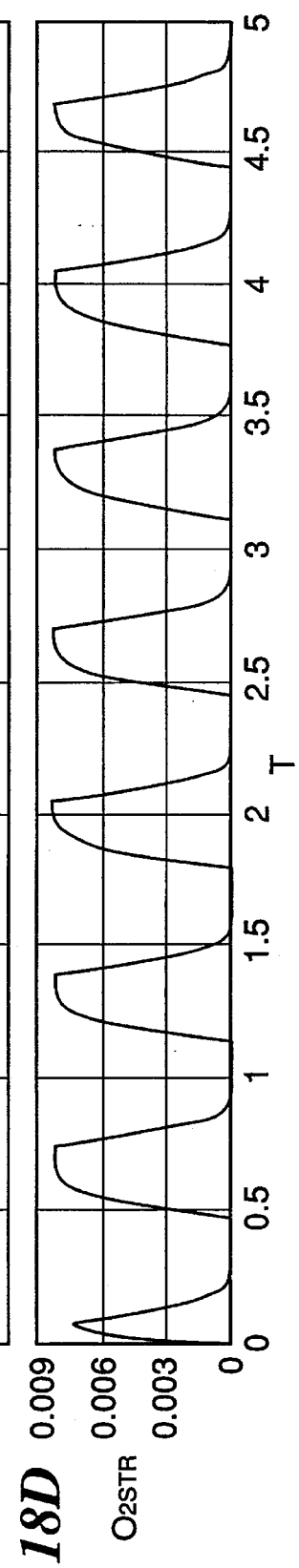

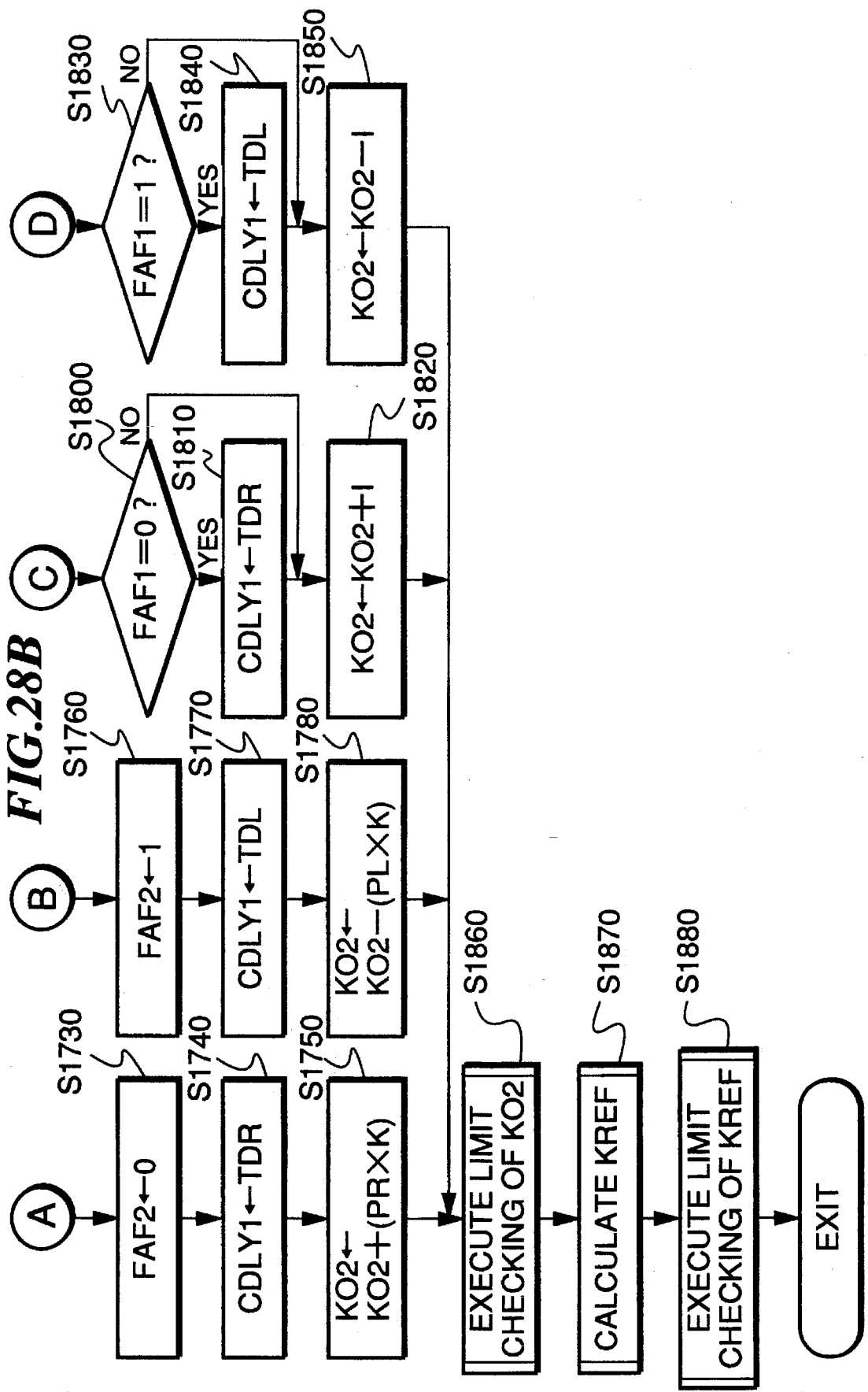

FUEL SUPPLY CONTROL SYSTEM FOR INTERNAL COMBUSTION ENGINES

BACKGROUND OF THE INVENTION

1. Field of the Invention

This invention relates to a fuel supply control system for internal combustion engines, and more particularly to a fuel supply control system for internal combustion engines, which controls the air-fuel ratio of an air-fuel mixture to be supplied to the engine so as to improve the purification rate of a catalytic converter arranged in the exhaust system of the engine.

2. Prior Art

Conventionally, there is widely employed an air-fuel ratio control method for internal combustion engines, which detects the concentration of oxygen present in exhaust gases from the engine by an oxygen concentration sensor (hereinafter referred to as "the O2 sensor") or a linear output air-fuel ratio sensor (hereinafter referred to as "the LAF sensor") arranged in the exhaust system of the engine, and feedback-controls the air-fuel ratio of an air-fuel mixture to be supplied to the engine to a desired value in response to the detected oxygen concentration.

In recent years, an air-fuel ratio control system has been used, which adjusts a desired air-fuel ratio of a mixture to be supplied to the engine, an inversion delay time of an O2 sensor arranged in the exhaust system at a location downstream of a catalytic converter, etc. based on an output from the O2 sensor, to thereby finely adjust a control amount for the fuel supply amount, determined in response to an output from an O2 sensor arranged upstream of the catalytic converter, whereby the air-fuel ratio of the mixture can be stably controlled and also exhaust emission characteristics of the engine can be improved.

On the other hand, a method has been proposed, for example, by Japanese Provisional Patent Publication (Kokai) No. 2-11841, which forcibly oscillates the air-fuel ratio of a mixture to be supplied to the engine in order to enhance the purification rate of a catalytic converter arranged in the exhaust system. Further, a method has been proposed, for example, by Japanese Provisional Patent Publication (Kokai) No. 4-131762, which compares an actual air-fuel ratio detected by an O2 sensor arranged downstream of a catalytic converter in the exhaust system with an air-fuel ratio value calculated from an O2 storage amount obtained from a simulation modeled on the catalytic converter, and judges that the catalytic converter is deteriorated when the two air-fuel ratio values are largely different from each other.

However, the above proposed methods still require further improvements for the following reasons: That is, the proposed air-fuel ratio control methods merely control the air-fuel ratio to a predetermined desired value, but do not contemplate positively enhancing the purification rate of the catalytic converter to the maximum by controlling the air-fuel ratio. In addition, the purification rate of the catalytic converter largely depends on parameters representative of the temperature and deterioration degree of the catalytic converter. However, the proposed methods do not detect or estimate these parameters to use them for controlling the air-fuel ratio. As a result, the purification rate of the catalytic converter cannot be maximized in various operating conditions of the engine. Besides, recent studies have disclosed that the purification rate of the catalytic converter varies depending on the amplitude and repetition period of the air-fuel ratio of exhaust gases even if the air-fuel ratio assumes the same average value. This is because it is considered that the purification rate of the catalytic converter largely depends on an O2 storage amount therein. However, no method has been proposed, which controls the air-fuel ratio of the mixture by detecting or estimating of the O2 storage amount of the catalytic converter and reflecting the detected or estimated O2 storage amount upon the manner of air-fuel ratio control.

SUMMARY OF THE INVENTION

It is the object of the invention to provide a fuel supply control system for internal combustion engines, which is capable of controlling the air-fuel ratio of a mixture to be supplied to the engine such that the purification rate of a catalytic converter in the exhaust system is maximized, to thereby improve exhaust emission characteristics of the engine under all operating conditions of the engine.

To attain the above object, the present invention provides a fuel supply control system for an internal combustion engine having an exhaust system, and a catalytic converter arranged in the exhaust system, comprising:

oxygen storage amount-estimating means for estimating a storage amount of oxygen stored in the catalytic converter;

physical amount-calculating means for calculating a physical amount having correlation with a purification rate of the catalytic converter, based on the storage amount of oxygen estimated by the oxygen storage amount-estimating means; and air-fuel ratio control means for controlling an air-fuel ratio of an air-fuel mixture to be supplied to the engine, based on the physical amount calculated by the physical amount-calculating means.

Preferably, the physical amount having correlation with the purification rate of the catalytic converter is a variation amount in the storage amount of oxygen stored in the catalytic converter per a predetermined unit time period.

More preferably, the fuel supply control system includes maximum oxygen storage amount-calculating means for calculating a maximum oxygen storage amount which can be stored in the catalytic converter, and wherein the physical amount-calculating means corrects the physical amount so as to decrease the purification rate of the catalytic converter when at least one of conditions is satisfied that the storage amount of oxygen stored in the catalytic converter exceeds a first predetermined amount which is close to the maximum oxygen storage amount of the catalytic converter, and that the storage amount of oxygen is below a second predetermined amount which is close to zero.

Also preferably, the maximum oxygen storage amount-calculating means calculates the maximum oxygen storage amount, based on a volumetric size, a temperature, and a deterioration degree of the catalytic converter.

Preferably, the oxygen storage amount-estimating means estimates a present value of the storage amount of oxygen according to a physical model based on an air-fuel ratio of exhaust gases emitted from the engine and a last value of the storage amount of oxygen estimated.

Specifically, the oxygen storage amount-estimating means estimates the present value of the storage amount of oxygen by determining the variation amount in the storage amount of oxygen, based on the air-fuel ratio of exhaust gases emitted from the engine at an entrance of the catalytic converter, and adding the determined variation amount to the last value of the storage amount of oxygen estimated.

Advantageously, the fuel supply control system includes downstream air-fuel ratio-detecting means arranged in the exhaust system of the engine at a location downstream of the catalytic converter, air-fuel ratio feedback control amount-calculating means for calculating an air-fuel ratio feedback control amount for controlling the air-fuel ratio of the mixture in response to an output from the downstream air-fuel ratio-detecting means, and air-fuel ratio-calculating means for calculating the air-fuel ratio of the exhaust gases, based on a deviation amount of the calculated air-fuel ratio feedback control amount from a central value thereof.

In a preferred embodiment of the invention, the fuel supply control system includes upstream air-fuel ratio-detecting means arranged in the exhaust system of the engine at a location upstream of the catalytic converter, and air-fuel ratio feedback control amount-calculating means for calculating an air-fuel ratio feedback control amount for controlling the air-fuel ratio of the mixture in response to an output from the upstream air-fuel ratio-detecting means, and wherein the air-fuel ratio control means carries out proportional control by using the calculated air-fuel ratio feedback control amount when a predetermined delay time period has elapsed from the time the output from the upstream air-fuel ratio-detecting means was inverted, the air-fuel ratio control means setting the predetermined delay time period, based on the physical amount calculated by the physical amount-calculating means.

Specifically, the air-fuel ratio control means determines a variation amount in the storage amount of oxygen stored in the catalytic converter per a predetermined unit time period as the physical amount having correlation with the purification rate of the catalytic converter, determines an oxygen utilization factor of the catalytic converter, based on the determined variation amount in the storage amount of oxygen, and sets the predetermined delay time period according to the determined variation amount in the oxygen utilization factor.

In the preferred embodiment, preferably, in addition to the predetermined delay time period, the air-fuel ratio control means stepwise changes the air-fuel ratio feedback control amount by a predetermined skip amount when the output from the upstream air-fuel ratio-detecting means has been inverted, the air-fuel ratio control means setting the skip amount, based on the physical amount calculated by the physical amount-calculating means.

Specifically, the air-fuel ratio control means determines the variation amount in the storage amount of oxygen stored in the catalytic converter per the predetermined unit time period as the physical amount having correlation with the purification rate of the catalytic converter, determines an oxygen utilization factor of the catalytic converter, based on the variation amount determined, and set the skip amount according to a variation amount in the oxygen utilization factor determined.

In another embodiment of the invention, the fuel supply control system includes air-fuel ratio forcedly-oscillating means for forcedly oscillating the air-fuel ratio of the mixture with a predetermined repetition period and a predetermined amplitude, and wherein the air-fuel ratio control means sets at least one of the predetermined repetition period and the predetermined amplitude, based on the physical amount calculated by the physical amount-calculating mean.

Specifically, the air-fuel ratio control means determines a variation amount in the storage amount of oxygen stored in the catalytic converter per a predetermined unit time period as the physical amount having correlation with the purification rate of the catalytic converter, determines an oxygen utilization factor of the catalytic converter, based on the determined variation amount in the storage amount of oxygen, and sets at least one of the predetermined repetition period and the predetermined amplitude according to the determined variation amount in the oxygen utilization factor.

Further preferably, the engine includes intake passage having an inner wall surface, and at least one combustion chamber, the fuel supply control system including fuel amount-calculating means for constructing a physical model, based on a first fuel amount which is directly drawn into each of the at least one combustion chamber out of a fuel amount injected into the intake passage, and a second fuel amount which adheres to the inner wall surface of the intake passage and then evaporates to be drawn into the each of the at least one combustion chamber, and for determining a fuel amount to be injected into the intake passage, based on parameters representative of fuel adherence characteristics of fuel according to the physical model constructed.

The above and other objects, features, and advantages of the invention will be more apparent from the following detailed description taken in conjunction with the accompanying drawings.

BRIEF DESCRIPTION OF THE DRAWINGS

FIG. 17 is a timing chart showing the relationship in timing between an air-fuel ratio A/Fin upstream of the catalytic converter, an air-fuel ratio A/Fout downstream of same, moving speed of oxygen molecules dO/dt, and the O2 storage amount O2STR;

FIG. 18 is a timing chart showing the relationship in timing between the air-fuel ratio A/Fin, the air-fuel ratio A/Fout, the dO/dt value, and the O2 storage amount O2STR;

FIG. 28B is a continued part of the flowchart of FIG. 28A;

DETAILED DESCRIPTION

The invention will now be described in detail with reference to the drawings showing an embodiment thereof.

Figure 1:
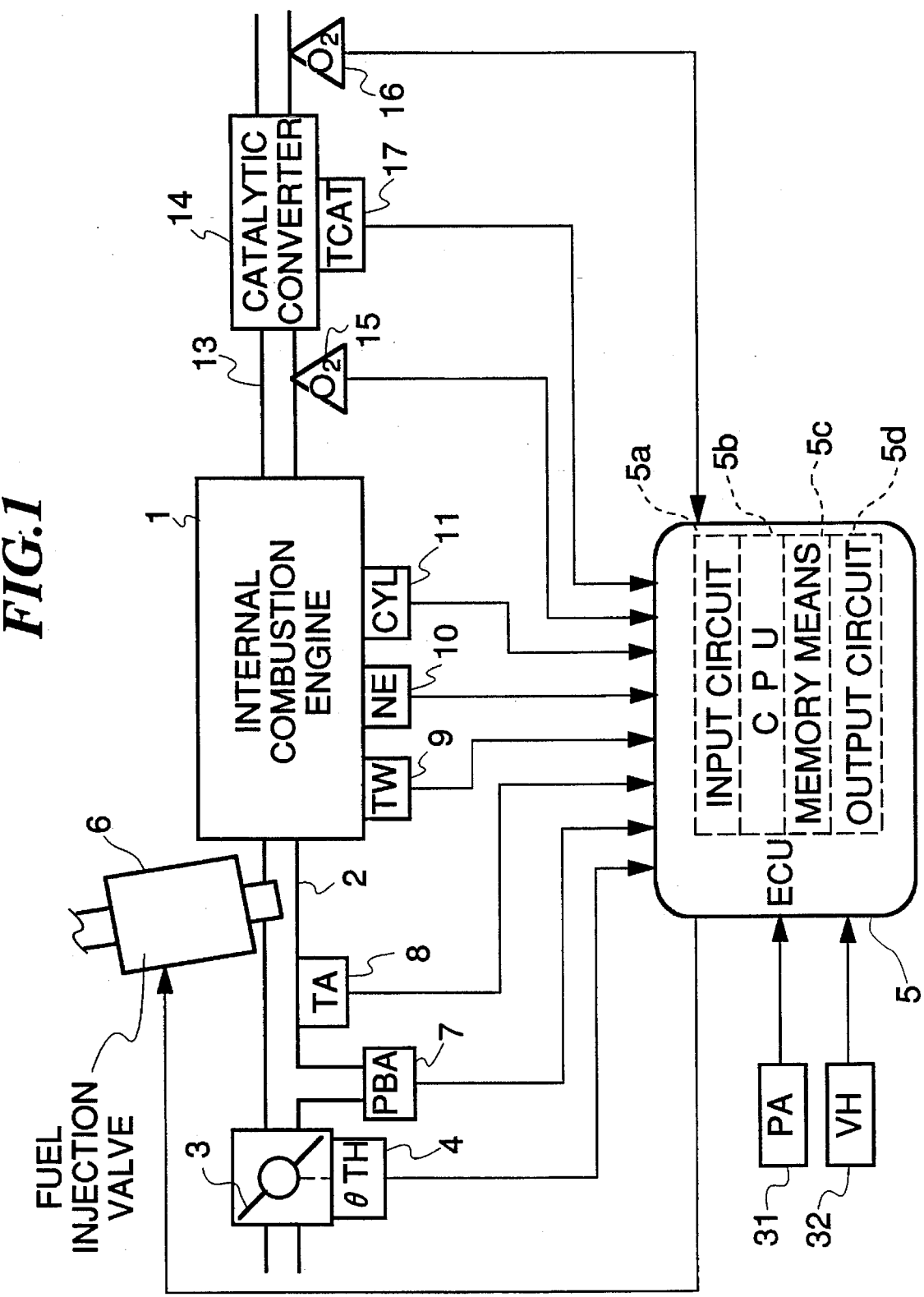
FIG. 1 is a schematic diagram showing the whole arrangement of an internal combustion engine and a fuel supply control system therefor, according to the invention.

Referring first to FIG. 1, there is illustrated the whole arrangement of an internal combustion engine and a fuel supply control system therefor, according to an embodiment of the invention.

In the figure, reference .numeral 1 designates an internal combustion engine (hereinafter referred to as "the engine") having four cylinders. In an intake pipe 2 of the engine 1, there is arranged a throttle valve 3, to which is connected a throttle valve opening (θTH) sensor 4 for generating an electric signal indicative of the sensed throttle valve opening and supplying the same to an electronic control unit (hereinafter referred to as "the ECU") 5.

Fuel injection valves 6 are provided, respectively, for cylinders of the engine and each arranged in the intake pipe 2 at a location between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 7 is provided at a location immediately downstream of the throttle valve 3 for supplying an electric signal indicative of the sensed intake pipe absolute pressure to the ECU 5. An intake air temperature (TA) sensor 8 is inserted into the intake pipe 2 at a location downstream of the PBA sensor 8 for supplying an electric signal indicative of the sensed intake air temperature TA to the ECU 5.

An engine coolant temperature (TW) sensor 9, which may be formed of a thermistor or the like, is mounted in the cylinder block of the engine 1 for supplying an electric signal indicative of the sensed engine coolant temperature TW to the ECU 5. An engine rotational speed (NE) sensor 10 and a cylinder-discriminating (CYL) sensor 11 are arranged in facing relation to a camshaft or a crankshaft of the engine 1, neither of which is shown. The NE sensor 10 generates signal pulses (hereinafter referred to as "TDC signal pulses") at predetermined crank angles whenever the crankshaft rotates through 180 degrees, and the CYL sensor 11 generates a signal pulse (hereinafter referred to as "CYL signal pulses") at a predetermined crank angle of a particular cylinder of the engine 1. These signal pulses are supplied to the ECU 5.

A three-way catalyst (catalytic converter) 14 is arranged in an exhaust pipe 13 of the engine 1 for purifying components of HC, CO, NOx, etc. present in the exhaust gases. Arranged in the exhaust pipe 13 at respective locations upstream and downstream of the three-way catalyst 14 are oxygen concentration sensors (hereinafter referred to as "the upstream O2 sensor" and "the downstream O2 sensor", respectively) 15 and 16 as air-fuel ratio sensors, for detecting the concentration of oxygen present in the exhaust gases at the respective locations, and supplying signals indicative of the sensed oxygen concentration to the ECU 5. Further, a catalyst temperature sensor 17 is mounted in the catalytic converter 14, for detecting temperature TCAT of the catalytic converter 14, and supplying a signal indicative of the sensed temperature to the ECU 5.

Further electrically connected to the ECU 5 are atmospheric pressure sensor 31 for detecting atmospheric pressure PA and a vehicle speed sensor 32 for detecting vehicle speed VH of a vehicle with the engine 1 installed therein, signals therefrom being supplied to the ECU 5.

The ECU 5 is comprised of an input circuit 5a having the function of shaping the waveforms of input signals from various sensors mentioned above, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed by the CPU 5b and for storing results of calculations therefrom, etc., and an output circuit 5d which outputs driving signals to the fuel injection valves 6.

The CPU 5b operates in response to the above-mentioned various engine parameter signals from the various sensors to determine operating conditions in which the engine 1 is operating, such as feedback control regions where the air-fuel ratio is controlled in response to the detected oxygen concentration in the exhaust gases, and open-loop control regions, and calculates, based upon the determined engine operating conditions, a fuel injection period Tout over which the fuel injection valve 6 is to be opened, in synchronism with generation of TDC signal pulses.

The CPU 5b generates signals for driving the fuel injection valves 6 via the output circuit 5d, and determines whether or not the catalytic converter 14 is deteriorated.

[Outline of fuel supply control according to the first embodiment]

Figure 2:
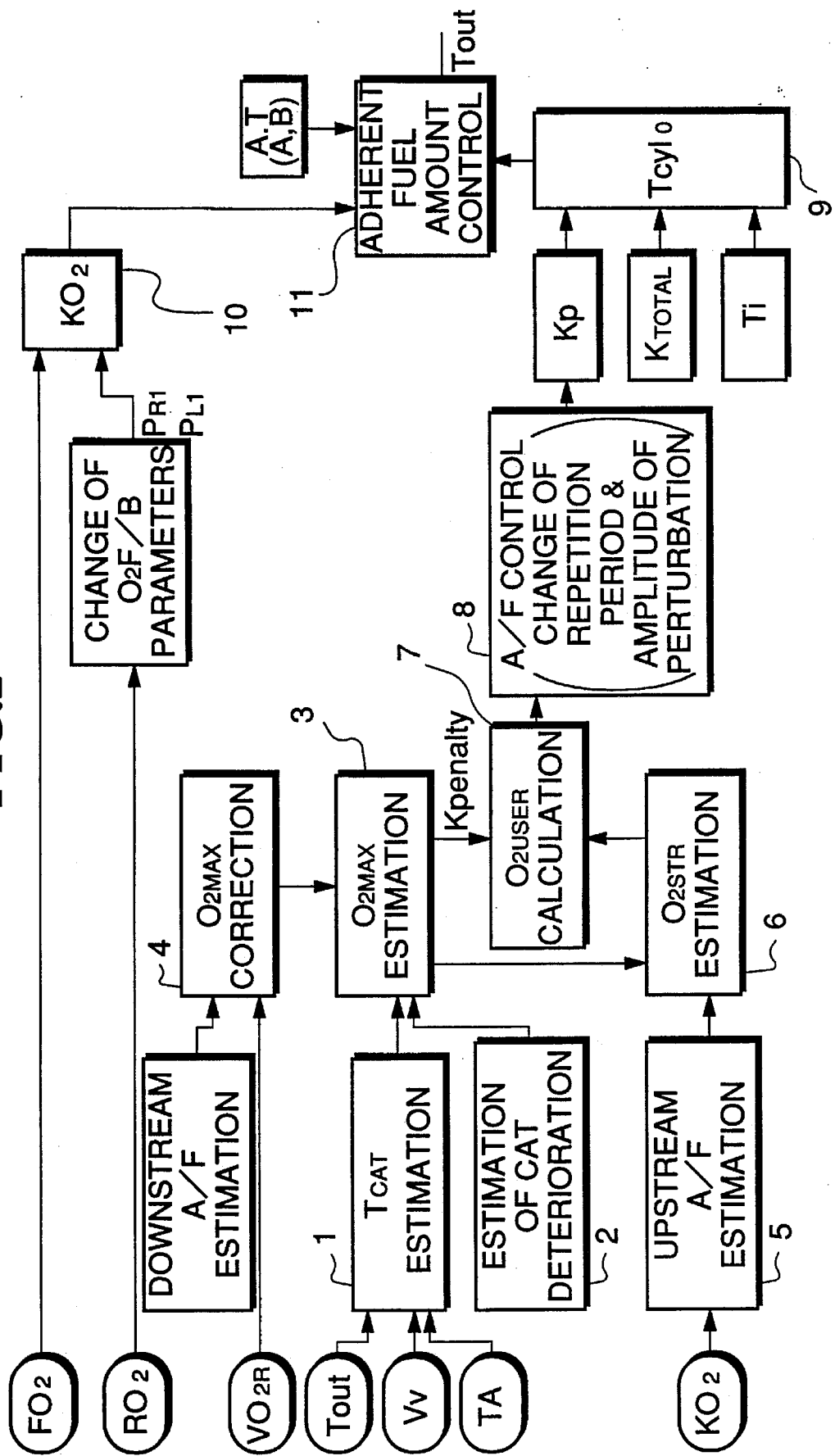
FIG. 2 is a schematic diagram showing the outline of fuel supply control according to a first embodiment of the invention.

FIG. 2 shows the outline of fuel supply amount control by the fuel supply control system according to a first embodiment of the invention. The fuel supply control system carries out the following processings: estimating catalyst temperature TCAT (processing 1), estimating deterioration of the catalytic converter 14 (processing 2), estimating the maximum allowable O2 storage amount O2MAX in the catalytic converter 14 (processing 3), correcting the maximum allowable O2 storage amount O2MAX (processing 4), estimating an air-fuel ratio A/F of exhaust gases at a location upstream of the catalytic converter 14 (processing 5), estimating an O2 storage amount O2STR stored in the catalytic converter 14 (processing 6), calculating an O2 utilization factor O2USER of the catalytic converter 14 (processing 7), controlling the air-fuel ratio A/F of a mixture supplied to the engine 1 by forcedly oscillating (perturbation) the A/F value (processing 8), calculating a basic required fuel amount $Tcyl_0$ to be drawn into the cylinder of the engine 1 (processing 9), calculating an air-fuel ratio correction coefficient KO2 (processing 10), and calculating a fuel injection amount TOUT, based on an adherent fuel amount, etc., described hereinafter, (processing 11). Particularly, the fuel supply control system according to the embodiment is characterized in that the air-fuel ratio A/F is forcedly oscillated so as to maximize the purification rate of the catalytic converter 14 so that the O2 utilization factor O2USER of the catalytic converter 14 becomes the maximum.

According to the processing 3 for estimating the maximum allowable O2 storage amount (hereinafter referred to as "the maximum O2 storage amount") O2MAX of the catalytic converter 14, the maximum O2 storage amount O2MAX of the catalytic converter 14 is calculated based on the catalyst temperature TCAT, the deterioration degree of the catalyst, and the capacity (volumetric size) of same. The catalyst temperature TCAT may be directly detected by the catalyst temperature sensor 17, or may be calculated by estimating the catalyst temperature TCAT in a manner described hereinafter. The deterioration degree of the catalyst may be calculated by estimating the deterioration degree of the catalyst in a manner described hereinafter. The capacity of the catalyst, which has a fixed value determined by the volumetric size of the catalyst, may be stored into the memory means 5c of the ECU 5 beforehand. The calculated maximum O2 storage amount O2MAX is not only used as a limit for the O2 storage amount O2STR in calculating the latter, but also used in decreasing the O2 utilization factor O2USER when the O2STR value exceeds the maximum O2 storage amount O2MAX since the catalytic converter 14 cannot then purify exhaust gases.

According to the processing 5 for estimating the air-fuel ratio A/F, the A/F value may be directly detected by a linear output air-fuel ratio sensor (LAF sensor). In the present embodiment, however, the LAF sensor is not employed, but an output from the O2 sensor 15 is used to calculate a correction coefficient KO2, based thereon, whereby the air-fuel ratio A/F is calculated based on a deviation amount of the correction coefficient KO2 from a central value. Further, the correction coefficient KO2 is corrected based on an output from the downstream O2 sensor 16 to eliminate the deviation amount of the correction coefficient KO2 from the central value.

According to the processing 6 for estimating the O2 storage amount O2STR of the catalytic converter 14, when the air-fuel ratio A/F is on a lean side with respect to a stoichiometric air-fuel ratio, the catalytic converter 14 acts to adsorb oxygen molecules O2, while it desorbes oxygen molecules when the A/F value is on a rich side with respect to the stoichiometric air fuel ratio. By utilizing this fact, a degree of adsorption and desorption of oxygen molecules O2 to and from the catalytic converter 14 is calculated from the A/F value and the amount of exhaust gases to calculate the O2 storage amount O2STR based on the calculated degree of adsorption and desorption. The O2 storage amount O2STR thus calculated is limited to the maximum O2 storage amount O2MAX which is determined mainly by the capacity of the catalytic converter 14. Further, when the O2 storage amount O2STR assumes a negative value, it is limited to "0".

According to the processing 7 for calculating the O2 utilization factor O2USER, a physical amount corresponding to the purification rate is calculated as the O2 utilization factor O2USER. The larger the O2 utilization factor O2USER, the higher the purification rate of the catalytic converter 14. However, when the O2 storage amount O2STR exceeds the maximum O2 storage amount O2MAX or becomes below "0", exhaust gases are not effectively purified by the catalytic converter 14, and therefore the O2 utilization factor O2USER is decreased when it exceeds the maximum O2 storage amount O2MAX or falls below "0".

According to the A/F perturbation processing 8, the A/F value of a mixture supplied to the engine is forcedly oscillated by regulating the repetition period and amplitude of perturbation of the air-fuel ratio A/F such that a variation amount of the O2 storage amount O2STR per predetermined unit time period is the maximum within the range between "0" and the O2MAX value exclusive, within which the catalyst can store oxygen. Thus, the O2 storage capacity of the catalyst can be utilized to the maximum degree, whereby the purification rate of the catalytic converter 14 is enhanced.

Next, the processings 1 to 7 will be described in detail hereinbelow.

[Processing 1 for estimating the catalyst temperature TCAT]

Figure 3:
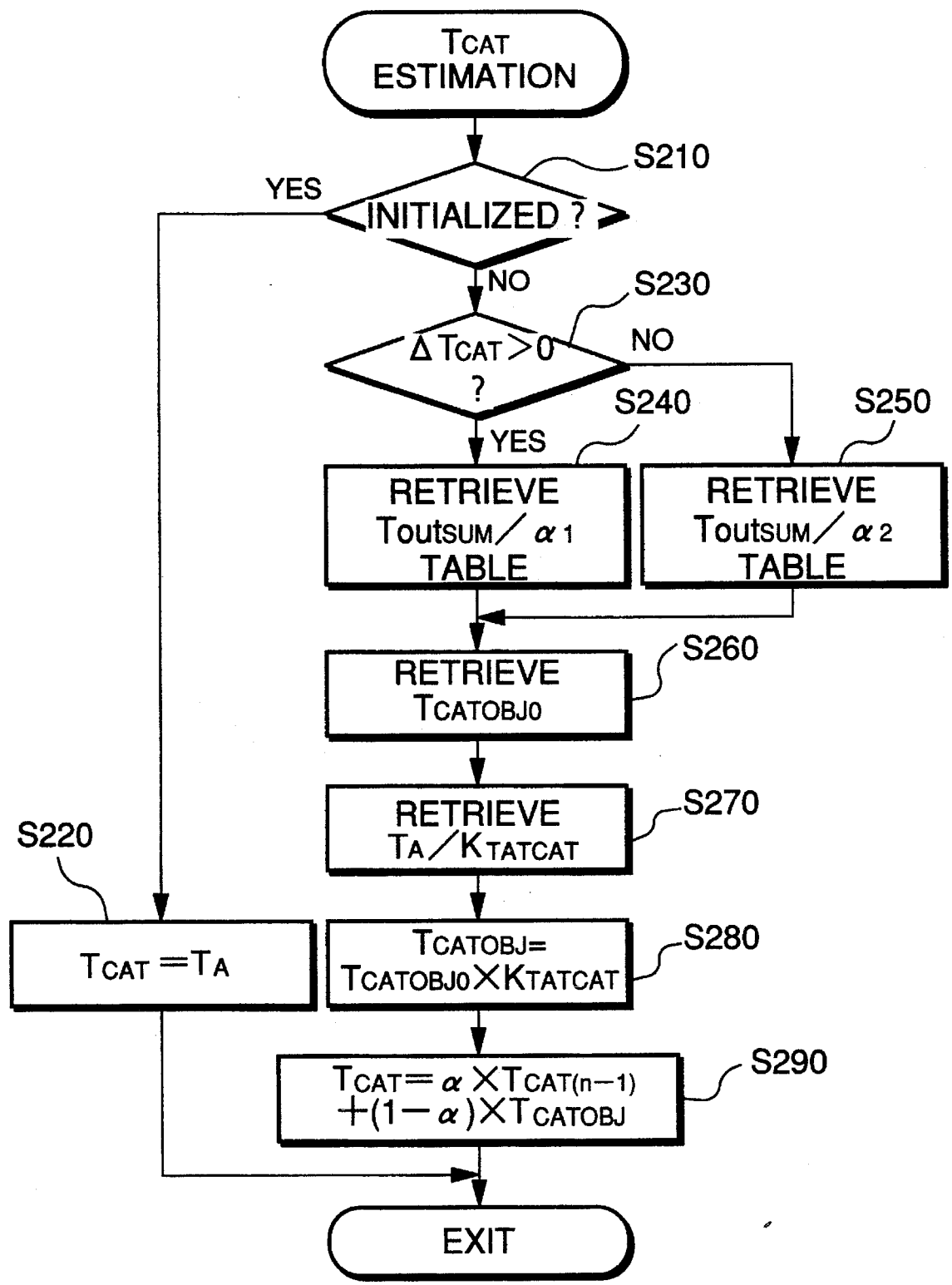
FIG. 3 is a flowchart showing a routine for estimating catalyst temperature TCAT.
Figure 4:
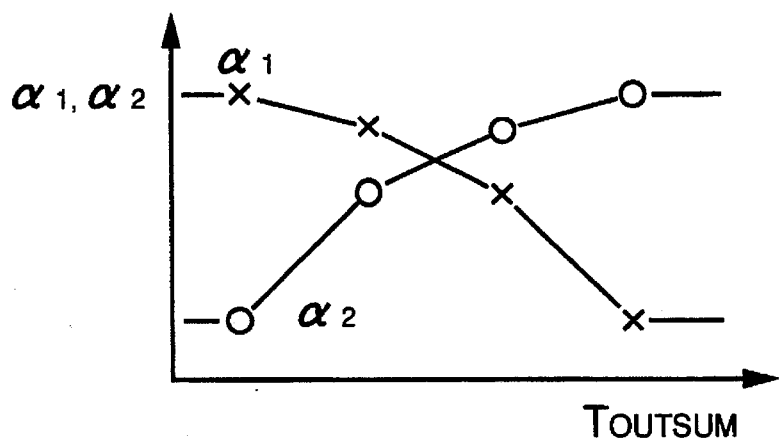
FIG. 4 is a graph showing the relationship between a cumulative value TOUTSUM of fuel injection periods TOUT and a coefficient $\alpha 1$ for lowering the catalyst temperature and a coefficient $\alpha 2$ for elevating the catalyst temperature.

FIG. 3 shows a routine for estimating the catalyst temperature TCAT. At a step S210, it is determined whether or not the engine is in a starting mode. If the engine is in the starting mode, the catalyst temperature TCAT is set to the intake air temperature TA detected by the TA sensor 8, as an initial value of the catalyst temperature TCAT at a step S220, followed by terminating the present routine. If the engine is not in the starting mode, it is determined at a step S230 whether or not a difference Δ TCAT between the catalyst temperature TCAT and a desired estimated catalyst temperature TCATOBJ is larger than "0". After the start of the engine normally the catalyst temperature TCAT rises, however, if the TCAT value exceeds the desired estimated catalyst temperature TCATOBJ, a TOUTSUM/α1 table is retrieved to determine a coefficient α1 for lowering the catalyst temperature TCAT based on a cumulative value TOUTSUM, shown in FIG. 4, at a step S240, whereas if the TCAT value is smaller than the desired estimated catalyst temperature TCATOBJ, a TOUTSUM/α2 table is retrieved to determine a coefficient α2 for elevating the catalyst temperature TCAT based on the cumulative value TOUTSUM at a step S250. The TOUTSUM value represents a cumulative value of the fuel injection period TOUT obtained over predetermined unit time period. The larger the TOUT value, the larger combustion energy, resulting in elevated catalyst temperature TCAT. The coefficients α1 and α2 are set as shown in the tables of FIG. 4, i.e. the coefficient α1 is decreased as the cumulative value TOUTSUM is larger, whereas the coefficient α2 is increased as the cumulative value TOUTSUM is smaller.

Figure 5:
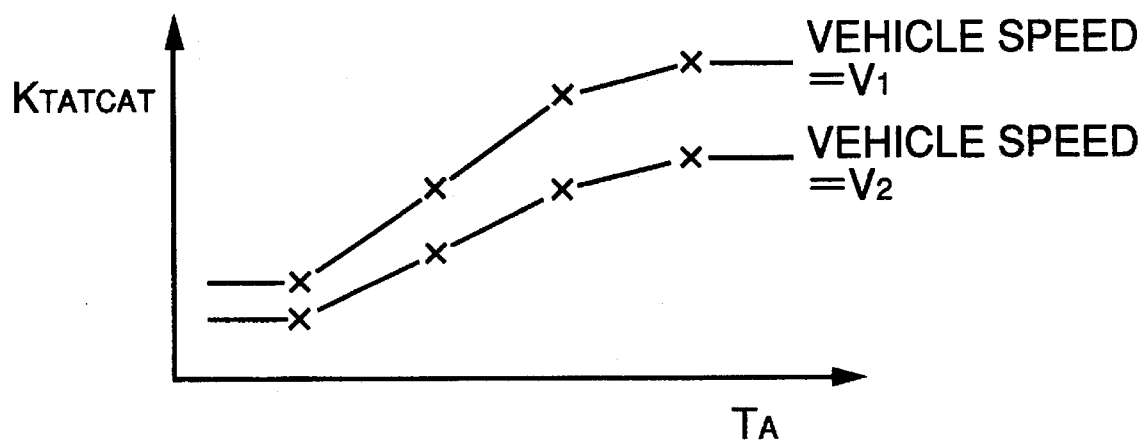
FIG. 5 is a graph showing the relationship between a correction coefficient KTATCAT and intake air temperature TA and vehicle speed.

Then, at a step S260, a basic value TCATOBJ0 of the desired estimated catalyst temperature TCATOBJ is determined by retrieving a map, not shown, according to the intake pipe absolute pressure PBA and the engine rotational speed NE. At a step S270, a TA/KTATCAT table is retrieved to determine a correction coefficient KTATCAT for the basic value TATOBJ0, according to the intake air temperature TA. According to the TA/KTATCAT table of FIG. 5, in view of the fact that when the intake air temperature TA is low, the catalytic converter 14 is cooled by fresh air, the correction coefficient KTATCAT is set to a lower value as the intake air temperature TA is lower. In addition, in view of the fact that the cooling degree of the catalytic converter 14 by fresh air varies with the vehicle speed VH, the correction coefficient KTATCAT is also set according to the vehicle speed V.

Then, the basic value TCATOBJ0 is multiplied by the retrieved correction coefficient KTATCAT, to thereby set the desired estimated catalyst temperature TCATOBJ which has thus been corrected for the intake air temperature TA, at a step S280. Then, based on the desired estimated catalyst temperature TCATOBJ thus set, a present value of the catalyst temperature TCAT(n) is calculated by the use of the following equation (1):

$$TCAT(n) = \alpha \times TCAT(n-1) + (1-\alpha) \times TCATOBJ \quad \ldots \quad (1)$$

where the α1 value obtained at the step S240 or the α2 value obtained at the step S250 is substituted for α. TCAT(n−1) represents a value obtained in the immediately preceding loop. The calculation of the catalyst temperature TCAT(n) is followed by termination of the present routine.

[Processing 2 for estimating deterioration of the catalyst]

Figure 6:
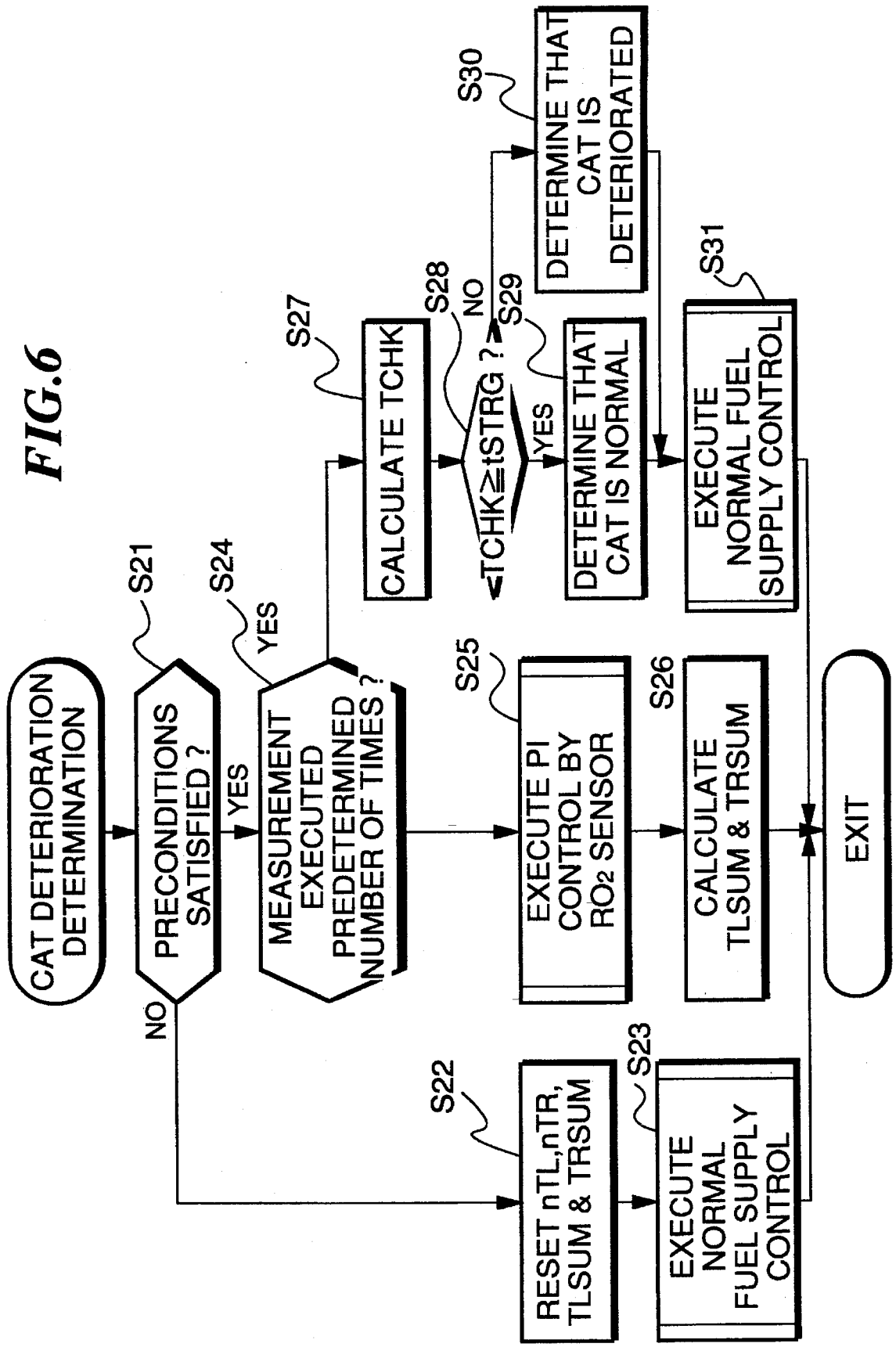
FIG. 6 is a flowchart showing a routine for determining deterioration of a catalytic converter appearing in FIG. 1.

Then, deterioration of the performance of the catalytic converter 14 is estimated. How deterioration of the performance of the catalyst 14 is determined will be described with reference to FIGS. 6 to 9. As shown in FIG. 8, during execution of the air-fuel feedback control in which the correction coefficient KO2 is calculated based only on the output RVO2 from the downstream O2 sensor 16, calculations are made of a time period TL from the time a special P term PLSP for skipping the KO2 value in the decreasing direction is generated to the time the downstream O2 sensor output RVO2 is correspondingly inverted, and a time period TR from the time a special P term PRSP for skipping the KO2 value in the increasing direction is generated to the time the downstream O2 sensor output RVO2 is correspondingly inverted. The determination of deterioration of the catalyst performance is carried out based on the thus calculated time periods TL and TR. FIG. 6 shows a program for executing the above determination of deterioration of the catalyst 14. At a step S21, it is determined whether or not preconditions for executing the determination of deterioration are satisfied, which is executed according to a program shown in FIG. 7.

Figure 7:
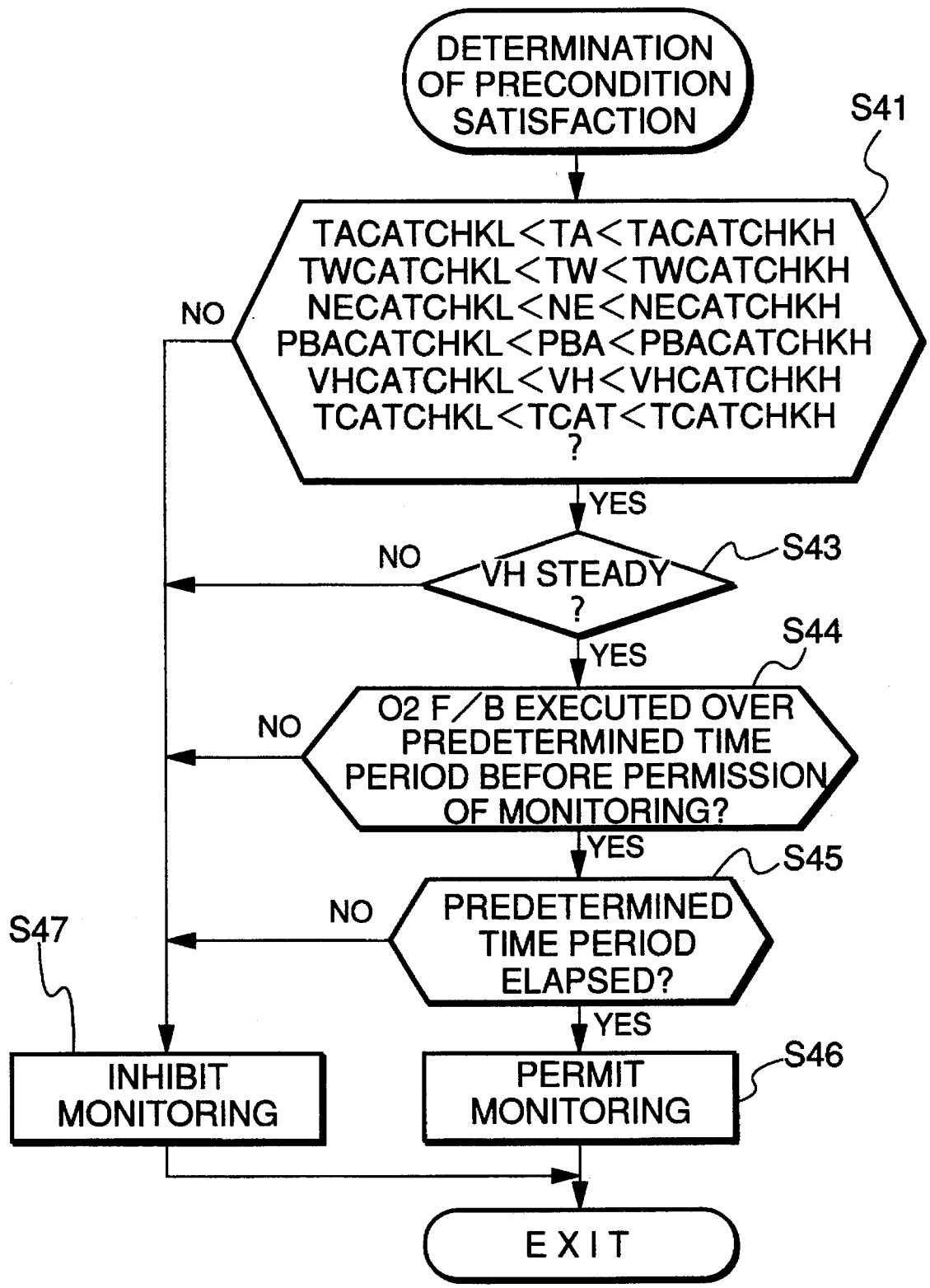
FIG. 7 is a flowchart showing a subroutine for determining satisfaction of preconditions for the determination of catalytic converter deterioration.
Figure 8:
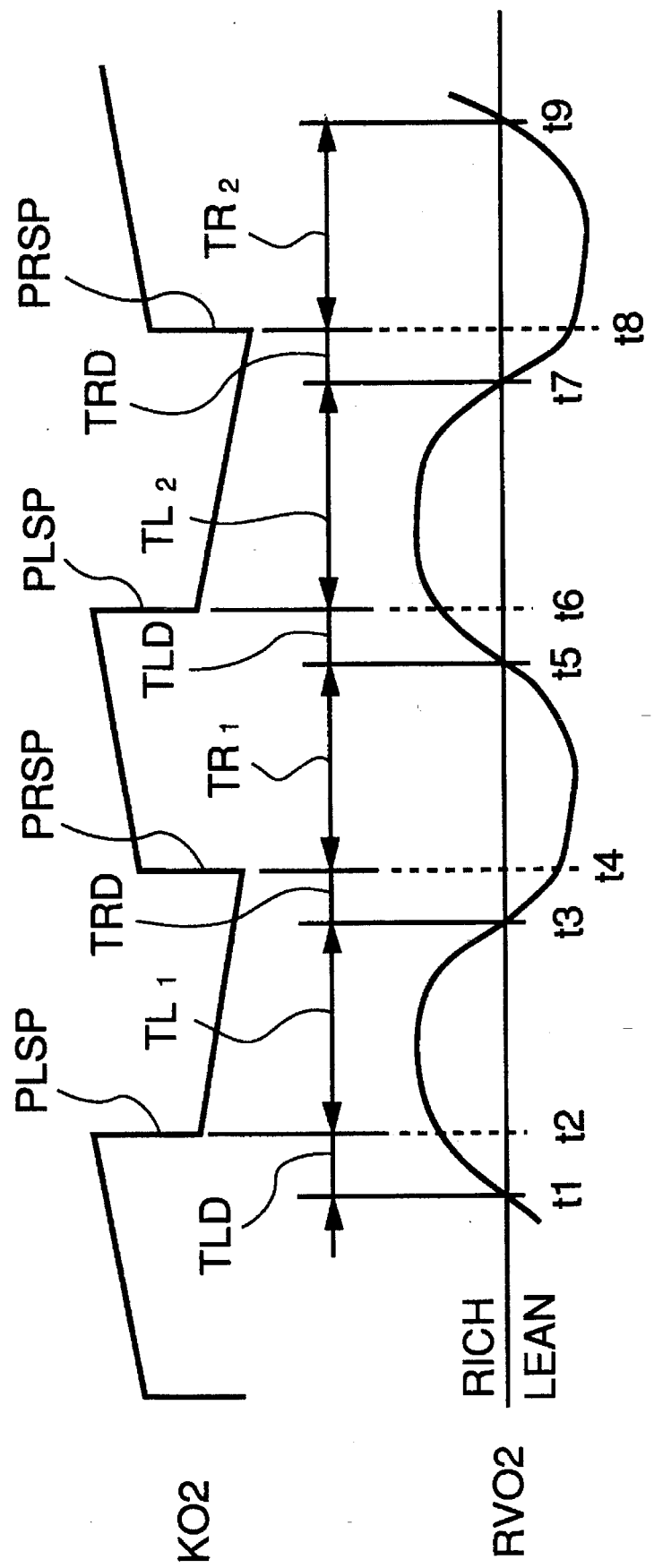
FIG. 8 is a timing chart showing a change in an air-fuel ratio correction coefficient KO2.

At a step S41 in FIG. 7, it is determined whether or not the intake air temperature TA, the engine coolant temperature TW, the engine rotational speed NE, the vehicle speed VH, and the catalyst temperature TCAT are within respective predetermined ranges between upper limit values and lower limit values. The respective upper limit values and lower limit values are set, for example, to the following values: An upper limit value TACATCHKH and a lower limit value TACATCHKL of the intake air temperature TA are set to 100° C. and 60° C., respectively. An upper limit value TWCATCHKH and a lower limit value TWCATCHKL of the engine coolant temperature TW are set to 100° C. and 60° C., respectively. An upper limit value NECATCHKH and a lower limit value NECATCHKL of the engine rotational speed NE are set to 3200 rpm and 2800 rpm, respectively. An upper limit value PBACATCHKH and a lower limit value PBACATCHKL of the intake pipe absolute pressure PBA are set to 510 mmHg and 410 mmHg, respectively. An upper limit value VHCATCHKH and a lower limit value VHCATCHKL of the vehicle speed VH are set to 80 km/h and 32 km/h, respectively. An upper limit value TCATCHKH and a lower limit value TCATCHKL of the catalyst temperature TCAT are set to 800° C. and 400° C., respectively.

At a step S43, it is determined whether or not the vehicle speed VH is steady, i.e. whether or not the output VH from the vehicle speed sensor 32 has continued to be within a variation range of 0.8 km/sec over a predetermined time period (e.g. 2 sec). At a step S44, it is determined whether or not the air-fuel ratio feedback control based on the outputs from the O2 sensors 15 and 16 had been carried out over a predetermined time period (e.g. 10 sec) before the start of determination of the monitoring preconditions. If the answers to the questions of the steps S41 to S44 are all affirmative (YES), it is determined at a step S45 whether or not all the above conditions have continued to be satisfied over a predetermined time period (e.g. 2 sec). If the answer is affirmative (YES), the monitoring of deterioration of the catalytic converter is permitted (satisfaction of the preconditions) at a step S46. On the other hand, if any of the answers to the questions of the steps S41 to S45 is negative (NO), the monitoring is inhibited (disatisfaction of the preconditions) at a step S47.

Referring again to FIG. 6, if the preconditions are not satisfied at the step S21, the program proceeds to a step S22, wherein respective cumulative values TLSUM and TRSUM of the time periods TL and TR and respective numbers of times of measurement nTL and nTR of the time periods TL and TR are all reset to 0 at a step S22, and normal fuel supply control is executed at a step S23. In the normal fuel supply control, when the engine is in the air-fuel ratio feedback control region, feedback control is effected by calculating the correction coefficient KO2, based on the outputs from the O2 sensors 15 and 16, while when the engine is in each open loop control region, open loop control is effected by setting the KO2 value to a predetermined value corresponding to the open loop control region.

If the preconditions are satisfied at the step S21, it is determined at a step S24 whether or not measurements of the TL and TR values have each been carried out a predetermined number of times. In the first loop of execution of the program, the answer becomes negative (NO), and then the program proceeds to a step S25, wherein PI (proportional integral) control based only on the downstream O2 sensor output RVO2 is executed, and the TL and TR values are measured. Then, cumulative values TLSUM and TRSUM of the measured TL and TRSUM values are calculated at a step S26.

Specifically, as shown in FIG. 8, at a time point t2 corresponding to the lapse of a predetermined time period TLD after a time point t1 a lean-to-rich inversion of the O2 sensor output RVO2 occurred, the KO2 value is skipped in the decreasing direction using the leaning special P term PLSP, and then the I term control is executed by progressively decreasing the KO2 value until a time point t4 corresponding to the lapse of a predetermined time period TRD after a time point t3 a rich-to-lean inversion of the sensor output RVO2 occurred. The time period from the time point t2 to the time point t3 is measured as a TL value (TL1). Next, at the time point t4, the KO2 value is skipped in the increasing direction by the use of the enriching special P term PRSP, and then the I term control is executed by progressively increasing the KO2 value until a time point t6 corresponding to the lapse of a predetermined time period TLD after a time point t5 a lean-to-rich inversion of the sensor output RVO2 occurred. The time period from the time point t4 to the time point t5 is measured as a TR value (TR1). Thereafter, TL2, TR2, . . . are successively measured in the same manner as above, followed by calculating cumulative values TLSUM and TRSUM of the measured TL and TR values.

Referring again to FIG. 6, if the answer to the question of the step S24 is affirmative (YES), i.e. if the measurements have each been carried out the predetermined number of times, a determination time period TCHK (average value of the values TL and TR) is calculated by the use of the following equation (2A) at a step S27:

$$TCHK=(TLSUM/nTL+TRSUM/nTR)/2 \ldots \quad (2A)$$

Then, it is determined at a step S28 whether or not the calculated determination time period TCHK exceeds a predetermined value tSTRG. If the TCHK value exceeds the predetermined value tSTRG, it is determined at a step S29 that the catalyst is in a normal state, whereas if it is smaller than the predetermined value tSTRG, it is determined at a step S30 that the catalyst is deteriorated. Thereafter, at a step S31 the normal fuel supply control is carried out similarly to the step S23.

Figure 9:
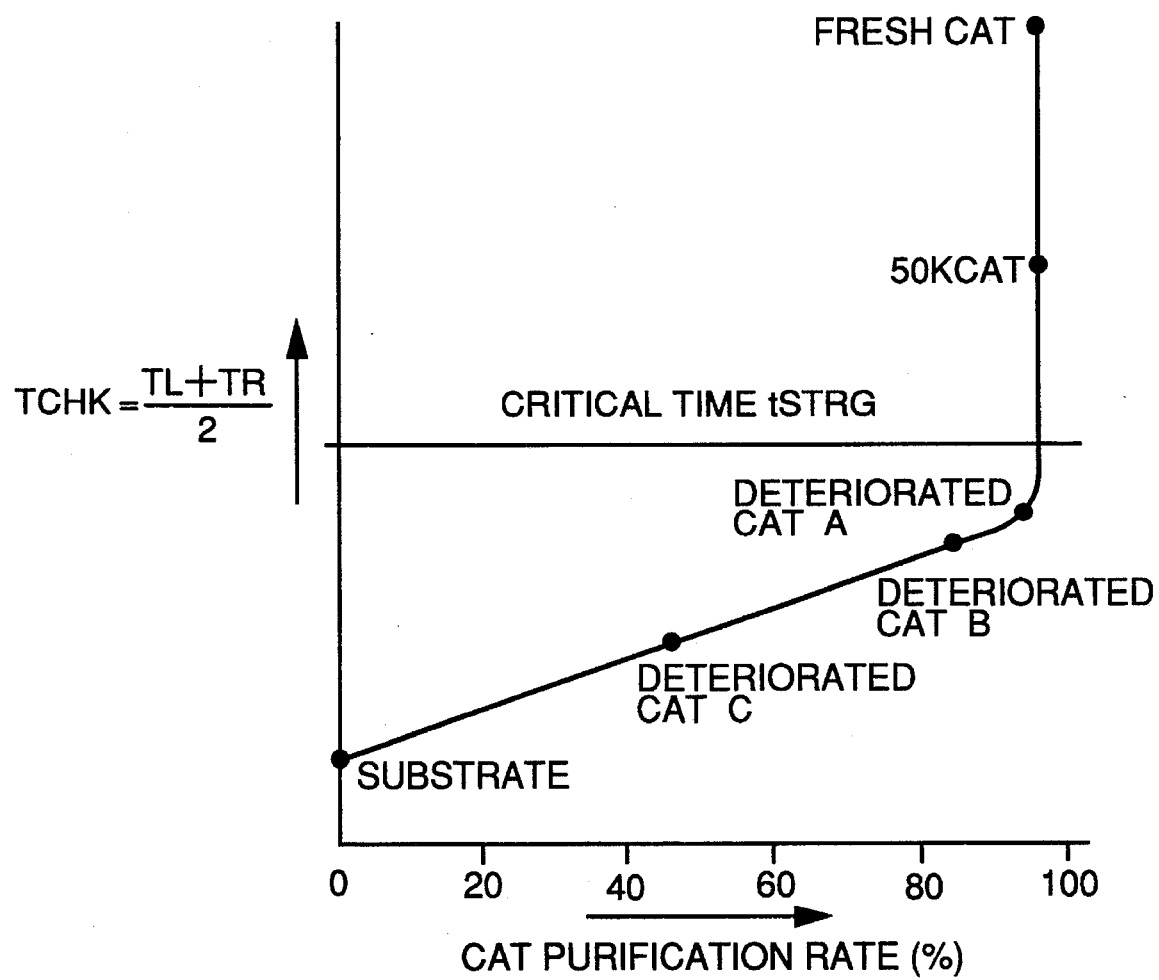
FIG. 9 is a graph showing the relationship between the deterioration degree of the catalytic converter and the purification rate of same.

This determination of deterioration is based on the fact that the average value TCHK of the time periods TL and TR and the purification rate of the catalyst (CAT conversion ratio) are in the relationship as shown in FIG. 9. As shown in the figure, the average value TCHK decreases as the purification rate of the catalyst becomes smaller. The purification rate of the catalyst depends on the O2 storage capacity of the catalyst, and a decrease in the average value TCHK indicates a decrease in the O2 storage capacity of the catalytic converter 14. By utilizing the FIG. 9 relationship, the deterioration of the catalyst can be accurately determined.

[Processing 3 for estimating the maximum O2 storage amount O2MAX of the catalytic converter]

As described hereinabove, the maximum O2 storage amount O2MAX of the catalytic converter 14 is determined by the capacity (volumetric size) of the catalyst, the catalyst temperature TCAT and the deterioration degree of the catalyst estimated according to the processings 1 and 2, respectively.

Figure 10:
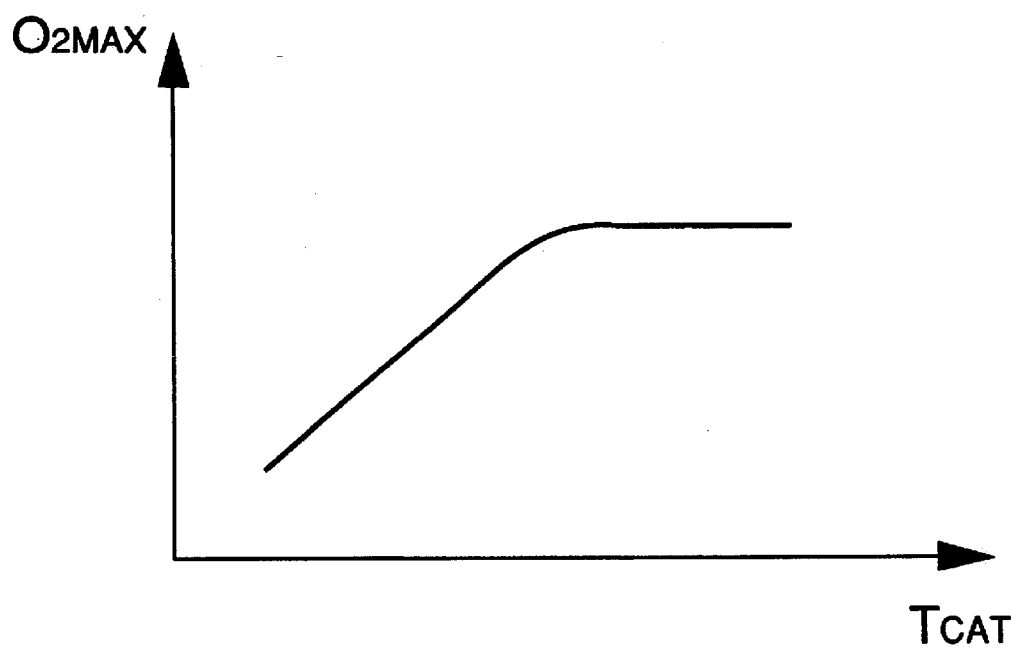
FIG. 10 is a graph showing a change in the maximum allowable O2 storage amount O2MAX relative to the catalyst temperature TCAT.

FIG. 10 shows the relationship between the detected or estimated catalyst temperature TCAT and the maximum O2 storage amount O2MAX. As shown in the figure, the maximum O2 storage amount O2MAX increases as the catalyst temperature TCAT increases, while it remains constant when the catalyst temperature TCAT exceeds a predetermined value. The maximum O2 storage amount O2MAX is calculated by multiplying the maximum O2 storage amount per unit volume according to the catalyst temperature TCAT, by the volumetric size and the deterioration degree of the catalyst. The maximum O2 storage amount O2MAX thus calculated is used in executing the feedback control of the air-fuel ratio A/F, and corrected in a manner described hereinafter.

[Processing 4 for correcting the maximum O2 storage amount O2MAX ]

Figure 11:
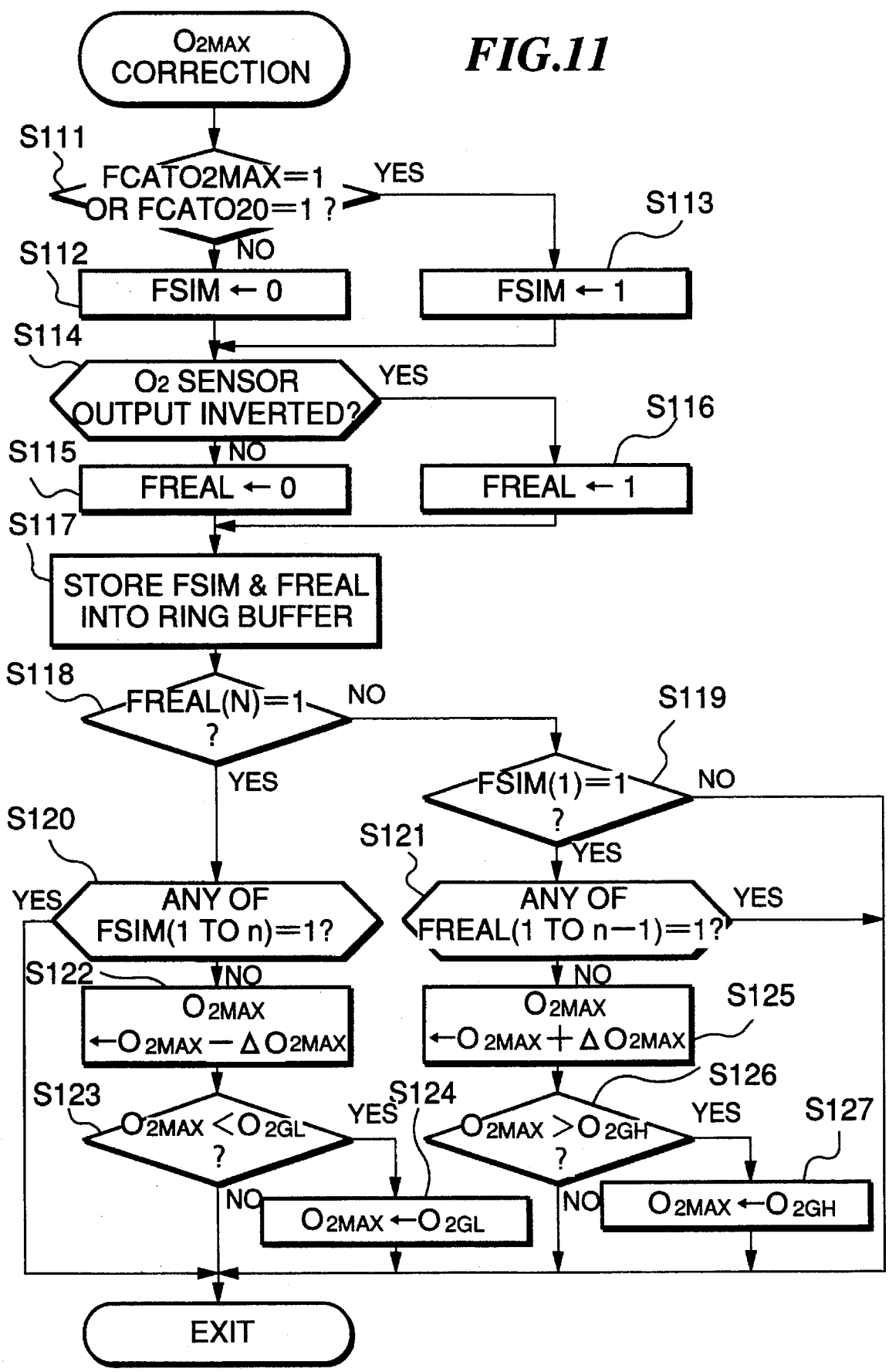
FIG. 11 is a flowchart showing a routine for correcting the maximum allowable O2 storage amount O2MAX.

FIG. 11 shows a program for correcting the maximum O2 storage amount O2MAX. This program is executed for correcting a calculated value of the maximum O2 storage amount O2MAX when the inversion timing of the downstream air-fuel ratio A/F estimated from the O2 storage amount O2STR in the catalytic converter 14, referred to hereinafter, deviates from the inversion timing of the output from the downstream O2 sensor 16 and it is hence determined that the calculated value of the maximum O2 storage amount O2MAX is erroneous. A flag FSIM, which is set to "1" upon an inversion of the air-fuel ratio A/F estimated by a ring buffer, and a flag FREAL, which is set to "1" upon an inversion of the output from the downstream O2 sensor 16, are employed for correcting the O2MAX value. If the flag FSIM has not been set to "1" within a predetermined time period before the inversion of the downstream O2 sensor output, i.e. if the estimated inversion of the downstream air-fuel ratio is delayed, it is judged that the calculated O2MAX value is too large, whereby the O2MAX value is decreased by an amount ΔO2MAX. If the inversion of the output from the downstream O2 sensor does not occur within the predetermined time period after setting of the flag FSIM to "1" it is determined that the calculated O2MAX value is too small, whereby the value O2MAX is increased by the amount ΔO2MAX. This routine is executed at predetermined time intervals (e.g. 1 sec).

First, it is determined at a step S111 whether or not any of a flag FCATO2O and a flag FCATO2MAX has been set to "1". According to an O2 storage amount O2STR calculating routine shown in FIG. 15, described hereinafter, the flag FCATO2O is set to "1" when the O2 storage amount O2STR in the catalytic converter 14 is below a predetermined value O2STRL which is close to 0. The predetermined value O2STRL is set to a value within a range of 0 to 30% of the maximum O2 storage amount O2MAX. The flag FCATO2MAX is set to "1" when the O2 storage amount O2STR of the catalytic converter 14 exceeds a predetermined value O2STRH which is close to the O2MAX value. The predetermined value O2STRH is set to a value within a range of 70 to 100% of the O2MAX value. If neither of the flag FCATO2MAX and FCATO2O has been set to "1", the flag FSIM is reset to "0" at a step S112, whereas if either the flag FCATO2MAX or FCATO2O has been set to "1", the flag FSIM is set to "1" at a step S113.

Then, it is determined at a step S114 whether or not the output from the downstream O2 sensor 16 has been inverted. If the output has not been inverted, the flag FREAL is reset to "0" at a step S115, whereas if the output has been inverted, the flag FREAL is set to "1" at a step S116. These flags FSIM and FREAL are stored into the ring buffer at a step S117. Then, it is determined whether or not an initial value FSIM(1) of the flag FSIM and a present value FREAL(n) of the the flag FREAL have both been set to "1", at steps S118 and S119, respectively, and if the flags have both been set to "0" the present routine is terminated without correcting the maximum O2 storage amount O2MAX. If the present value of the flag FREAL has been set to "1" at the step S118 and any of flags FSIM(1 to n) has been set to "1" at a step S120, the present routine is terminated without correcting the O2MAX value. Further, if the initial value of the flag FSIM has been set to "1" at the step S119 and any of flags FREAL(1 to n−1) has been set to "1" at a step S121, the present routine is terminated without correcting the O2MAX value.

On the other hand, if the flags FSIM(1 to n) have all been set to "0", the maximum O2 storage amount O2MAX determined according to the catalyst temperature TCAT in FIG. 10 directly detected by the TCAT sensor 17 or estimated by the processing 3 is decreased by the amount ΔO2MAX at a step S122. Then, if the maximum O2 storage amount O2MAX is below a lower limit value O2GL at a step S123, the O2MAX value is limited to the lower limit value O2GL at a step S124, followed by terminating the present routine. On the other hand, if any of the flags FREAL(1 to n−1) has been set to "0", the maximum O2 storage amount O2MAX is increased by the amount ΔO2MAX at a step S125. On the other hand, if the maximum O2 storage amount value O2MAX exceeds an upper limit value O2GH at a step S126, the maximum O2 storage amount value O2MAX is limited to the upper limit value O2GH at a step S127, followed by terminating the routine.

[Processing 5 for estimating the air-fuel ratio A/F]

Figure 12:
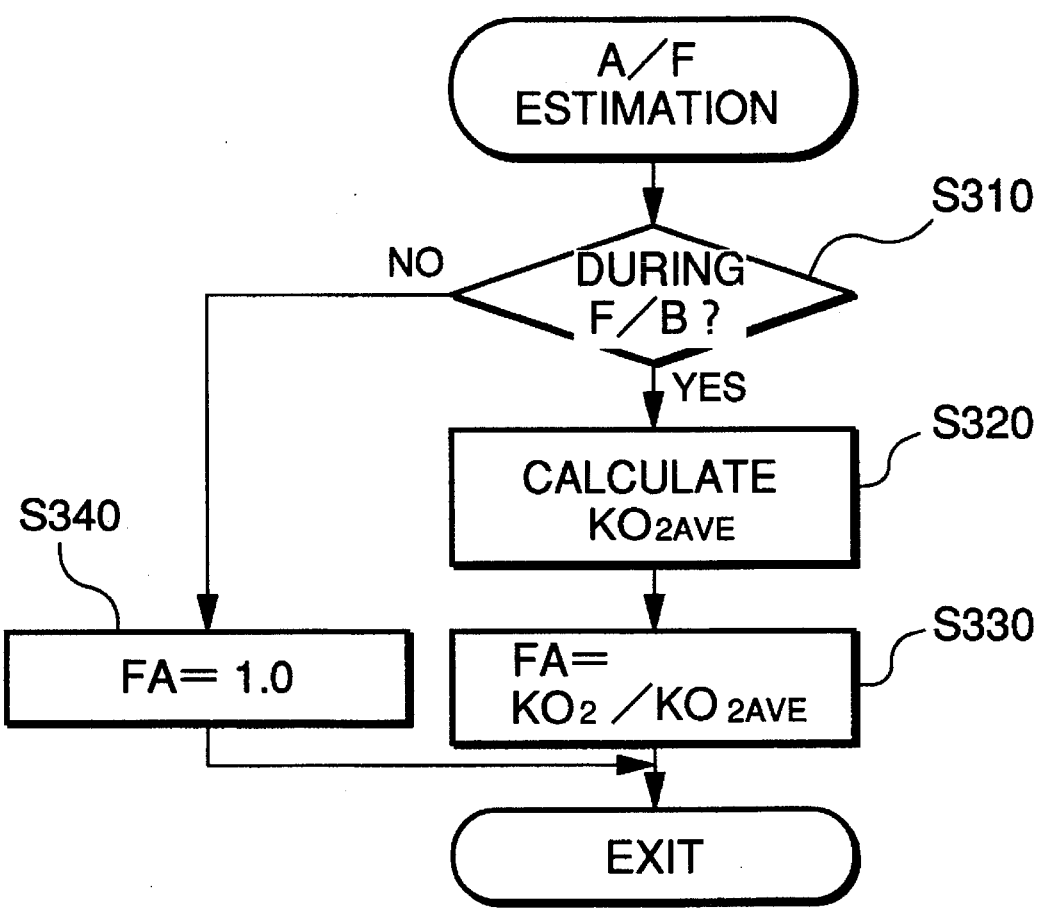
FIG. 12 is a flowchart showing a routine for estimating the air-fuel ratio A/F of exhaust gases.

FIG. 12 shows a program for estimating the air-fuel ratio A/F of exhaust gases emitted from the engine. In the present routine, the LAF sensor for directly detecting the A/F value is not employed, but the correction coefficient KO2 based on the output from the downstream O2 sensor 16 is employed to estimate the air-fuel ratio A/F (AFIN) at the location upstream of the catalytic converter 14. The reason why the downstream O2 sensor 16 is employed is that it can stably detect the air-fuel ratio of exhaust gases after passing through the catalyst, to thereby accurately determine whether the air-fuel ratio is on a richer side or a leaner side with respect to the stoichiometric value. The correction coefficient KO2 may be determined based on the output from the upstream O2 sensor 15 in addition to the output from the downstream O2 sensor 16 as in the present embodiment.

First, it is determined at a step S310 whether or not the air-fuel ratio A/F is under feedback control. As mentioned hereinbefore, during feedback control of the air-fuel ratio, an average value KO2AVE of the correction coefficient KO2 which is set such that the air-fuel ratio (oxygen concentration) detected by the O2 sensor 15 corresponds to the desired value, is calculated at a step S320. The average value KO2AVE is calculated by weighted averaging by the use of the following equation (2):

$$KO2AVE = \alpha \times KO2 + (1-\alpha) \times KO2AVE \ldots \quad (2)$$

where $\alpha$ represents an averaging coefficient.

Then, the ratio between the correction coefficient KO2 and the average value KO2AVE is calculated to thereby calculate a fuel-air ratio F/A at a step S330, followed by terminating the present routine. If it is determined at the step S310 that the engine is in any of the air-fuel ratio open-loop regions, the fuel-air ratio F/A is set to a value "1.0" at a step S340, followed by terminating the present routine.

[Processing 6 for estimating the O2 storage amount O2STR of the catalytic converter]

Figure 13:
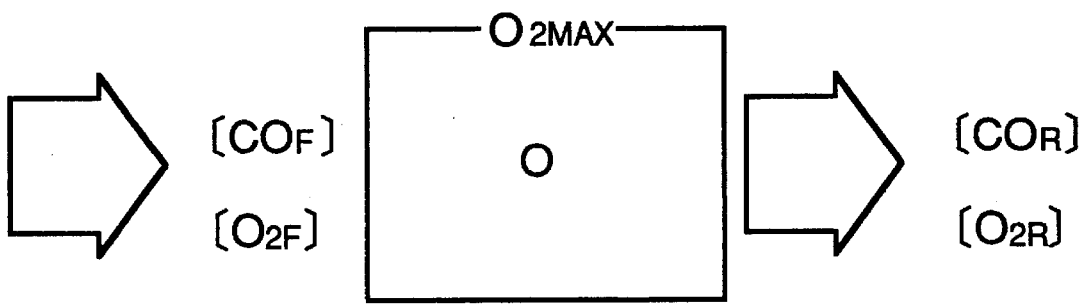
FIG. 13 is a schematic diagram useful in explaining the operation of the catalytic converter.

Next, the O2 storage amount O2STR stored in the catalytic converter 14 is calculated. According to the present embodiment, a physical model of the catalytic converter is constructed, which estimates the O2 storage amount O2STR, based only on CO and O2 components. FIG. 13 schematically shows the catalyst operation of the catalytic converter 14. In the catalytic converter 14, when the input air-fuel ratio A/F is on a rich side with respect to the stoichiometric value, desorption of CO+O→CO2 takes place, whereas when the A/F value is on a lean side, adsorption of O2→2O takes place. Therefore, when the A/F value is on the rich side, the discharging speed of O2 is calculated from the concentration of CO present in exhaust gases at the entrance of the catalytic converter 14, whereas when the A/F value is on the lean side, the adsorption speed of O2 is calculated from the concentration of O2 present in exhaust gases at the entrance of the catalytic converter, by the use of the following equations (3) and (4), respectively:

$$-d/dt(O) = K1 \times [COF] \times O \ldots \quad (3)$$

$$d/dt(O) = K2 \times [O2F] \times (O2MAX - O) \ldots \quad (4)$$

where O represents the O2 storage amount, [COF] the CO concentration at the entrance of the catalytic converter (ppm), [COR] the CO concentration at the exit thereof (ppm), [O2F] the O2 concentration at the entrance thereof (ppm), [O2R] the O2 concentration at the exit thereof (ppm), d/dt(O) a variation rate in the O2 storage amount, and K1 and K2 coefficients, respectively. The coefficients K1 and K2 are set depending on the amount of exhaust gases (intake air amount) and the catalyst temperature TCAT. The oxygen storage amount O (=O2STR) can be determined from the equations (3) and (4).

If the O2 storage amount O2STR in the catalytic converter 14 is within the range of 0 to the maximum O2 storage amount O2MAX, the air-fuel ratio of exhaust gases at the exit of the catalytic converter 14 is equal to 14.7, whereas if the O2 storage amount O2STR is below "0" or exceeds the maximum O2 storage amount O2MAX, the exhaust gases are not purified, and hence the A/F value detected at the entrance of the catalytic converter 14 directly emerges as the A/F value at the exit thereof.

Figure 14:
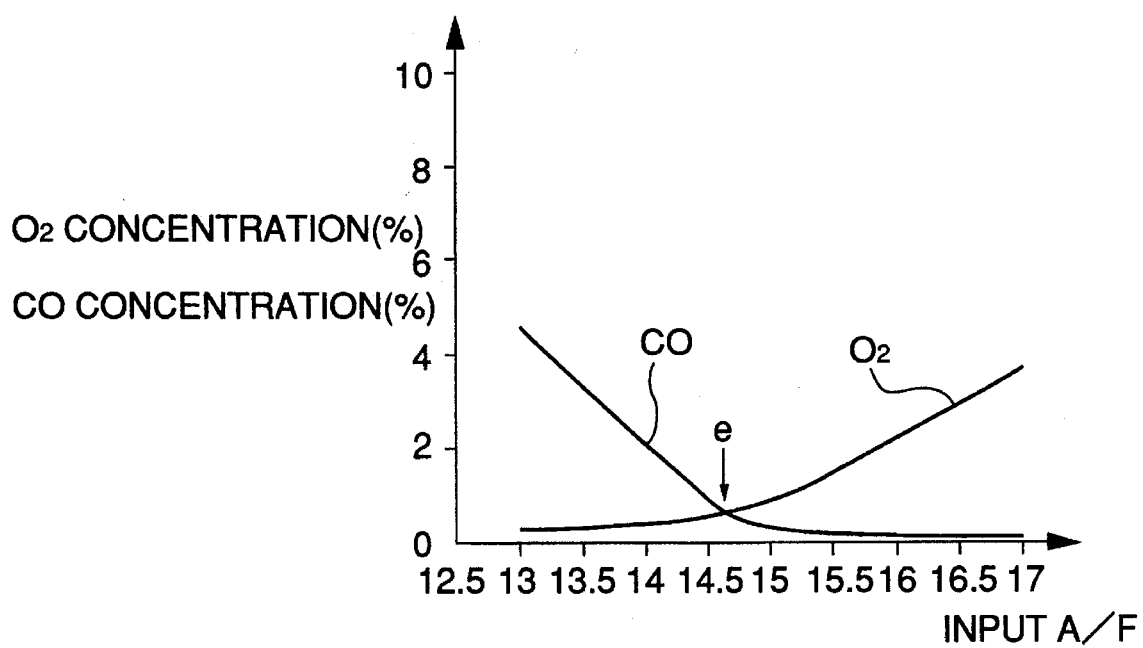
FIG. 14 is a graph showing the relationship between the air-fuel ratio A/F of exhaust gases supplied to the catalytic converter and CO concentration and O2 concentration in the exhaust gases.

FIG. 14 shows the relationship between the air-fuel ratio of exhaust gases input to the catalytic converter 14 and the CO concentration and O2 concentration. If the air-fuel ratio A/F of the exhaust gases exceeds 14.7, a variation rate/XO2 (=-d/dt(O)) in the O2 storage amount O2STR in the catalytic converter 14 is calculated by using the O2 concentration, while if the air-fuel ratio A/F is below 14.7, the variation rate ΔO2 (=d/dr(O)) in the O2 storage amount O2STR in the catalytic converter 14 is calculated by using the CO concentration. The variation rate AO2 in the O2 storage amount O2STR represents O2 discharging/adsorption speed per unit time.

Figure 15:
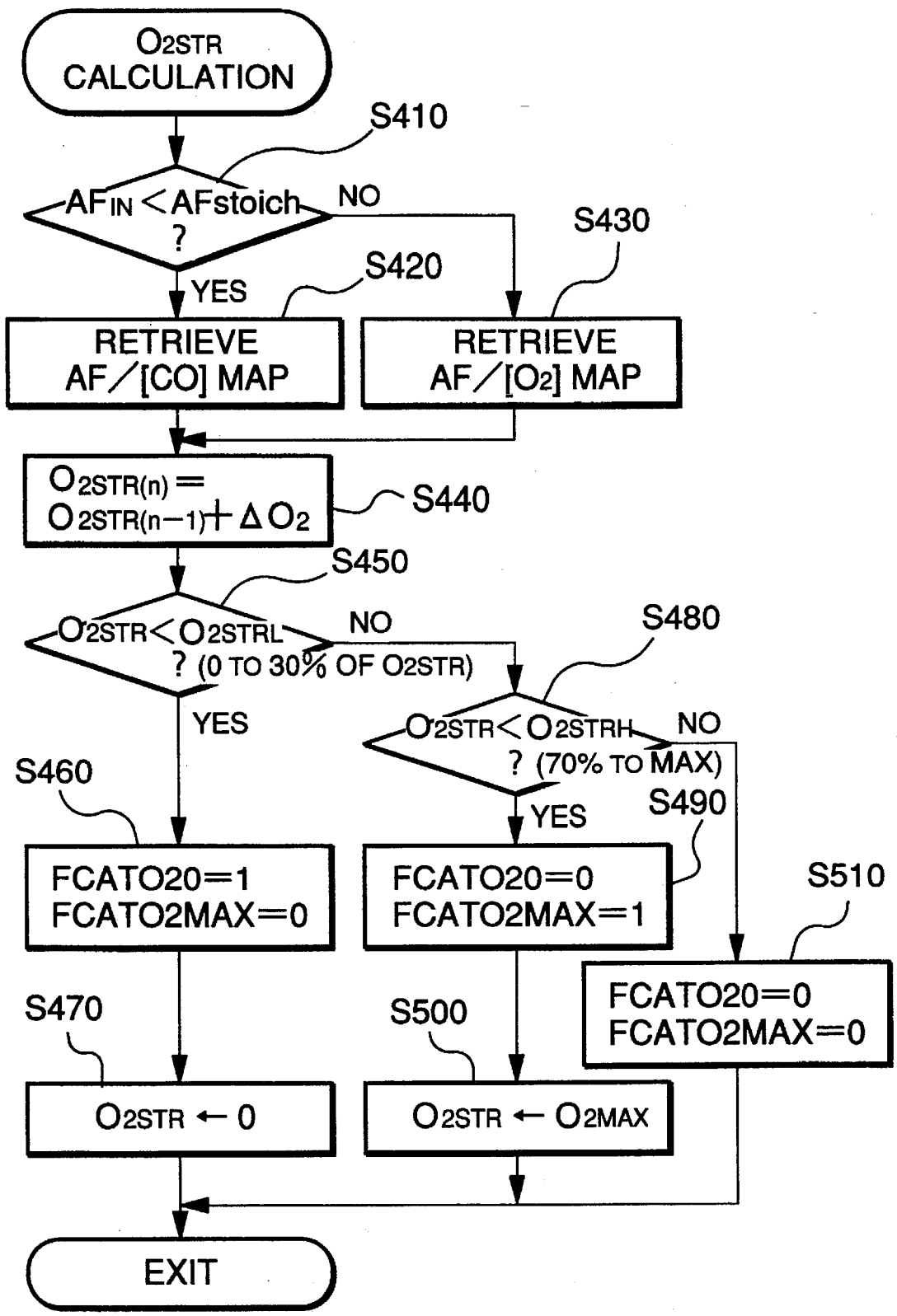
FIG. 15 is a flowchart showing a routine for calculating an O2 storage amount O2STR of the catalytic converter.

FIG. 15 shows a program for calculating the O2 storage amount O2STR in the catalytic converter 14. At a step S410, it is determined whether or not the air-fuel ratio A/F (AFIN) at the location upstream of the catalytic converter 14, which has been calculated by the aforedescribed air-fuel ratio A/F (fuel-air ratio F/A)-estimating routine, is below a stoichiometric value AFstoich 14.7, i.e. the A/F value is on the rich side. If the A/F value is on the rich side, an AF/[CO] map based on the relationship shown in FIG. 14 is retrieved, to thereby determine the CO concentration [COF] at a step S420. Then, the variation rate ΔO2 (-d/dt (o)) in the O2 storage amount O2STR is calculated based on the determined [COF] value by the use of the above equation (3). If the air-fuel ratio A/F is on the lean side, an AF/[O2] map based on the relationship of FIG. 14 is retrieved to determine the O2 concentration [O2F] at a step S430. Then, the variation rate ΔO2 (d/dt(o)) in O2 storage amount O2STR is calculated based on the determined O2 concentration by the use of the above equation (4). The variation rate ΔO2 thus calculated is added to the O2 storage amount O2STR(n-1) which was calculated in the immediately preceding loop, at a step S440.

It is determined at a step S450 whether or not the calculated O2 storage amount O2STR(n) is below the predetermined lower limit value O2STRL. If the answer is affirmative (YES), the flag FCATO20 is set to "1" and the flag FCATO2MAX is reset to "0" at a step S460. Then, the O2 storage amount O2STR(n) is set to "0" at a step S470, followed by terminating the present routine. If it is determined at the step S450 that the O2STR(n) value is not below the O2STRL value, then it is determined at a step S480 whether or not the O2STR(n) value exceeds the predetermined upper limit value O2STRH. If it is determined that the O2STR(n) value exceeds the O2STRH value, the flag FCATO20 is reset to "0" and the flag FCATO2MAX is set to "1" at a step S490. Then, the O2STR(n) value is set to the maximum O2 storage value O2MAX at a step S500, followed by terminating the present routine. On the other hand, if it is determined at the step S480 that the O2STR(n) value does not exceed the upper limit value O2STRH, the flags FCATO20 and CATO2MAX are both reset to "0", followed by terminating the present routine. The flags FCATO20 and CATO2MAX are employed in a program for calculating the O2 utilization factor as well, described hereinafter.

Figures 16A, 16B, 16C, 16D, 16E:
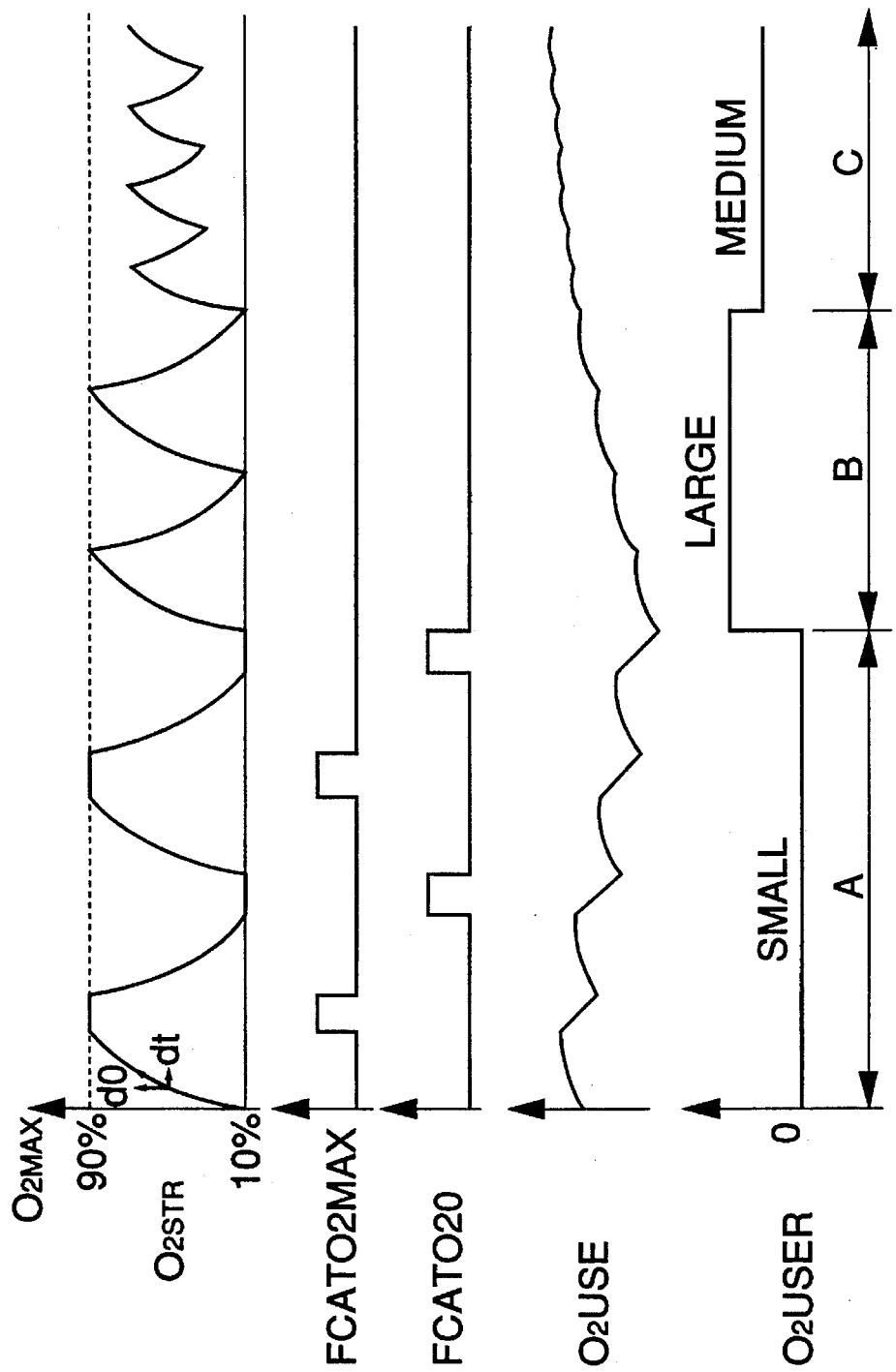
FIG. 16 is a timing chart showing the relationship in timing between the O2 storage amount O2STR, a flag FCATO2MAX, a flag FCATO2O, an O2 utilization amount O2USE, and an O2 utilization factor O2USER.

FIG. 16 shows a timing chart showing the relationship in timing between the O2 storage amount O2STR and the states of the flags FCATO20 and FCATO2MAX. As shown in the figure, the O2 storage amount O2STR fluctuates in response to the rich/lean inversion period of the A/F value, and when the O2 storage amount O2STR is below the O2STRL value (e.g. 10% of the maximum O2 storage amount O2MAX) or exceeds the O2STRH value (e.g. 90% of the maximum O2 storage amount O2MAX), the flags FCATO20 and FCATO2MAX are set to "1", respectively. An O2USE value and the O2USER value shown in FIG. 16 represents the O2 utilization amount and the O2 utilization factor of the catalytic converter 14, respectively, referred to hereinafter.

Figures 19A, 19B, 19C, 19D:
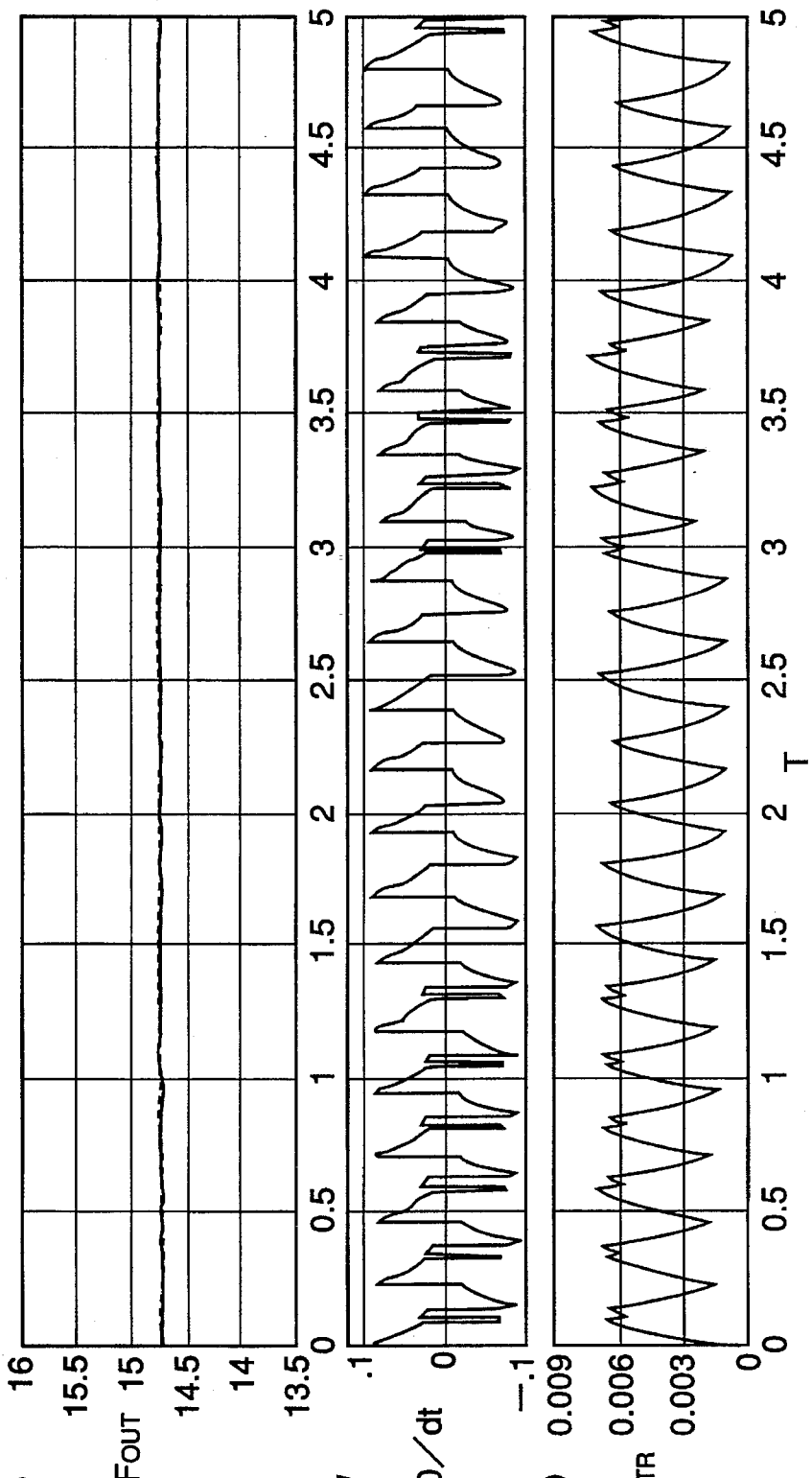
FIG. 19 is a timing chart showing the relationship in timing between the air-fuel ratio A/Fin, the air-fuel ratio A/Fout, the dO/dt value, and the O2 storage amount O2STR.

FIGS. 17, 18 and 19 show empirical data showing waveforms of the air fuel-ratio A/FIN at the location upstream of the catalytic converter 14, the air-fuel ratio A/FOUT at the location downstream of same, moving speed of oxygen molecules dO/dt, and the O2 storage amount O2STR, which have been obtained by perturbation of the air-fuel ratio of a mixture supplied to the engine, carried out under conditions of the repetition period=1.5 Hz and the amplitude=1.00 times of the A/F amplitude in FIG. 17; 1.5 Hz and 0.55 times of the A/F amplitude in FIG. 18, and 4.0 Hz and 0.20 times of the A/F amplitude in FIG. 19, respectively. As shown in FIGS. 17 to 19, the waveforms of the air-fuel ratio A/FIN do not show rectangular waveforms, due to delay of the supply of fuel into the cylinder caused by adherence of part of the injected fuel to the inner wall surface of the intake pipe. The O2STR value in FIG. 17 cyclically varies between the lower limit value "0" and the upper limit value of 0.008048 mol of the O2MAX value, but reaches the upper and lower limit values at areas d and c. Nonetheless, the estimated air-fuel ratio A/FOUT (broken line a) at the location downstream of the catalytic converter estimated from the A/F value almost corresponds to the actually measured air-fuel ratio A/FOUT (solid line b). As is learned from FIG. 17, the O2 storage capacity of the catalyst can be utilized to the maximum degree by effecting perturbation with the repetition period and amplitude suitably set.

[Processing 7 for calculating the O2 utilization factor O2USER]

The O2 utilization amount O2USE in the catalytic converter 14 is calculated by adding up the length of a segment of the path of change in the O2 storage amount O2STR corresponding to a gradient of the path relative to the time base per unit time, by the use of the following equation (5). However, if the O2 storage amount O2STR exceeds the O2STRH value or is below the O2STRL value, the O2USE value is decreased by a correction coefficient Kpenalty:

$$O2USE = \int_0^T \sqrt{1 + |d/dt\,(O2STR)|^2} dt - Kpenalty \times \Delta T \quad (5)$$

The O2 storage amount O2STR of the equation (5) is almost proportional to a value $\Sigma|\Delta O2|$, and therefore the O2 utilization amount O2USE can be simply obtained from a cumulative value of $|\Delta O2|$ by the use of the following equation (6):

$$O2USE = \overset{N}{\Sigma} |\Delta O2| - Kpenalty \times \Delta T \quad (6)$$

In the equations (5) and (6), ΔT represents a cumulative time period over which the O2STR continues to be below the O2STRL value or exceed the O2STRH value. The correction coefficient Kpenalty is employed for decreasing the O2 utilization amount when the aforesaid flag FCATO2MAX or FCTO20 is set to "1", and is set to a value dependent upon the correlation of the O2 utilization amount O2USE with the actual purification rate of the catalyst.

The O2 utilization factor O2USER, which is correlated with the purification rate of the catalytic converter 14, is expressed by the following equation (7):

$$O2USER = \overset{N}{\Sigma} (O2USE)/T \quad (7)$$

where T represents a time period corresponding to a number N of times of calculation of the O2USE value.

The O2USE value is a variation amount in the O2 storage amount O2STR per the predetermined time period T, and represents a physical amount having correlation with the purification rate of the catalyst.

Figure 20:
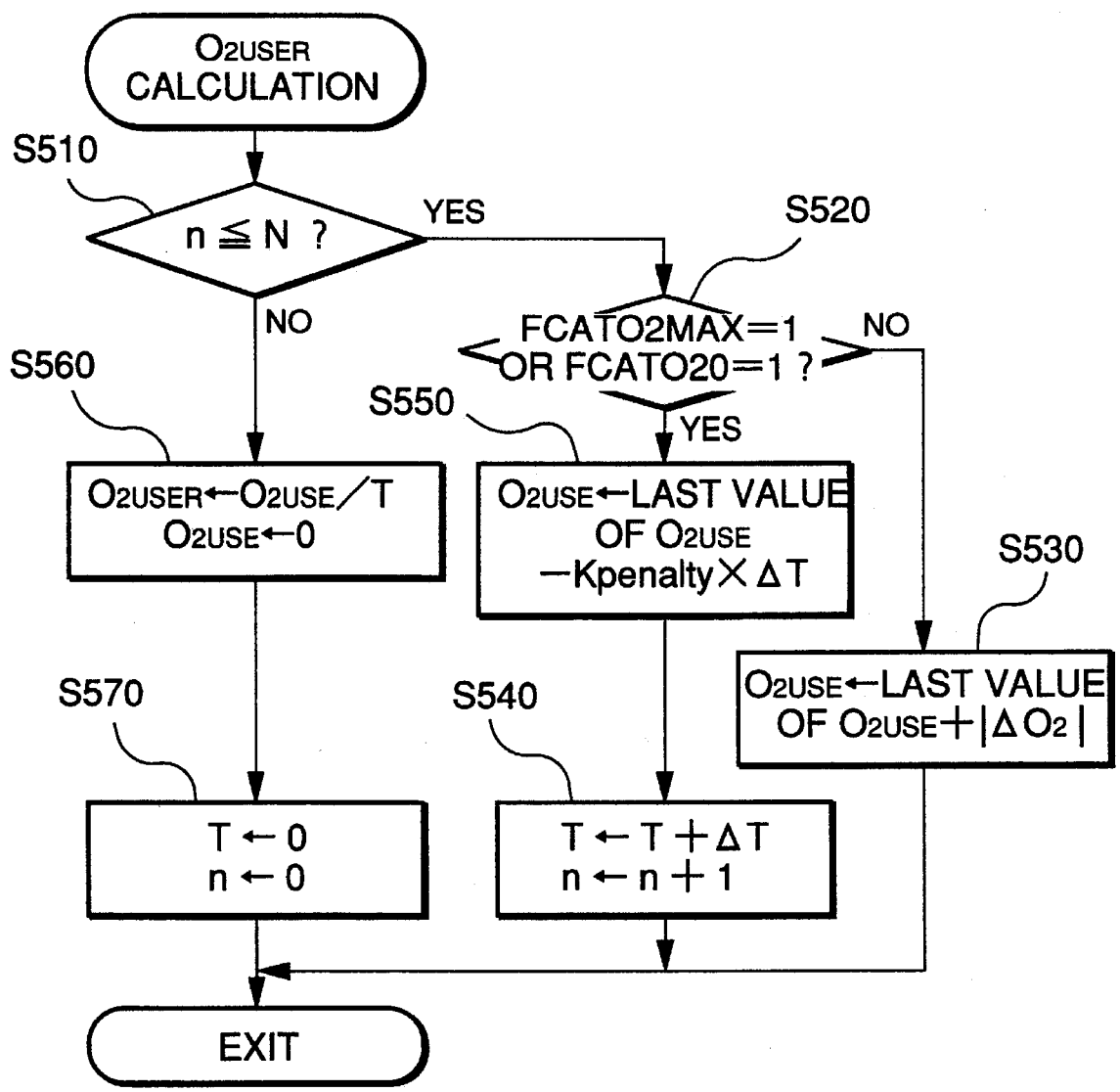
FIG. 20 is a flowchart showing a routine for calculating the O2 utilization factor O2USER.

FIG. 20 shows a program for calculating the O2 utilization factor O2USER. This routine is executed at predetermined time intervals, and the O2 utilization factor O2USER is calculated whenever the present routine is executed a predetermined number N of times. First, it is determined at a step S510 whether or not the number n of times of execution of the present routine exceeds the predetermined number N. If the answer is affirmative (YES), it is determined at a step S520 whether or not either the aforesaid flag FCATO2MAX or FCATO20 has been set to "1". If neither of the flag has been set to "1", a new value of the O2 utilization amount O2USE is calculated by adding a present value of the variation amount |ΔO2| to a last value of the O2 utilization amount O2USE at a step S530. Then, the value ΔT is added to the elapsed time period T and the number n of times of execution is incremented by "1", followed by terminating the present routine. On the other hand, if either of the flags FCATO2MAX, FCATO20 has been set to "1" at the step S520, the correction coefficient Kpenalty is subtracted from the last value of the O2 utilization amount O2USE at a step S550, and then the value ΔT is added to the elapsed time period T and the number n of times of execution is incremented by "1", followed by terminating the present routine. If the number n has reached the predetermined number N at the step S510, the O2USE value is divided by the elapsed time period T to obtain the O2 utilization factor O2USER and at the same time the O2 utilization amount O2USE is reset to "0" at a step S560. Then, the elapsed time period T and the number n of times of execution are reset to "0" at a step S570, followed by terminating the routine.

The above manner of calculation of the O2 utilization factor O2USER will be further explained with reference to FIG. 16: For example, in a range A of FIG. 16, the O2 storage amount O2STR in the catalytic converter 14 cyclically varies between 10% of the O2MAX value and 90% of the O2MAX value. However, the O2STR value falls below or exceeds those upper and lower limit values just before it is inverted. Consequently, the correction coefficient Kpenalty is applied so that the O2 utilization amount O2USE varies in the decreasing direction, to thereby set the O2USER value to a small value. In a range B of FIG. 16, the O2 storage amount O2STR in the catalytic converter 14 cyclically varies between 10% of the O2MAX value and 90% of the O2MAX value without deviating from the range, and consequently the O2 utilization amount O2USE increases, to thereby set the O2USER value to a large value. In a range C of FIG. 16, the repetition period of the lean/rich inversion of the air-fuel ratio is made shorter in order to increase the O2USER value. However, the O2 storage amount O2STR in the catalytic converter 14 cannot be used to a full extent, whereby the O2 utilization amount O2USE is decreased to a value lower than that in the range B.

Figure 21:
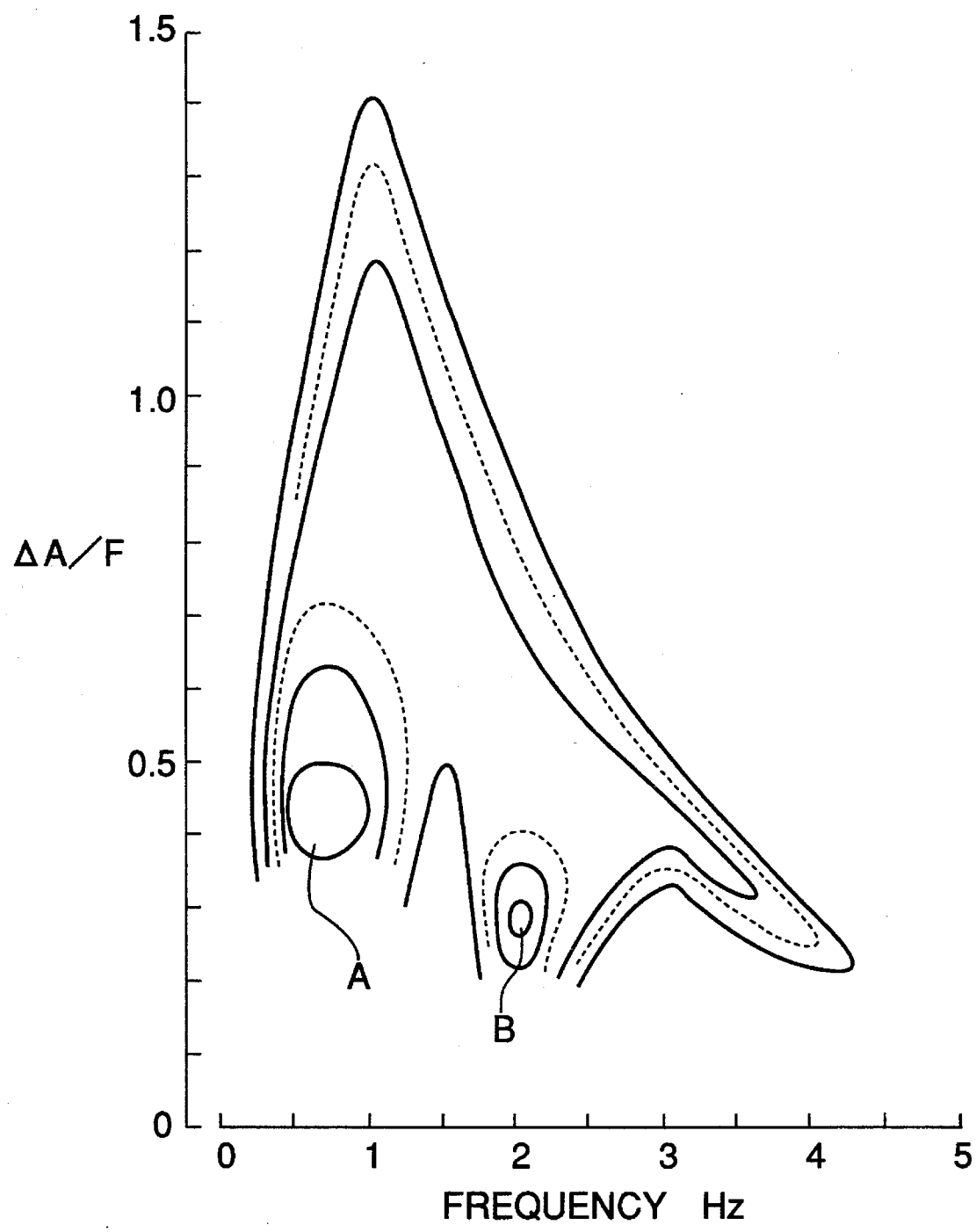
FIG. 21 is a graph showing the relationship between the HC purification rate of the catalytic converter and a perturbation frequency at a cross point between the CO concentration and the NOx concentration, obtained after the vehicle has traveled over 4 k miles.
Figure 22:
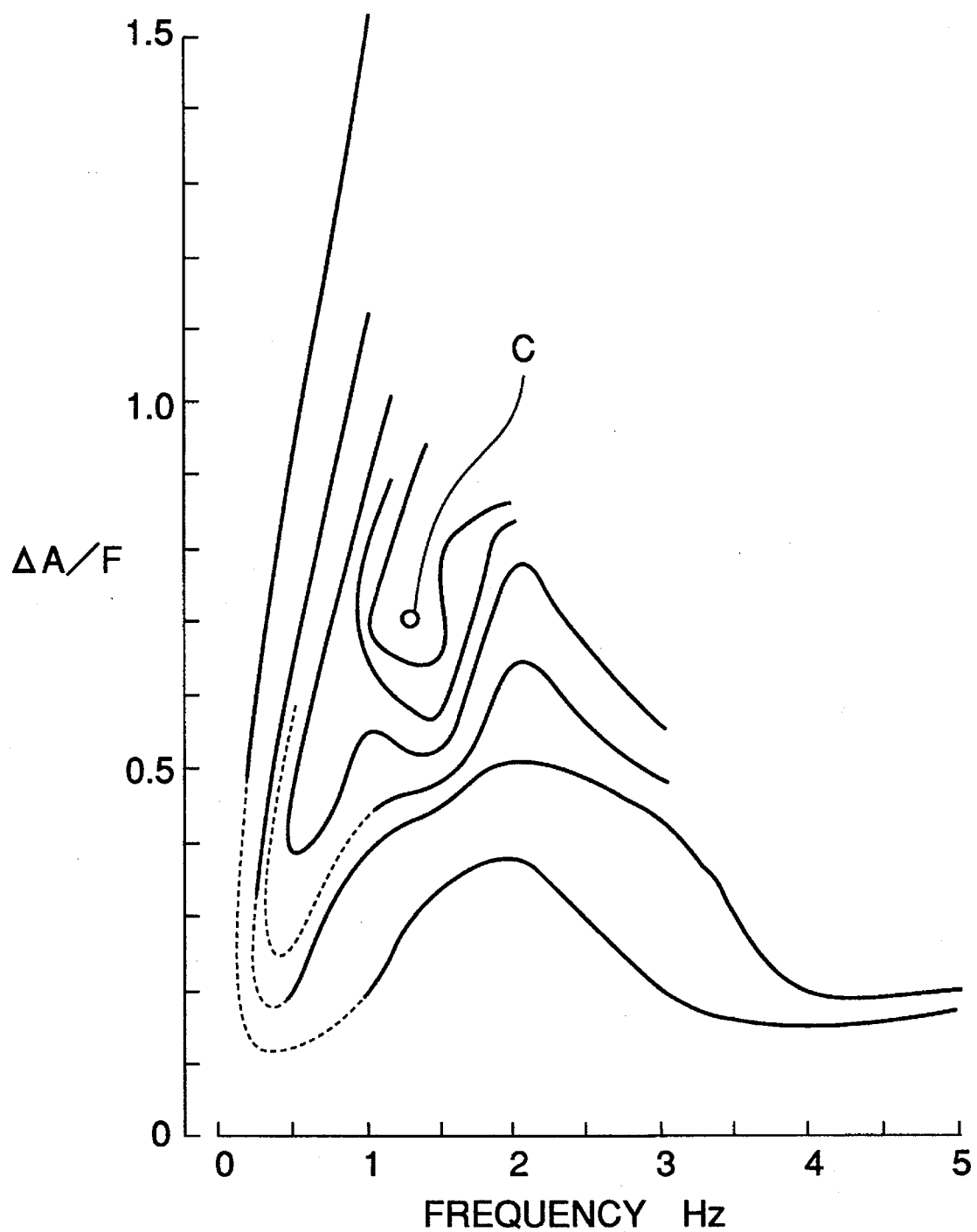
FIG. 22 is a graph showing the relationship between the HC purification rate of the catalytic converter and the perturbation frequency at a cross point between the CO concentration and the NOx concentration, obtained after the vehicle has traveled over 50 k miles.
Figure 23:
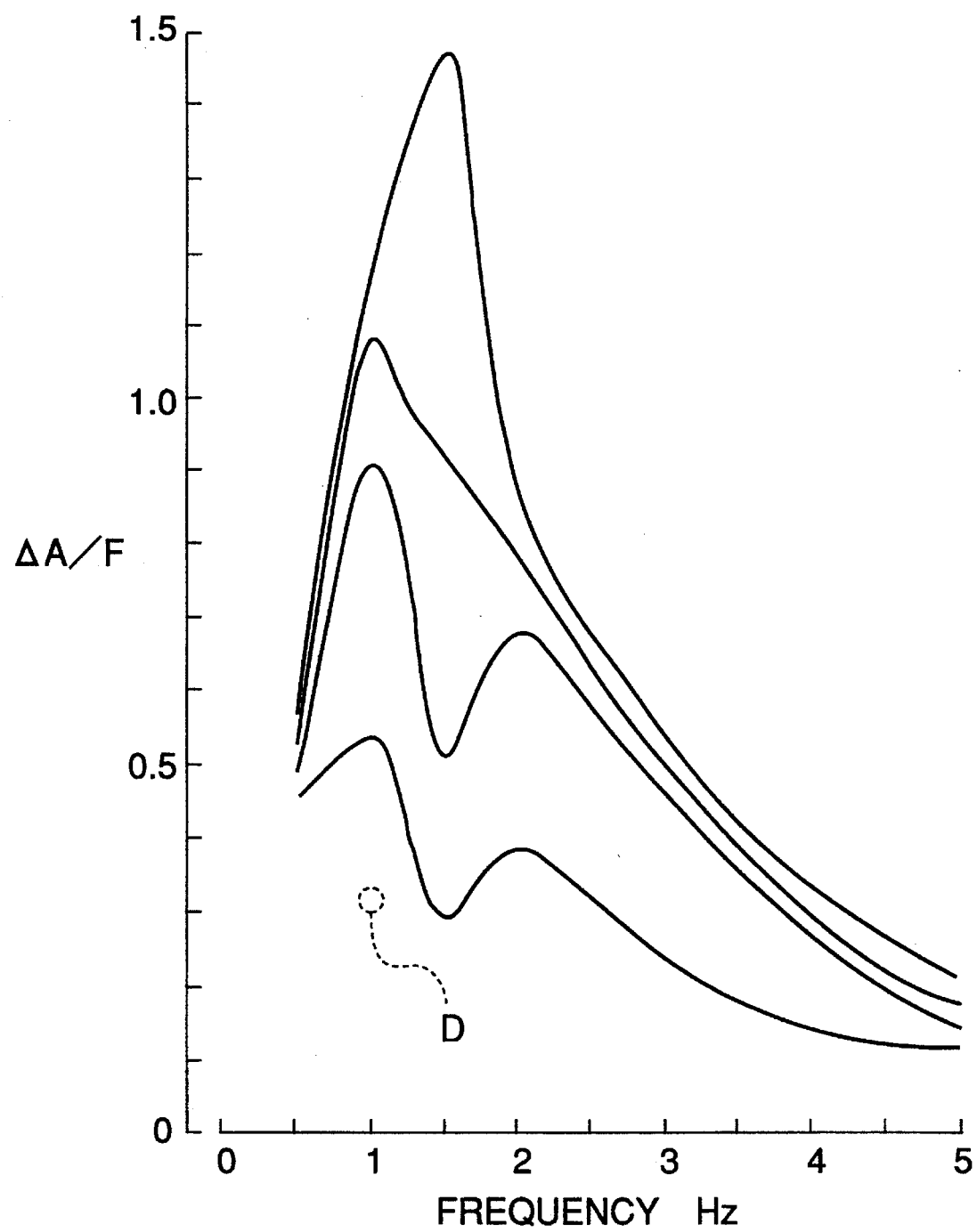
FIG. 23 is a graph showing the relationship between the CO/NOx purification rates of the catalytic converter and the perturbation frequency, obtained after the vehicle has traveled over 4 k miles.
Figure 24:
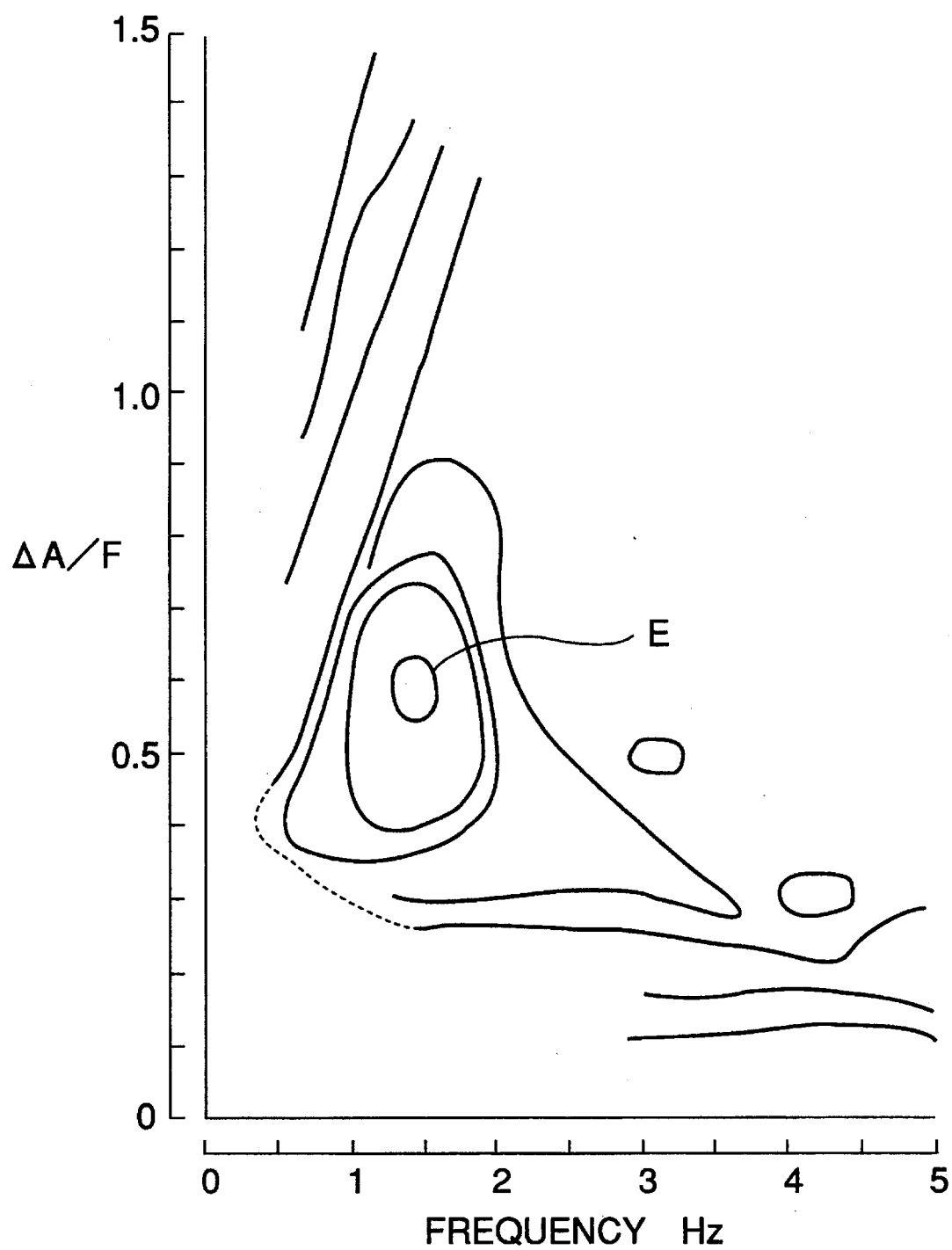
FIG. 24 is another graph showing the relationship between the CO/NOx purification rates of the catalytic converter and the perturbation frequency, obtained after the vehicle has traveled over 50 k miles.

FIGS. 21 and 22 both show the relationship between the HC purification rate of the catalytic converter 14 and the repetition period and amplitude of perturbation at a cross point between CO concentration and NOx concentration. The relationship of FIG. 21 has been obtained after the vehicle has traveled over 4 k miles, while that of FIG. 22 has been obtained after the vehicle has traveled over 50 k miles. Regions A and B in FIG. 21 and a region C in FIG. 22 show the highest purification rates of the catalytic converter 14. Therefore, it is desirable to carry out air-fuel ratio control in these regions where the catalytic converter 14 can achieve the highest purification rate, in order to improve exhaust emission characteristics of the engine. FIGS. 23 and 24 show the relationship between the CO/NOx purification rate of the catalytic converter 14 and the repetition period and amplitude of perturbation obtained under the same conditions as those of FIGS. 21 and 22. Incidentally, in a test which results in the relationship of FIG. 23, no region where the best purification rate is obtained was found. Symbol D in the figure represents a region where the best purification rate is supposed to be obtained.

Embodiment 1

[Processing 8 for controlling the air-fuel ratio]

Figure 25:
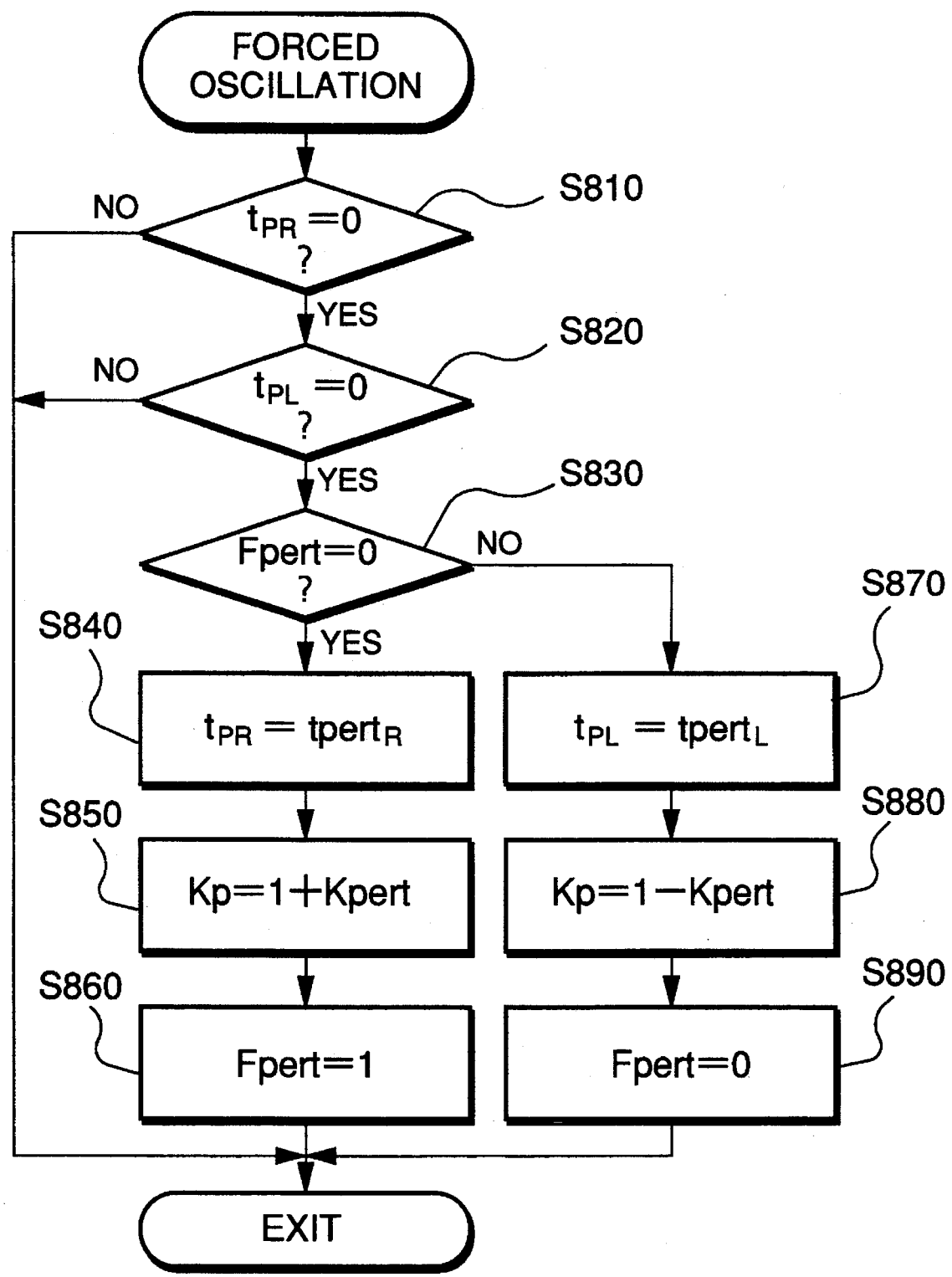
FIG. 25 is a flowchart showing a routine for executing perturbation of the air-fuel ratio.
Figure 26:
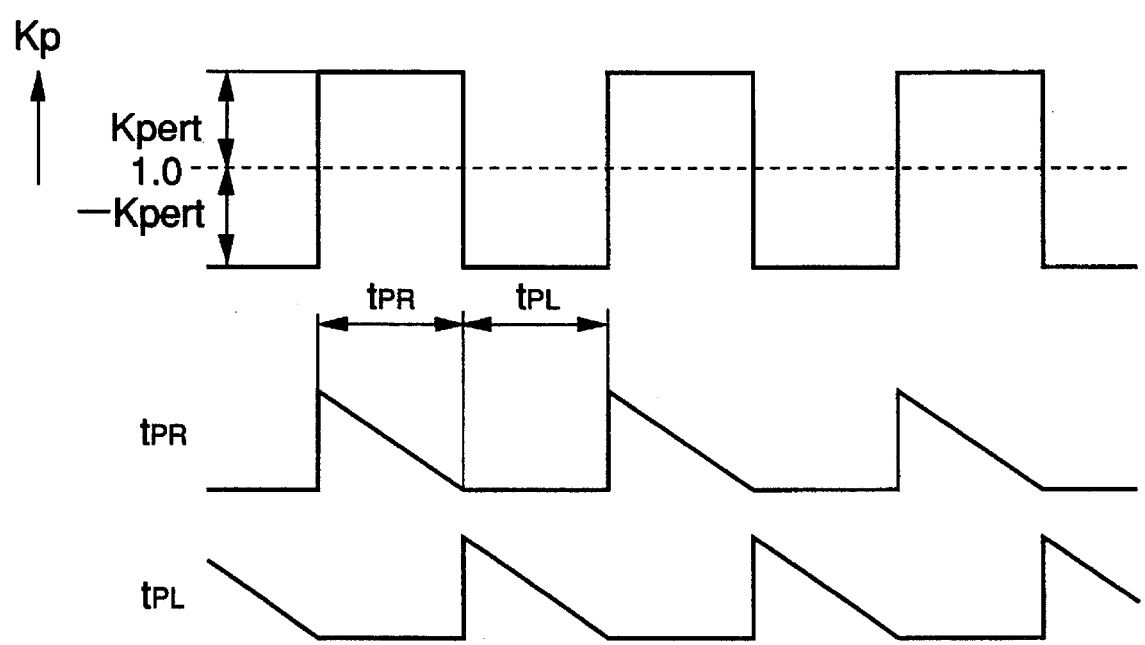
FIG. 26 is a timing chart showing amplitude Kpert and a repetition period tpertR, tpertL of the air-fuel ratio A/F used in execution of the perturbation.

Then, description will be made of forced oscillation of the air-fuel ratio A/F (perturbation) by using the O2 utilization factor O2USER calculated as above. FIG. 25 shows a program for executing the perturbation. FIG. 26 shows a timing chart showing the amplitude of the perturbation and the repetition period of the same. In the present embodiment, the amplitude and repetition period of a perturbation coefficient Kp of the fuel injection time period TOUT are changed.

First, at a step S810, it is determined whether or not a count value of a downtimer tPR for switching the air-fuel ratio from a rich state to a lean state is equal to "0". If the count value is not equal to "0", the present routine is terminated, whereas if the count value is equal to "0", it is determined at a step S820 whether or not a count value of a downtimer tPL for switching the air-fuel ratio from the lean state to the rich state is equal to "0". If the count value is not equal to "0", the present routine is terminated, whereas if the count value is equal to "0", it is determined at a step S830 whether or not a flag Fpert has been set to "0". If the flag Fpert has been set to "0", the downtimer tPR is set to a predetermined repetition period tpertR at a step S840, and the coefficient Kp is set to a value (1+Kpert) to bias the A/F value toward the rich side at a step S850. Then, the flag Fpert is set to "1" at a step S860, followed by terminating the present routine. On the other hand, if the flag Fpert is set to "1" at the step S830, the downtimer tPL is set to a predetermined repetition period tpertL at a step S870, and the coefficient Kp is set to a value (1−Kpert) to bias the A/F value toward the lean side at a step S880. Then, the flag Fpert is set to "0" at a step S890, followed by terminating the present routine.

By thus executing the present routine, the coefficient Kp changes about a value of 1.0 such that its waveform oscillates with the amplitude equal to the value Kpert and the repetition period equal to a value (tpertR+tpertL). Like a catalytic converter in general, the O2 utilization amount O2USE in the catalytic converter 14 is larger when the air-fuel ratio is on the rich side than when it is on the lean side, and therefore the values tpertL, tpertR are set so as to satisfy the relationship of tpertR<tpertL.

Figure 27:
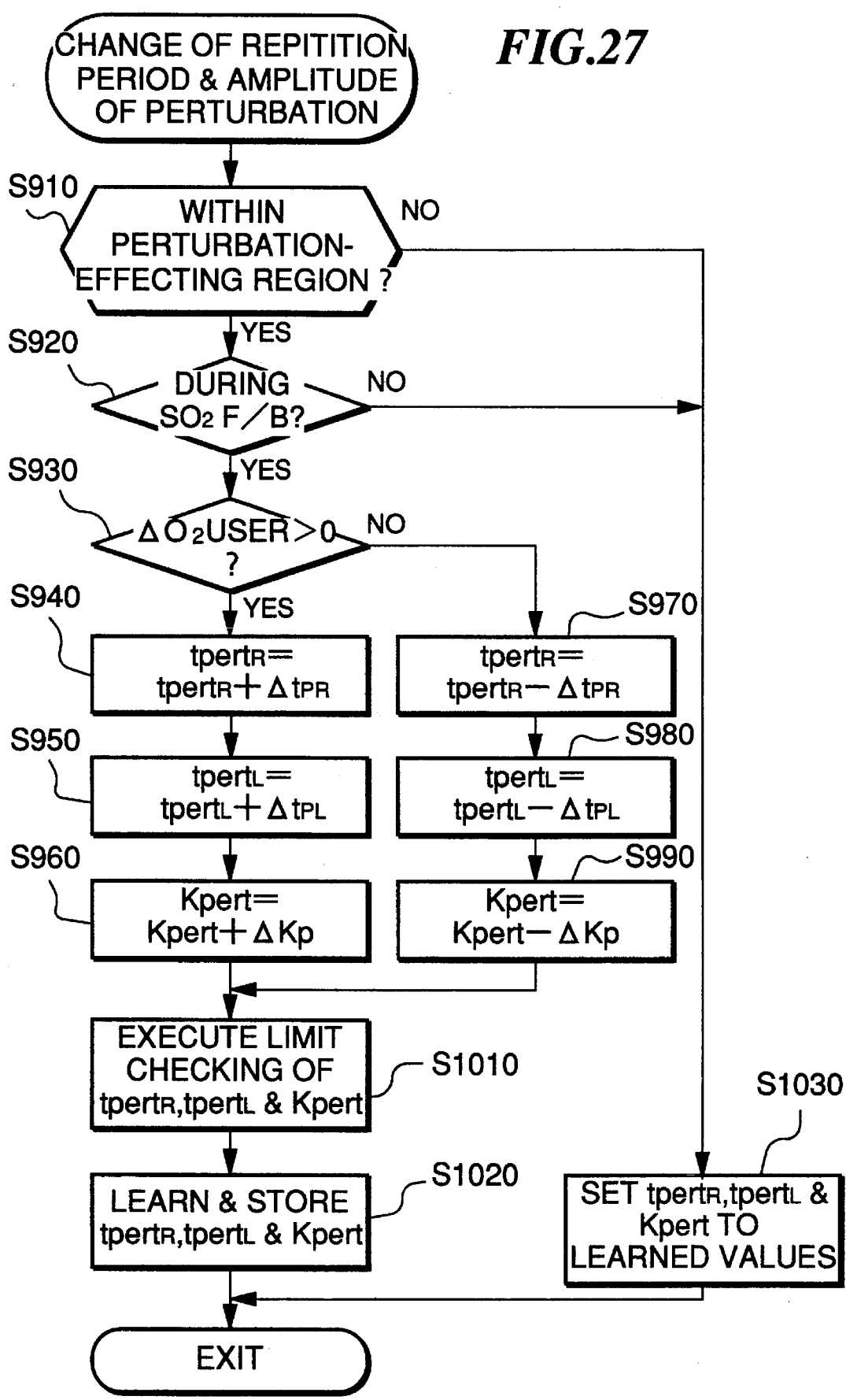
FIG. 27 is a flowchart showing a routine for changing the amplitude Kpert, and the repetition period tpertR, tpertL.

Then, a program for changing the amplitude Kpert and the repetition period (tpertR+tpertL) in response to the O2 utilization factor O2USER will be described with reference to FIG. 27.

First, it is determined at a step S910 whether or not the engine is operating in such a steady operating region suitable for executing the perturbation that the intake pipe absolute pressure PBA, the engine rotational speed NE, the vehicle speed VH, etc. are steady. If the engine is not in the steady operating region, the amplitude Kpert and the repetition period (tpertR+tpertL) are set to respective learned values and then stored at a step S1030, followed by terminating the present routine. If the engine is in the steady operating region where perturbation can be executed, it is determined at a step S920 whether or not air-fuel ratio feedback control (SO2F/B) responsive to an output from the downstream O2 sensor 16 is being executed. If the SO2F/B is not being executed, the program proceeds to the step S1030, followed by terminating the present routine.

If the SO2F/B is being executed, it is determined at a step S930 whether or not a variation amount $\Delta$O2USER in the O2 utilization factor O2USER is larger than "0" i.e. whether the O2 utilization factor O2USER is in the increasing direction or in the decreasing direction. If the O2USER value is in the increasing direction, the repetition period components tpertR and tpertL are increased by values $\Delta$tPR and $\Delta$tPL at steps S940 and S950, respectively, and the amplitude Kpert is increased by a value $\Delta$Kp at a step S960. On the other hand, if it is determined at the step S930 that the O2USER value is in the decreasing direction, the repetition period components tpertR and tertL are decreased by the values $\Delta$tPR and $\Delta$tPL at steps S970 and S980, respectively, and the amplitude Kpert is decreased by the value $\Delta$Kp at a step S990. Then, it is determined at a step S1010 whether or not the thus corrected values are within ranges between the respective limit values, and if any of the values falls outside the corresponding range, the former is limited to the latter. Then, learned values of the thus determined amplitude Kpert and repetition period (tpertR and tpertL) are calculated and stored at a step S1020, followed by terminating the present routine.

[Processing 9 for calculating the required fuel amount Tcyl to be drawn into the cylinder]

Then, a calculation is made of a required fuel amount Tcyl to be drawn into the cylinder, using the aforesaid coefficient Kp. That is, a basic fuel supply amount Ti is determined from the engine rotational speed NE and the intake pipe absolute pressure PBA, and the determined basic fuel supply amount Ti is multiplied by a correction coefficient Ktotal and the coefficient Kp, to thereby determine a basic required fuel amount $Tcyl_0$. In the processing, described hereinafter the basic required fuel amount $Tcyl_0$ thus determined is multiplied by the air-fuel correction coefficient KO2 calculated according to the processing 10, described hereinbelow, to thereby obtain a value $Tcyl_0 \times KO2$ as the required fuel amount Tcyl to be drawn into the cylinder. Therefore, the required fuel supply amount Tcycl can be expressed by the following equation (8):

$$Tcyl = Ti \times Kp \times KTOTAL \times KO2 \ldots \quad (8)$$

[Processing 10 for calculating the air-fuel ratio correction coefficient KO2]

Figure 28A:
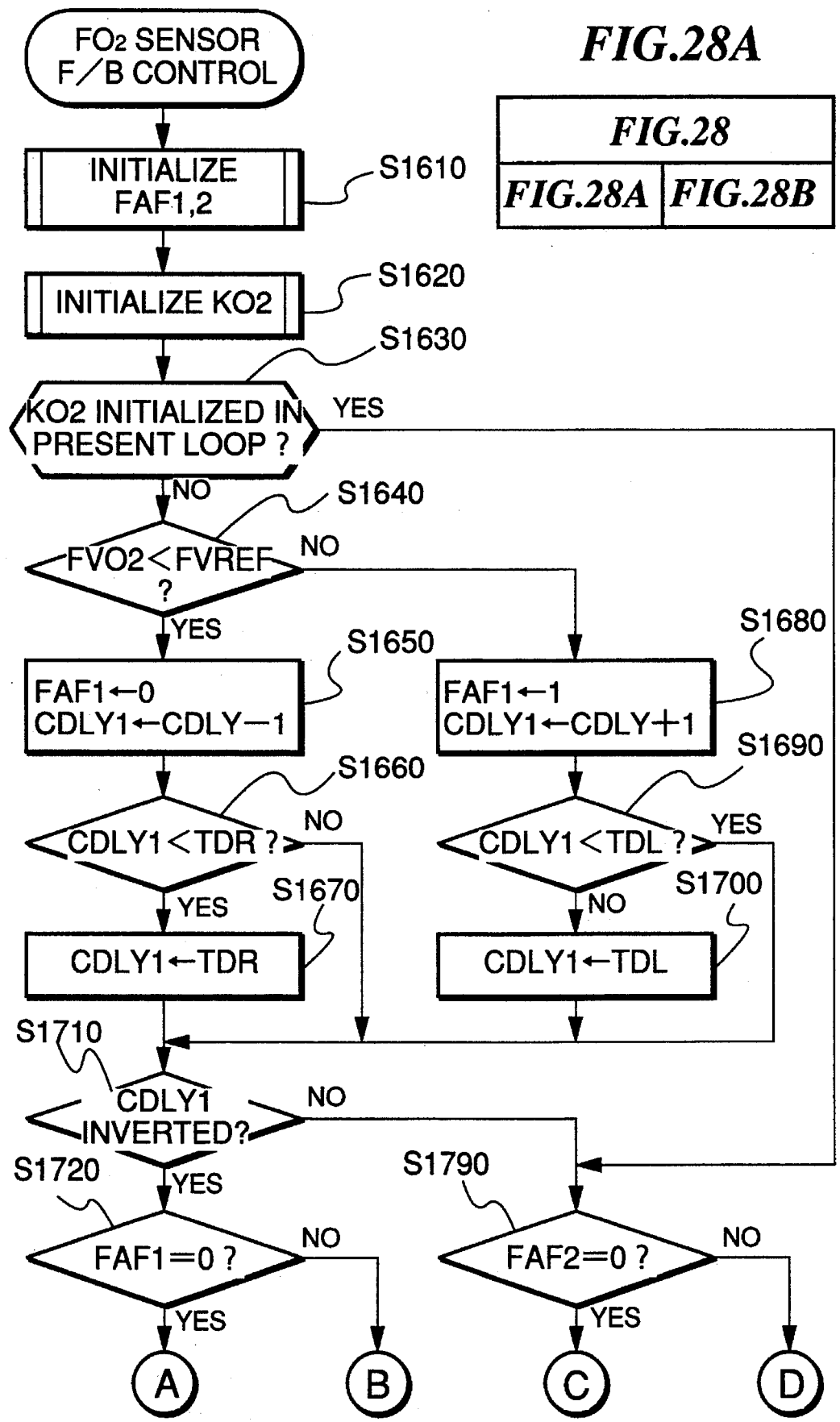
FIG. 28A is a flowchart showing a routine for calculating the air-fuel ratio correction coefficient KO2, based on an output from an O2 sensor arranged upstream of the catalytic converter.

FIGS. 28A and 28B show a program for calculating the air-fuel ratio correction coefficient KO2, based on voltage FVO2 output from the upstream O2 sensor 15.

At a step S1610, first and second lean/rich flags FAF1 and FAF2 are initialized. As shown at (a) and (b) in FIG. 30, the first lean/rich flag FAF1 is set to "1" when the output voltage FVO2 from the upstream O2 sensor 15 is higher than a reference voltage FVREF (e.g. 0.45 V), that is, when the output voltage FVO2 indicates a rich state of the air-fuel ratio, while, as shown at (d) in FIG. 30, the second lean/rich flag FAF2 is set to the same value as that of the flag FAF1 upon the lapse of a predetermined time period from a time point the first lean/rich flag FAF1 is inverted, i.e. a time point the flag FAF1 is changed from "0" to "1" or "1" to "0".

Figure 29:
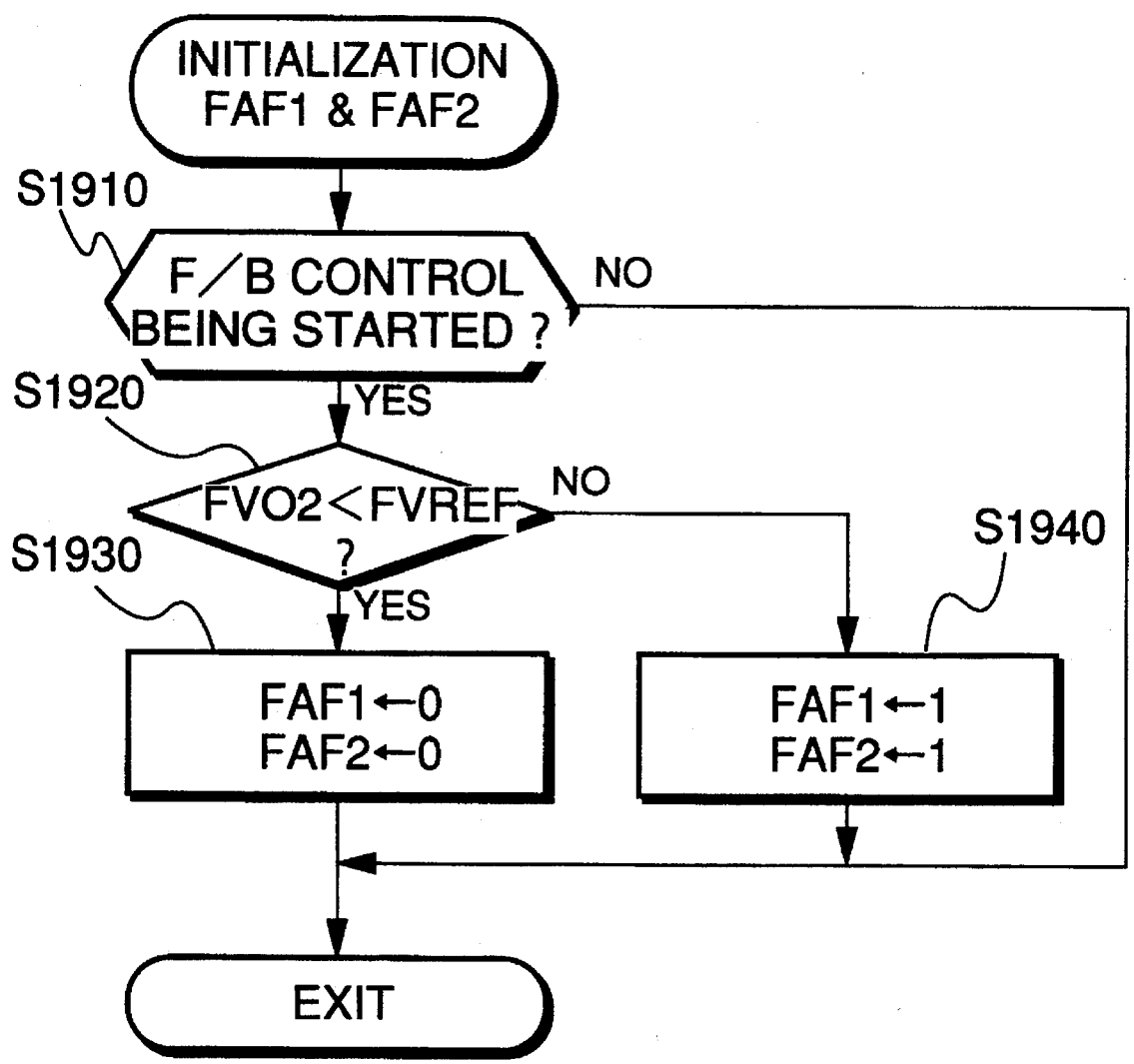
FIG. 29 is a flowchart showing a subroutine for initializing flags FAF1 and FAF2 used in the program of FIGS. 28A and 28B.

The initialization of these flags FAF1 and FAF2 is executed according to a subroutine shown in FIG. 29. Specifically, first, it is determined at a step S1910 whether or not the present loop is immediately after the start of the feedback control, i.e. whether or not the open-loop control was executed in the last loop and the feedback control has just been started in the present loop. If it is determined that the present loop is not the first loop of execution of the feedback control, it is not required to initialize the flags FAF1 and FAF2, and therefore the present program is immediately terminated.

If the present loop is the first loop of execution of the feedback control, it is determined at a step S1920 whether or not the output voltage FVO2 from the upstream O2 sensor 15 is lower than the reference voltage FVREF. If FVO2<FVREF stands, the first and second lean/rich flags FAF1 and FAF2 are both set to "0" at a step S1930, whereas if FVO2$\geq$FVREF, the flags are both set to "1" at a step S1940.

Referring again to the FIG. 28A program, the KO2 value is initialized at a step S1620. Specifically, if the present loop is immediately after the shift from the open loop control to the feedback control, or if the throttle valve 3 is suddenly opened during the feedback control, a learned value KREF to be calculated at a step S1870, referred to hereinafter, is applied as an initial value of the KO2 value. If the present loop is in a condition other than the above conditions, no initialization of the KO2 value is executed at the step S1620.

At the following step S1630, it is determined whether or not the KO2 value has been initialized in the present loop. If it is determined that the KO2 value has been initialized, the program jumps to a step S1790, whereas if the initialization has not been executed, the program proceeds to a step S1640.

When the feedback control is being started, the answer to the question of the step S1630 is affirmative (YES), and hence at steps S1790 to S1840 an initial value of a P term-generation delay counter CDLY1 is set and integral control (I term control) of the KO2 value is executed in response to the values of the lean/rich flags FAF1 and FAF2. The counter CDLY1 measures, as shown at (b), (c) and (d) in FIG. 30, a delay time from a time point the first lean/rich flag FAF1 is inverted to a time point the second lean/rich flag FAF2 is inverted, i.e. a time period from a time point the O2 sensor output FVO2 is inverted to a time point the proportional control (P term control) is executed.

At the step S1790, it is determined whether or not the second lean/rich flag FAF2 has been set to "0". If FAF2="0", the program proceeds to the step S1800 of FIG. 28B, wherein it is determined whether or not the first lean/rich flag FAF1 has been set to "0". On the other hand, if FAF2="1", the program proceeds to the step S1830 of FIG. 28B, wherein it is determined whether or not the first lean/rich flag FAF1 is set to "1". When the feedback control is being started, if FVO2<FVREF, both of the flags FAF1 and FAF2 are set to "0" (see FIG. 29), and therefore the program proceeds via the steps S1790 and S1800 to the step S1810, wherein the counter CDLY1 is set to a predetermined negative value TDR. If FVO2$\geq$FVREF, the flags FAF1 and FAF2 are both set to "1", and therefore the program proceeds via the steps S1790 and S1830 to the step S1840, wherein the counter CDLY1 is set to a predetermined positive value TDL. If both of the flags FAF1 and FAF2 are not equal to "0" or "1", the counter CDLY1 is not initialized. If FAF2=0, a predetermined value I is added to the KO2 value at the step S1820, whereas if FAF2=1, the predetermined value I is subtracted from the KO2 value at the step S1850, followed by the program proceeding to a step S1860. In the present embodiment, the TDR and TDL values are fixed values, whereas in a second embodiment, described hereinafter, they are varied in response to the O2 storage amount O2STR value.

If the answer to the step S1630 of FIG. 28A is negative (NO), i.e. if the KO2 value has not been initialized in the present loop, the program proceeds to the step S1640, wherein it is determined whether or not the upstream O2 sensor output voltage FVO2 is lower than the reference voltage FVREF. If FVO2<FVREF, the program proceeds to a step S1650, wherein the first lean/rich flag FAF1 is set to "0" and the P-term generation delay counter CDLY1 is decremented by "1" (see T4 and T10 at (c) in FIG. 30). Then, it is determined at a step S1660 whether or not the count value of the counter CDLY1 is smaller than the predetermined negative value TDR. If CDLY1<TDR, the counter CDLY1 is set to the value TDR at a step S1670, whereas if CDLY≧TDR, the program jumps to a step S1710.

Figure 30:
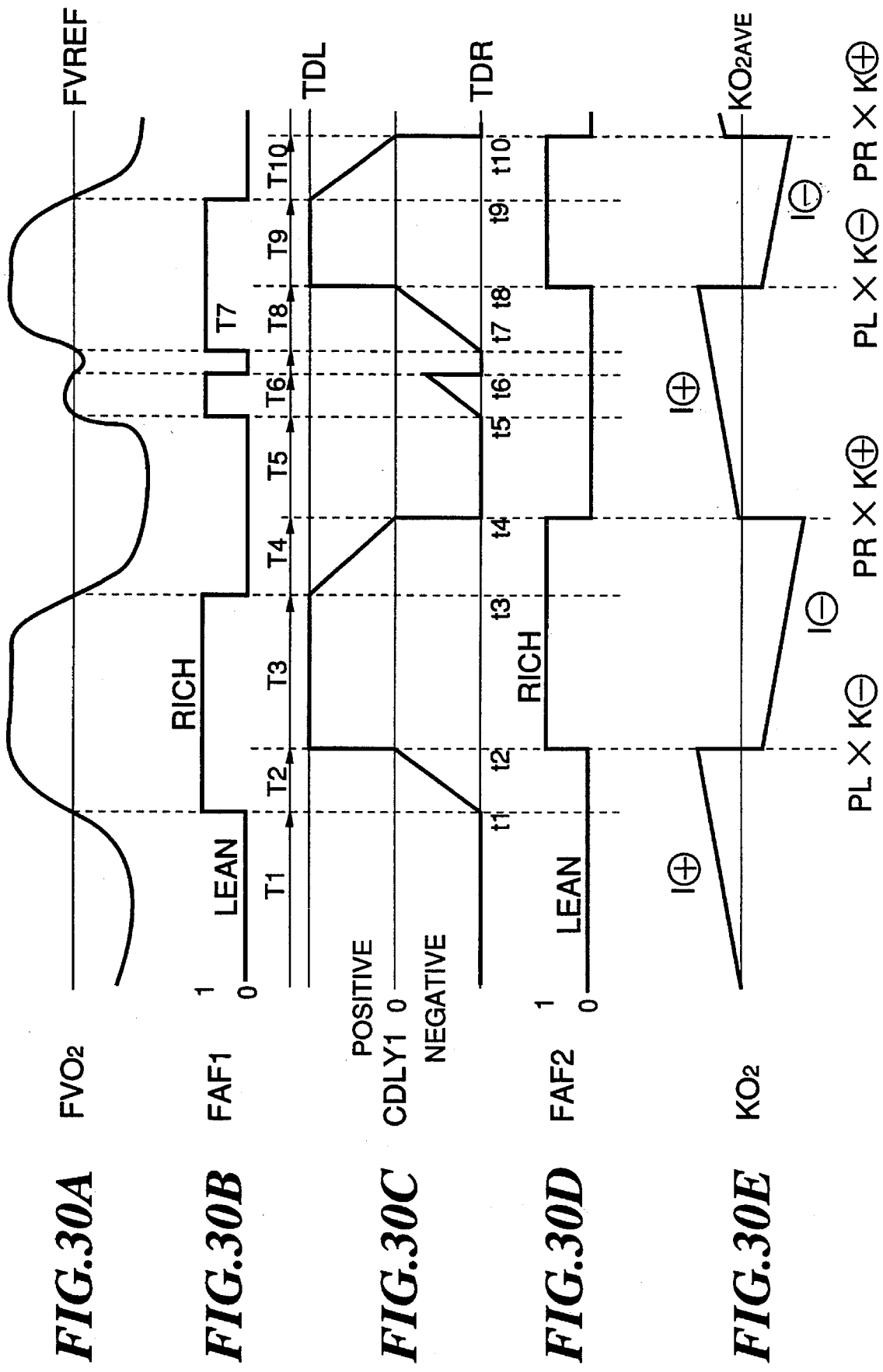
FIG. 30 is a timing chart useful in explaining the calculation of the KO2 value by the program of FIGS. 28A and 28B.

If the answer to the step S1640 is negative (NO), i.e. if FVO2≧FVREF, the first lean/rich flag FAF1 is set to "1" and the counter CDLY1 is incremented by 1 at a step S1680 (see T2, T6 and T8 at (c) in FIG. 30). Then, it is determined at a step S1690 whether or not the count value of the counter CDLY1 is smaller than the predetermined positive value TDL. If CDLY1≧TDL, the counter CDLY1 is set to the value TDL at a step S1700, whereas if CDLY1≦TDL, the program jumps to the step S1710.

In this way, the steps S1660, S1670, S1690 and S1700 function so that the count value of the counter CDLY1 does not become smaller than the predetermined negative value TDR nor larger than the predetermined positive value TDL.

At the step S1710, it is determined whether or not the sign (plus or minus sign) of the count value of the counter CDLY1 has been inverted. If the sign has not been inverted, the I term control is executed at the steps S1790 to S1850, whereas if the sign has been inverted, the P term control is executed at steps S1720 to S1780.

Figure 31:
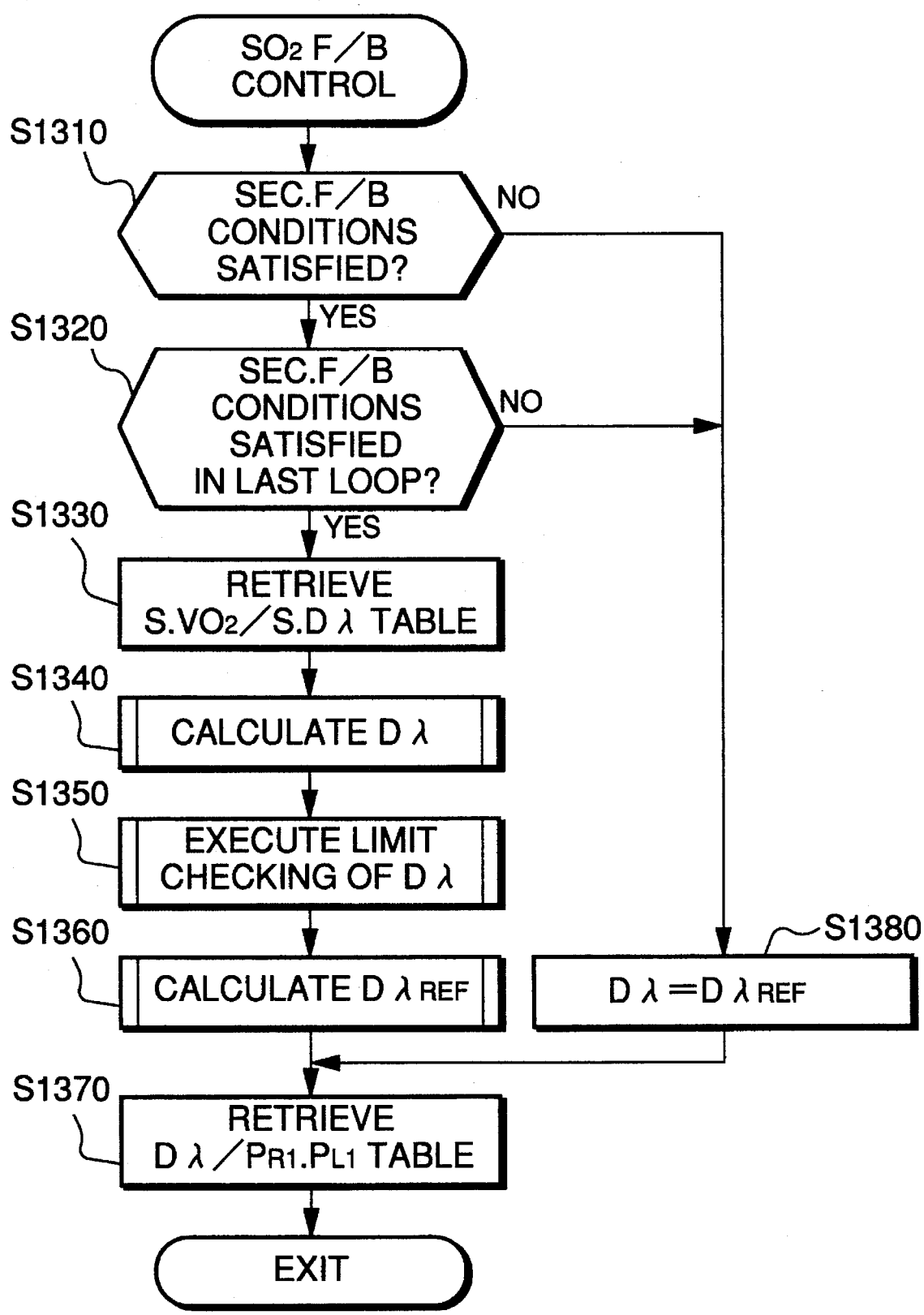
FIG. 31 is a flowchart showing a routine for controlling the air-fuel ratio, based on an output from an O2 sensor downstream of the catalytic converter.

At the step S1770, it is determined whether or not the first lean/rich flag FAF1 has been set to "0". If FAF1=0, the program proceeds to the step S1730 of FIG. 28B, wherein the second lean/rich flag FAF2 is set to "0", and then the count value of the counter CDLY1 is set to the predetermined negative value TDR at the step S1740. Further, the correction coefficient KO2 is calculated at the step S1750 by the use of the following equation (9) (see time points t4 and t10 in FIG. 30):

$$KO2=KO2+(PR1+PR2)\times K \ldots \quad (9)$$

where PR1 represents a first enriching proportional term (P term) responsive to the output from the downstream O2 sensor obtained from a program of FIG. 31, described hereinafter. PR2 represents a second enriching proportional term (P term) responsive to the O2STR value obtained from a program of FIG. 40, described hereinafter, which is set to "0" in the first embodiment. K represents a P term correction coefficient, which is read from a map, not shown, set in accordance with the engine rotational speed NE and the intake pipe absolute pressure PBA.

If the answer to the step S1720 is negative (NO), i.e. if FAF1=1, the second lean/rich flag FAF2 is set to "1" at the step S1760, and the count value of the counter CDLY1 is set to the predetermined positive value TDL at the step S1770. Further, the correction coefficient KO2 is calculated at the step S1780, by the use of the following equation (10) (see time points t2 and t8 in FIG. 30):

$$KO2=KO2-(PL1+PL2)\times K \ldots \quad (10)$$

where PL1 represents a first leaning proportional term (P term), which is obtained from the program of FIG. 31, described hereinafter, similarly to the PR1 value. PL2 represents a second leaning proportional term (P term), which is obtained from the program of FIG. 40, described hereinafter, similarly to the PL2 value, which is set to 0 in the first embodiment. At the following step S1860, limit checking of the KO2 value is carried out, and the learned value KREF of the KO2 is calculated at the step S1870. Further, limit checking of the KREF value is carried out at a step S1880, followed by terminating the program.

According to the program of FIGS. 28A and 28B described above, as shown in FIG. 30, the P term control is executed (time points t2, t4, t8 and t10) after a predetermined delay time (T2, T4, T8 and T10) from a time point the upstream O2 sensor output voltage FVO2 is inverted (time points t1, t3, t7 and t9). During a time period over which the second lean/rich flag FAF2 is set to "0", the I term control for increasing the KO2 value is executed (T1, T2 and T5 to T8), whereas during a time period over which the flag FAF2 is equal to "1" the I term control for decreasing the KO2 value is executed (T3, T4, T9 and T10). Incidentally, the O2 sensor output FVO2 varies with a short repetition period over a time period from the time point t5 to the time point t7, however, the period of variation in the sensor output FVO2 is shorter than the delay time of the P term control corresponding to the predetermined negative value TDR1, and therefore, the second lean/rich flag FAF2 is not inverted, resulting in no execution of the P term control over the above time period.

Figure 32:
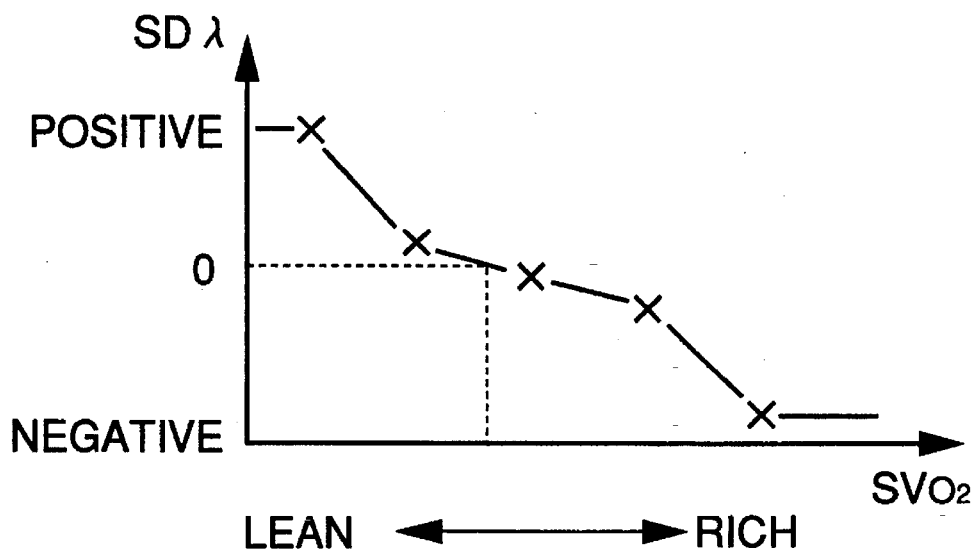
FIG. 32 is a graph showing the relationship between a deviation amount SDA and an output SVO2 from the downstream O2 sensor.

Next, description will be made of air-fuel ratio feedback control based on the downstream O2 sensor 16, with reference to FIG. 31. First, it is determined at a step S1310 whether or not conditions for executing air-fuel ratio feedback control based on the downstream O2 sensor 16 are satisfied. Then, it is determined at a step S1320 whether or not the above conditions were satisfied in the last loop. If the answers to the steps S1310 and S1320 are both affirmative (YES), a table shown in FIG. 32 is retrieved to determine a deviation amount SD A from the stoichiometric value toward the lean/rich side, based on the output VO2 from the downstream O2 sensor 16, at a step S1330. Then, at a step S1340, proportional integral calculation is executed based on the deviation amount SDλ thus determined, by the use of the following equation (11):

$$D\lambda(n)=D\lambda(n-1)+KI\times SD\lambda+Kp\times SD\lambda \ldots \quad (11)$$

Then, it is determined at a step S1350 whether or not the calculated Dλ value exceeds a limit value thereof, and if it exceeds the limit value, the calculated Dλ value is set to the limit value. Then, a learned value DλREF of the Dλ value is calculated at a step S1360, by the use of the following equation (12):

$$D\lambda REF=\alpha\times D\lambda+(1-\alpha)\times D\lambda REF \ldots \quad (12)$$

Figure 33:
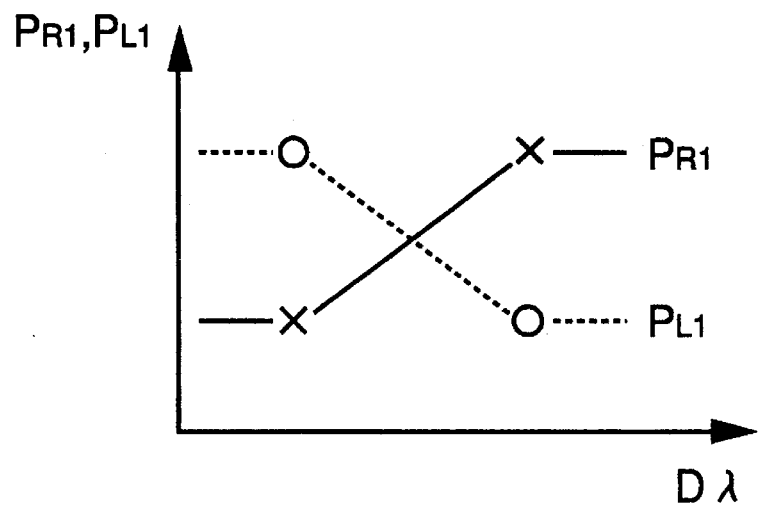
FIG. 33 is a graph showing the relationship between the deviation amount SDλ and P term gains PR and PL.

Then, a table shown in FIG. 33 is retrieved to determine first P term gains PR1 and PL1 corresponding to the Dλ value, at a step S1370. If the conditions for executing the air-fuel ratio feedback control are not satisfied at the step S1310 or S1320, the learned value DλREF is applied as the Dλ value at a step S1380, and then the table shown in FIG. 33 is retrieved to determine the first P term gains PR1 and PL1 corresponding to the Dλ value thus applied. The first P term gains PR1 and PL1 corresponding to the Dλ value are used for calculating the KO2 value in the aforedescribed program for calculating the air-fuel ratio correction coefficient KO2. Thus, the above calculated air-fuel ratio correction coefficient KO2 is reflected upon the fuel injection period TOUT.

[Processing 11 for controlling the adherent fuel amount]

Description will be made of correction of fuel transfer delay during execution of adherent fuel control, hereinbelow. First, the principle of the correction of fuel transfer delay will be described with reference to FIGS. 34 to 38.

Figure 34:
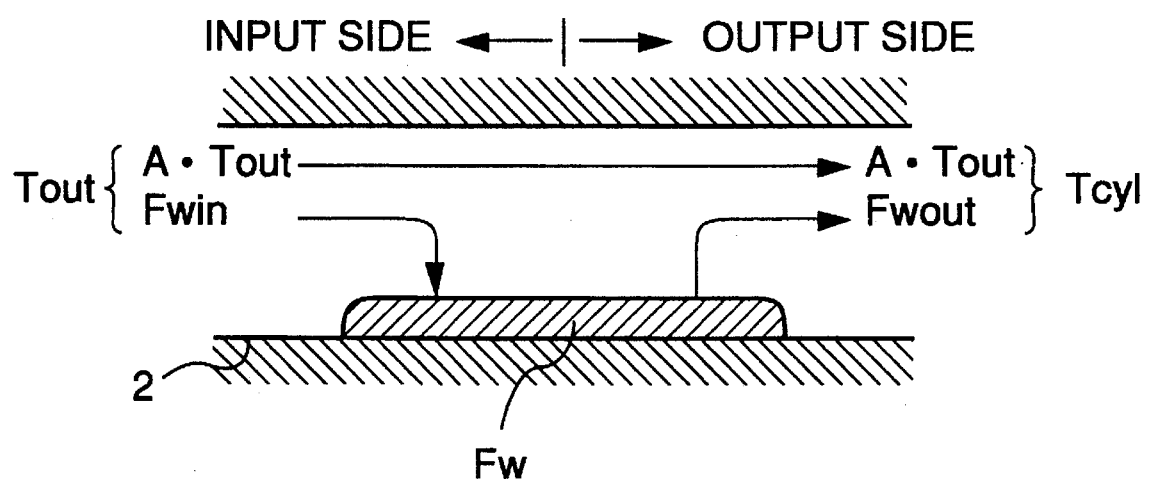
FIG. 34 is a schematic diagram showing the conception of correction of a fuel transfer delay time.

FIG. 34 shows the relationship between the fuel injection amount Tout and the required fuel amount Tcyl.

In the figure, Tout represents a fuel injection amount injected from the fuel injection valve 6 into the intake pipe 2 in an operating cycle of the engine. Out of the fuel injection amount Tout, an amount equal to A×Tout (A: direct supply ratio) is directly supplied to the cylinder without adhering to the wall surface of an intake port of the engine, and the remaining amount of the injected fuel is added to an amount Fw of fuel which adhered to the wall surface up to the last operating cycle of the engine, as a new additional amount Fwin of adherent fuel. The direct supply ratio A is the ratio of a fuel amount directly drawn into a combustion chamber in an operating cycle of the engine to the whole fuel amount injected in the same operating cycle, and set in a relationship of 0<A<1.

The sum of the above-mentioned product (A×Tout) and an amount Fwout of adherent fuel which is carried off the amount Fw of fuel adhering to the wall surface is set as the required fuel amount Tcyl which is required to be supplied into the cylinder.

Next, a first method of correcting the fuel transfer delay will be described.

The first method is based upon the concept that the carried-off amount Fwout is carried off with a predetermined time delay relative to supply of the additional amount Fwin. This concept is expressed as a first-order delay model, wherein the delay degree of the carried-off amount Fwout is represented by a delay coefficient (time constant) T.

As described hereinabove, the required fuel amount Tcyl is expressed by the following equation (13):

$$Tcyl = A \times Tout + Fwout \ldots \quad (13)$$

Therefore, the fuel injection amount Tout and the additional amount Fwin can be expressed by the following equations (14) and (15), respectively:

$$Tout = (Tcyl - Fwout)/A \ldots \quad (14)$$

$$Fwin = (1-A) \times Tout \ldots \quad (15)$$

Since the carried-off amount Fwout is equal to the first-order delay model of the additional amount Fwin, a value Fwout (n) of the carried-off amount Fwout in the present loop can be expressed by the following equation (16):

$$Fwout(n) = Fwout(n-1) + (Fwin(n-1) - Fwout(n-1))/T \ldots \quad (16)$$

According to the equation (16), the value of the carried-off amount Fwout(n) in the present loop is larger than a last value Fwout(n−1) thereof, by a value 1/T times as large as the difference between the additional amount Fwin and the carried-off amount Fwout. In short, whenever the calculation according to the equation (16) is carried out every operating cycle of the engine, the carried-off amount Fwout becomes closer to the additional amount Fwin by 1/T times as large as the difference.

Figure 35:
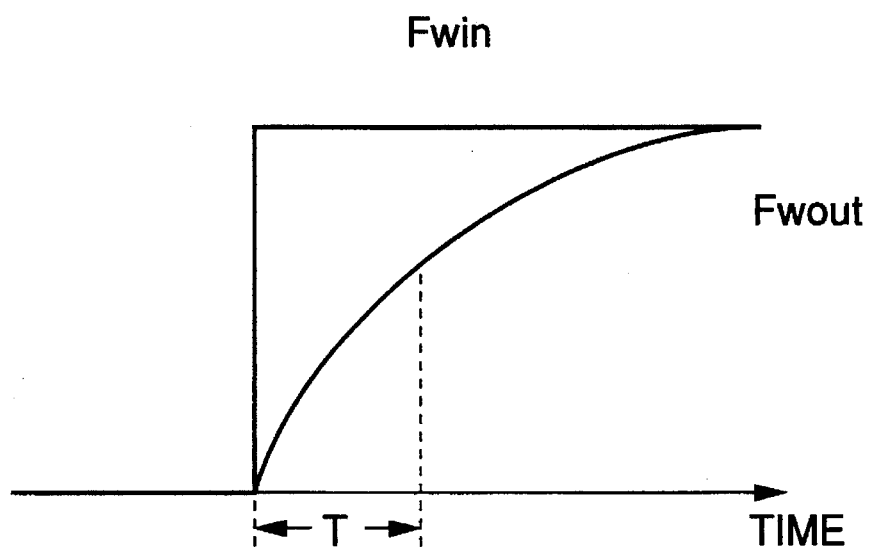
FIG. 35 is a graph showing a change in an additional amount Fwin of adherent fuel and a change in a carried-off amount Fwout of adherent fuel with the lapse of time.

For example, if the fuel injection amount Tout is stepwise increased, the additional amount Fwin also stepwise increases as shown in FIG. 35 provided that the direct supply ratio A remains constant. On the other hand, the carried-off amount Fwout progressively increases to the additional amount Fwin, at a rate based on the time constant T. The time constant T represents a time period required for the carried-off amount Fwout to reach 63.2% of the whole carried-off amount after the carried-off amount Fwout starts to increase. The T value is determined based on operation conditions of the engine, as described hereinbelow.

Thus, the fuel injection amount Tout can be calculated by the use of the equations (14), (15) and (16).

Figure 36:
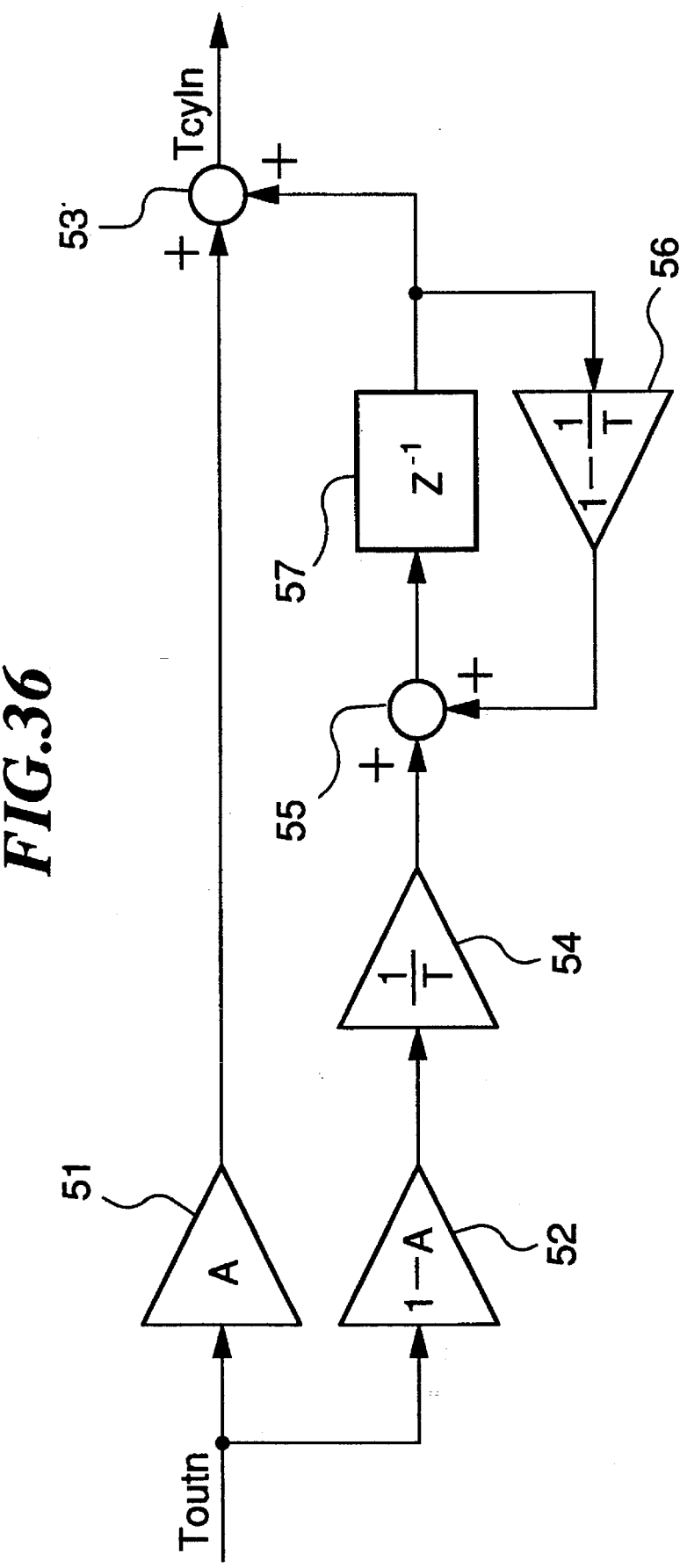
FIG. 36 is a schematic diagram showing a physical model circuit modeled on fuel transfer delay correct according to an AT method.

FIG. 36 schematically shows a physical model circuit modeled on the fuel transfer delay correction according to the first method (hereinafter referred to as "the A-T method") described above.

In the figure, a fuel injection amount Tout(n) injected from the fuel injection valve 6 in one operating cycle (n) of the engine is multiplied by the value A (direct supply ratio) at a multiplier 51, while it is multiplied by the (1−A) value at a multiplier 52. An output from the multiplier 51, i.e. a value (A×Tout(n)) is supplied to an adder 53, where the carried-off amount Fwout(n) in the present loop is added to the (A×Tout(n)) value, into the required fuel amount Tcyl(n) to be applied in the present loop.

On the other hand, an output from the multiplier 52, i.e. the additional amount Fwin(n) in the present loop, which is the amount Fwin(n)=(1−A)×Tout(n) obtained by the equation (15). The Fwin(n) value is multiplied by 1/T at a multiplier 54, which supplies the resulting output to an adder 55, where an output from a multiplier 56 is added to the output from the multiplier 54. The output from the multiplier 56 is the product of a value (1−1/T) and the carried-off amount Fwout(n) from a cycle delay circuit 57.

The carried-off amount Fwout(n) supplied to the adder 53 is an output from the cycle delay circuit 57 which delays an input thereto by one cycle of the cylinder, and therefore an input supplied to the cycle delay circuit 57 becomes a carried-off amount Fwout (n+1) to be applied in the next cycle of the cylinder.

Therefore, the output from the adder 55, i.e. the carried-off amount Fwout(n+1) supplied to the cycle delay circuit 57 is expressed by the following equation (17):

$$\begin{aligned} Fwout(n+1) &= Fwin(n)/T + (1 - 1/T) \times Fwout(n) \quad (17) \\ &= Fwout(n) + (Fwin(n) - Fwout(n))/T \end{aligned}$$

where Fwin(n)=(1−A)×Tout(n).

This equation (17) corresponds to the above equation (16).

Next, a second method of correcting the fuel transfer delay will be described.

The second method is disclosed by Japanese Provisional Patent Publication (Kokai) No. 1-305142, wherein in addition to the direct supply ratio A, a carry-off ratio B (0<B<1) is employed for correcting the fuel transfer delay. The carry-off ratio B represents the ratio of an amount of fuel carried off the fuel adhering to the inner wall of the intake port and drawn into the combustion chamber of the engine by evaporation, etc. in the present operating cycle to the amount of fuel which adhered to the wall surface of the intake port up to the immediately preceding cycle. In the second method, similarly to the first method, the value A×Tout is employed, which is an amount directly supplied to the cylinder without adhering to the wall surface of the intake port, as well as the product ((1−A)×Tout), which is equal to the additional amount Fwin of adherent fuel, whereas the carried-off amount Fwout of adherent fuel is employed, which is a product B×Fw out of the wall surface adherent fuel amount Fw at the start of the present cycle.

As stated above, the required fuel amount Tcyl is determined as follows:

$$Tcyl = A \times Tout + Fwout \ldots \quad (13)$$

The carried-off amount Fwout and the additional amount Fwin can be expressed by the following equations (18) and (19):

$$Fwout = B \times Fw \ldots \quad (18)$$

$$Fwin = (1-A) \times Tout \ldots \quad (19)$$

Therefore, an amount Fw(n) of fuel adhering to the wall surface in the present loop changes with respect to an adherent fuel amount Fn(n−1) calculated up to the immediately preceding loop by the difference between the additional amount Fwin and the carried-off amount Fwout. Thus, the adherent fuel amount Fw(n) in the present loop can be expressed by the following equation (20):

$$\begin{aligned} Fw(n) &= Fw(n-1) + Fwin - Fwout \\ &= Fw(n-1) + (1-A) \times Tout - B \times Fw(n-1) \\ &= (1-A) \times Tout + (1-B) \times Fw(n-1) \end{aligned} \quad (20)$$

Further, the fuel injection amount Tout can be expressed by the equation (21), by substituting the equation (18) into the equation (14) transformed from the above equation (13):

$$\begin{aligned} Tout &= (Tcyl - Fwout)/A \\ &= (Tcyl - B \times Fw)/A \end{aligned} \quad (21)$$

Thus, the fuel injection amount Tout can be calculated by the use of the equations (20) and (21).

Figure 37:
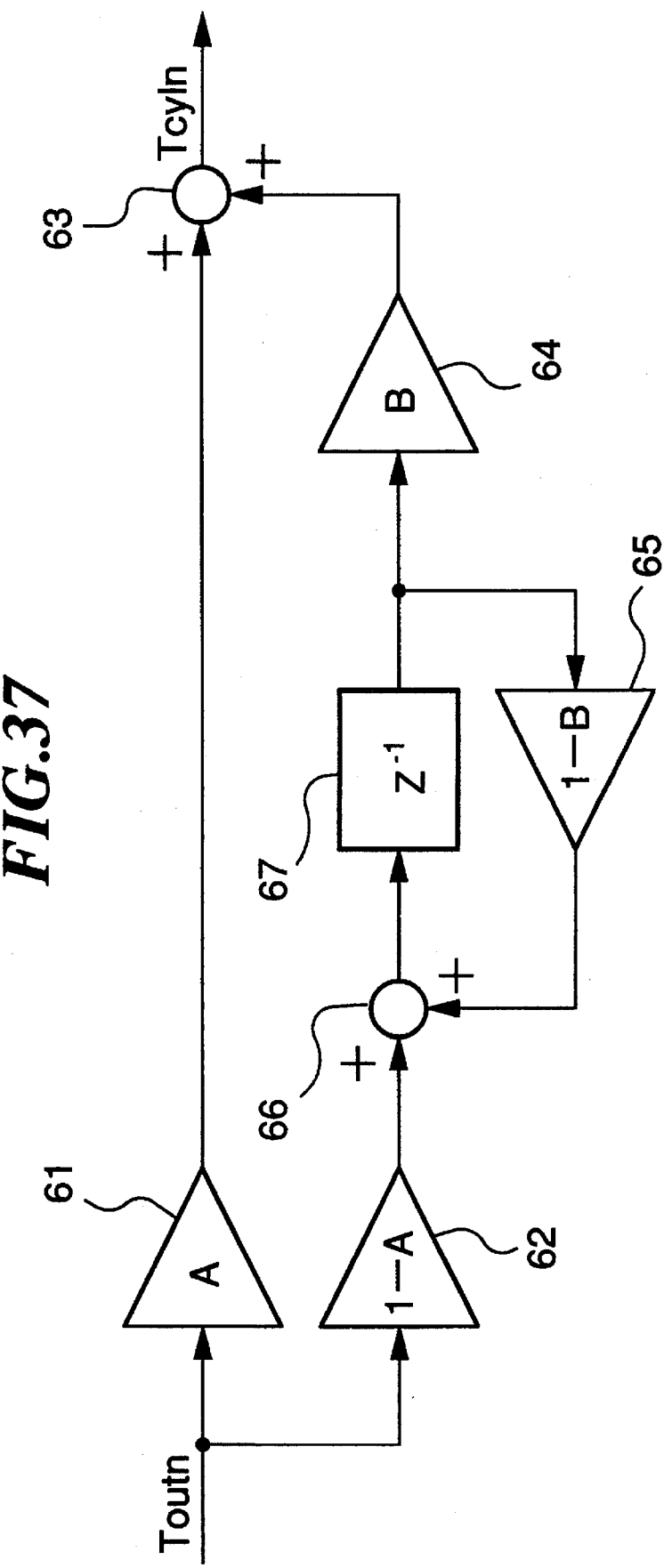
FIG. 37 is a schematic diagram showing a physical model circuit modeled on fuel transfer delay correction according to an AB method.

FIG. 37 schematically shows a physical model circuit modeled on the fuel transfer delay correction according to the second method (hereinafter referred to as "the A-B method") described above.

In the figure, a fuel injection amount Tout(n) injected from the fuel injection valve 6 in one operating cycle (n) of the engine is multiplied by the value A (direct supply ratio) at a multiplier 61, while it is multiplied by the (1−A) value at a multiplier 62. An output from the multiplier 61, i.e. a value (A×Tout(n)) in the present loop is supplied to an adder 63, where an output from a multiplier 64, i.e. a carried-off fuel amount Fwout (n) in the present loop is added to the output from the multiplier 61, to thereby obtain the required fuel amount Tcyl (n) to be applied in the present loop.

As mentioned above, in the A-B method, the carried-off amount Fwout (n) in the present loop, i.e. the output from the multiplier 64, is equal to the B×Fw(n) value out of the amount Fw(n) of adherent fuel to the wall surface at the start of the present loop, which has been accumulated up to the immediately preceding loop. The adherent fuel amount Fw(n) at the start of execution of the present loop is supplied to the multiplier 64. The adherent fuel amount Fw(n) is multiplied by the value (1−B) at a multiplier 65, and the resulting product (1−B)×Fw(n) is supplied to an adder 66.

On the other hand, an output from the multiplier 62 is equal to the additional amount Fwin, which is accordingly equal to the value obtained by the above equation (15): Fwin(n)=(1−A)×Tout(n). Further, this output is supplied to the adder 66, where the output is added to the output from the multiplier 65, i.e. the value (1−B)×Fw(n). The fuel adherent amount Fw(n) at the start of the present cycle, i.e. an input to each of the multipliers 64 and 65, is an output from a cycle delay circuit 67 which delays an input thereto by one cycle of the cylinder. Therefore, the input supplied to the cycle delay circuit 67 becomes a fuel adherent amount Fw(n+1) at the start of execution of the next cycle of the cylinder, i.e. the amount of fuel adherent to the wall surface at the end of execution of the present cycle of the cylinder.

In short, a fuel amount corresponding to a value (B×Fw(n)) is carried off the fuel adherent amount Fw(n) at the start of execution of the present loop, i.e. the adherent fuel amount accumulated up to the immediately preceding loop, as the output from the multiplier 64. A fuel amount corresponding to a value (1−B)×Fw(n) remaining adherent to the wall surface without being carried off is added to the additional amount Fwin(n) in the present loop, i.e. the output from the multiplier 62, by the adder 66.

Therefore, the adherent fuel amount Fw(n+1) at the start of the next cycle, i.e. the output from the adder 66, can be expressed by the following equation (8):

$$\begin{aligned} Fw(n+1) &= Fwin(n) + (1-B) \times Fw(n) \\ &= (1-A) \times Tout(n) + (1-B) \times Fw(n) \\ &= Fw(n) + (1-A) \times Tout(n) - B \times Fw(n) \end{aligned} \quad (22)$$

This equation (22) corresponds to the above equation (17).

In the embodiment described hereinbelow, the A-T method is employed.

Figure 38:
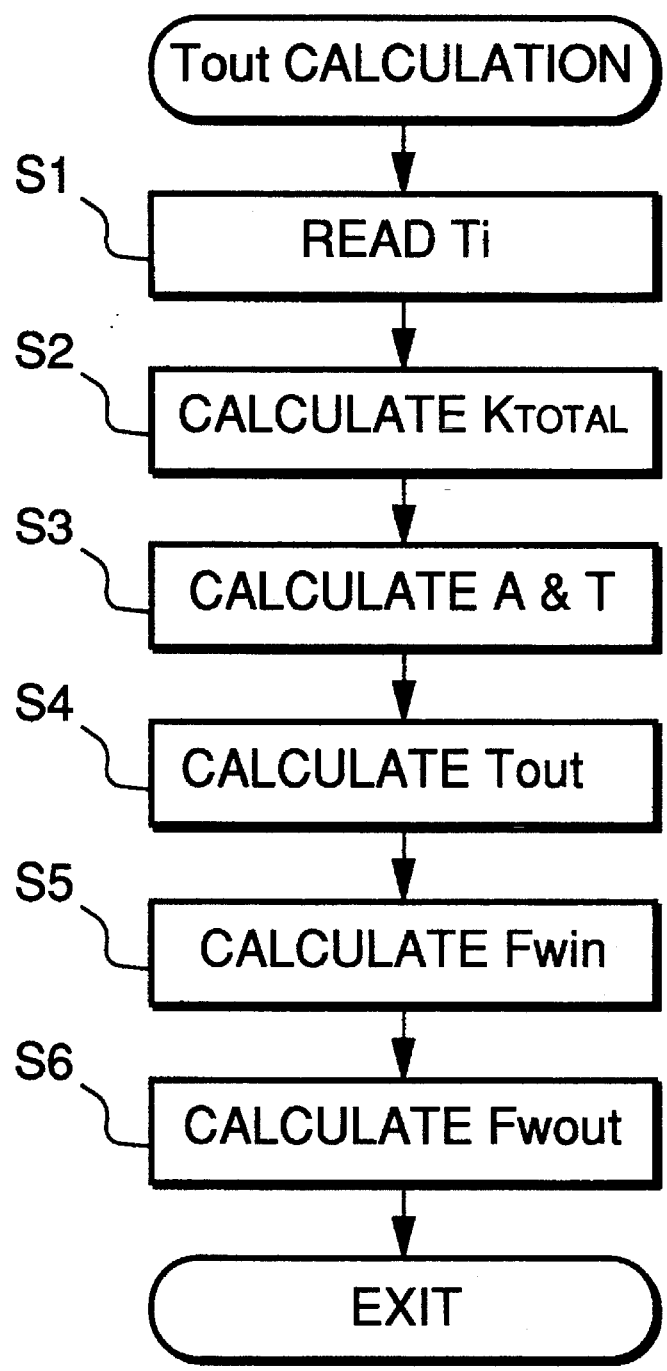
FIG. 38 is a flowchart showing a routine for calculating a fuel injection amount TOUT.

FIG. 38 shows a program for calculating the fuel injection amount Tout. This routine is executed in synchronism with generation of each TDC signal pulse. First, at a step S1, the basic value Ti of the fuel injection amount Tout is determined by retrieving a Ti map, based on the engine rotational speed NE and the intake pipe absolute pressure PBA. Then, at a step S2, the correction coefficient Ktotal is calculated by multiplying various correction coefficients, such as a correction coefficient KTW depending on the engine coolant temperature TW, a correction coefficient KAST applied immediately after the start of the engine, a correction coefficient KWOT depending on load on the engine, a mixture-leaning coefficient KLS, and a correction coefficient KTA depending on the intake air temperature. The required fuel amount Tcyl for the cylinder can be determined by multiplying the basic fuel injection amount Ti by the correction coefficient Ktotal, the correction coefficient Kp, and the air-fuel ratio correction coefficient KO2, as mentioned before.

At a step S3, the direct supply ratio A and the transfer delay time constant T are calculated. Then, the fuel injection amount Tout(n) is calculated at a step S4, by the use of the equation (14). As the carried-off amount Fwout applied in the equation (4), a value Fwout(n−1) calculated in the immediately preceding loop is used. Based on the calculated fuel injection amount Tout(n) to be applied in the present loop, the additional amount Fwin(n) and the carried-off amount Fwout(n) in the present loop are calculated by the use of the equations (15) and (16), at steps S5 and S6, respectively, which in turn will be used for calculating the fuel injection amount Tout in the next loop, followed by terminating the present routine.

[Outline of fuel supply control according to the second embodiment ]

Next, a fuel supply control system for internal combustion engines according to the second embodiment of the invention will be described.

While in the first embodiment described above, the air-fuel ratio is controlled by changing the amplitude and repetition period of the perturbation such that the O2 utilization factor O2USER is maximized (Processing 8 in FIG. 2), in the second embodiment, the air-fuel ratio is controlled by changing the delay times TDR and TDL from the time the output from the downstream O2 sensor is inverted to the time proportional control of the correction coefficient KO2 is executed, and the skip amounts (P term gains PR and PL) for skipping the correction coefficient KO2, such that the O2USER value is maximized.

Figure 39:
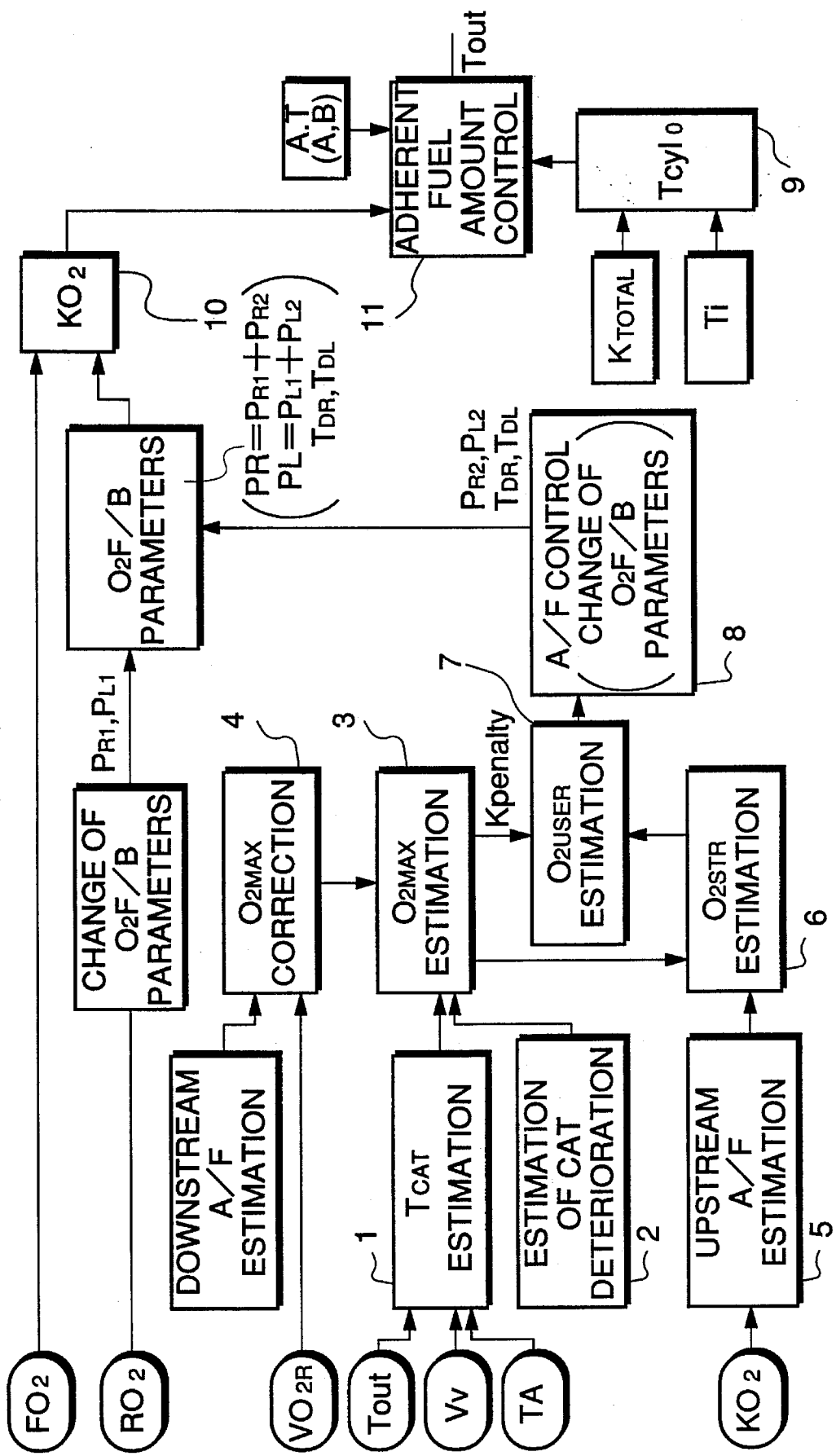
FIG. 39 is a schematic diagram showing the outline of fuel supply control according to a second embodiment of the invention.

FIG. 39 shows the outline of fuel supply control according to the second embodiment. The system employed in the present embodiment is identical in construction and arrangement with that in the first embodiment, except for the processing 8 and its related parts.

The fuel supply control system according to the second embodiment, similarly to the second embodiment, executes estimating the catalyst temperature TCAT (processing 1), estimating deterioration of the catalytic converter 14 (processing 2), estimating the maximum O2 storage amount O2MAX (processing 3), correcting the maximum O2 storage amount O2MAX (processing 4), estimating the air-fuel ratio A/F at a location upstream of the catalytic converter 14 (processing 5), estimating the O2 storage amount O2STR stored in the catalytic convener 14 (processing 6), calculating the O2 utilization factor O2USER of the catalytic converter 14 (processing 7), controlling the air-fuel ratio A/F of a mixture supplied to the engine by adjusting the F/B parameters (PR, PL, TDR, and TDL) of the correction coefficient KO2 in response to the O2 utilization amount O2USE so as to enhance the purification rate of the catalyst (processing 8), calculating the basic required fuel amount $Tcyl_0$ to be drawn into the cylinder of the engine 1 (processing 9), calculating the air fuel-ratio correction coefficient KO2 (processing 10), and calculating the fuel injection amount TOUT, based on the adherent fuel amount, described hereinafter, (processing 11).

Figure 40:
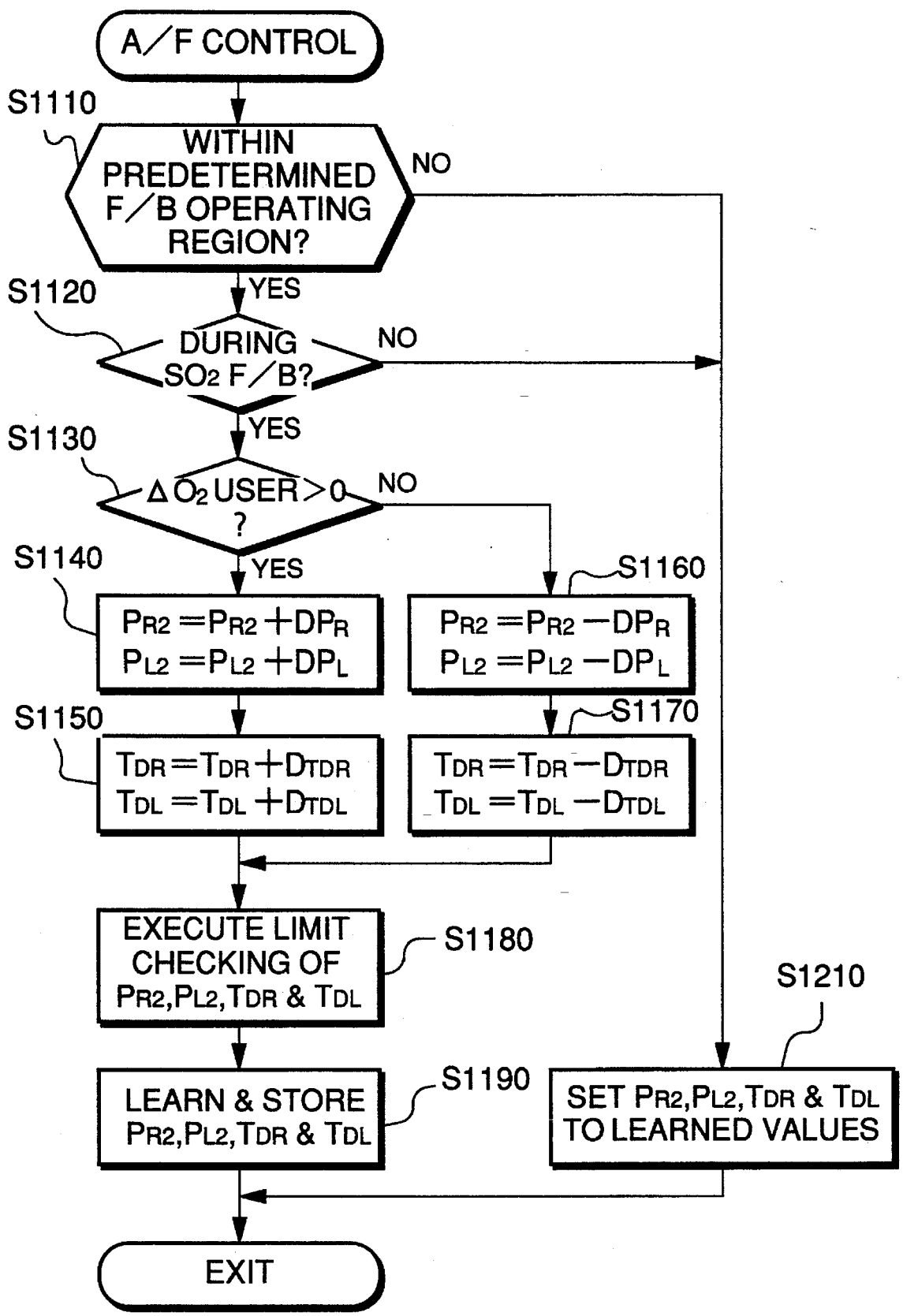
FIG. 40 is a flowchart showing a routine for controlling the air-fuel ratio, based on the O2 utilization factor O2USER, according to the second embodiment.

FIG. 40 shows a program for controlling the air-fuel ratio A/F (Processing 8) by using the O2 utilization factor O2USER, according to the second embodiment. This routine is executed at predetermined time intervals.

First, at a step S1110 it is determined whether or not the engine is operating in a predetermined air-fuel ratio feedback control region where the intake pipe absolute pressure PBA, the engine rotational speed NE, the vehicle speed VH, the throttle valve opening θ TH, etc. are within respective predetermined ranges, and at the same time the PBA value and the θTH value continue to be steady. Then, it is determined at a step S1120 whether or not the air-fuel ratio feedback control responsive to the output from the downstream O2 sensor 16 is being executed. If the answer is affirmative (YES), it is determined at a step S1130 whether the O2USER value is in the increasing direction or in the decreasing direction. If the O2USER value is in the increasing direction, the second P term gains PR2 and PL2 are increased by adding predetermined values DPR and DPL to the immediately preceding values of the second P term gains PR2 and PL2, respectively, at a step S1140, and then the enriching and leaning inversion delay times TDR and TDL are increased by adding predetermined values DTDR and DTDL to the immediately preceding values of the delay times TDR and TDL, respectively, at a step S1150. Increases in the second enriching and leaning P term gains PR2 and PL2, and increases in the enriching and leaning inversion delay times TDR and TDL correspond to increases in the amplitude Kpert and the repetition period (tpertR+tpertL) of the A/F perturbation according to the first embodiment. On the other hand, if the O2USER value is in the decreasing direction, the second enriching and leaning P term gains PR2 and PL2 are decreased by subtracting the DPR and DPL values from the immediately preceding values, respectively, at a step S1160, and then the enriching and leaning inversion delay times TDR and TDL are decreased by subtracting the DTDR and DTDL values from the immediately preceding values, respectively, at a step S1170.

Next, it is determined at a step S1180 whether or not the second P term gains PR2 and PL2, and the delay times TDR and TDL exceed respective limit values, and if any of the values exceeds the corresponding limit value, limit checking thereof is carried out. Then, at a step S1190 learned values of the second P term gains PR2 and PL2, and the delay times TDR and TDL are calculated and stored.

On the other hand, if the engine is not in the F/B control region at the step S1110, or if the air-fuel ratio F/B control responsive to the output from the downstream O2 sensor 16 is not being executed at the step S1120, the second P term gains PR2 and PL2 and the delay times TDR and TDL are set to the learned values calculated up to the last loop, at a step S1210.

The air-fuel ratio correction coefficient KO2 is calculated based on the second P term gains PR2 and PL2 and the delay times TDR and TDL obtained as above, in a manner similar to the first embodiment in the processing 10. The correction coefficient KO2 thus calculated is used in the processing 9 to correct the basic required fuel amount $Tcyl_0$ (=TixKTOTAL) to obtain the required fuel amount Tcyl by the following equation (23):

$$Tcyl = Ti \times KTOTAL \times KO2 \quad \quad (23)$$

As described hereinabove, according to the second embodiment, the purification rate of the catalytic converter 14 can be enhanced by adjusting the parameters (PR, PL, TDR and TDL) of the correction coefficient KO2 according to the physical model on the catalytic converter 14 such that the O2 utilization factor O2USER becomes the maximum. Besides, also in the second embodiment, the fuel supply control based on the adherent fuel amount can be carried out in the processing 11 in a similar manner to the afore-described first embodiment, i.e. according to the physical models which contemplate the characteristics of fuel adhering to the wall surface of the intake pipe, to realize the optimum fuel supply, and hence remarkably improve exhaust emission characteristics of the engine.

What is claimed is:

1. A fuel supply control system for an internal combustion engine having an exhaust system, and a catalytic converter arranged in said exhaust system, comprising:

oxygen storage amount-estimating means for estimating a storage amount of oxygen stored in said catalytic converter;

physical amount-calculating means for calculating a physical amount having correlation with a purification rate of said catalytic converter, based on said storage amount of oxygen estimated by said oxygen storage amount-estimating means;

air-fuel ratio control means for controlling an air-fuel ratio of an air-fuel mixture to be supplied to said engine, based on said physical amount calculated by said physical amount-calculating means; and maximum oxygen storage amount-calculating means for calculating a maximum oxygen storage amount which can be stored in said catalytic converter, and wherein said physical amount-calculating means corrects said physical amount in a direction corresponding to a decrease of said purification rate of said catalytic converter when at least one of conditions are satisfied that said storage amount of oxygen stored in said catalytic converter exceeds a first predetermined amount which is close to said maximum oxygen storage amount of said catalytic converter, and that said storage amount of oxygen is below a second predetermined amount which is close to zero.

2. A fuel supply control system as claimed in claim 1, wherein said physical amount having correlation with said purification rate of said catalytic converter is a variation amount in said storage amount of oxygen stored in said catalytic converter per a predetermined unit time period.

3. A fuel supply control system as claimed in claim 1, wherein said maximum oxygen storage amount-calculating means calculates said maximum oxygen storage amount, based on a volumetric size, a temperature, and a deterioration degree of said catalytic converter.

4. A fuel supply control system as claimed in claim 1, wherein said oxygen storage amount-estimating means estimates a present value of said storage amount of oxygen according to a physical model based on an air-fuel ratio of exhaust gases emitted from said engine and a last value of said storage amount of oxygen estimated.

5. A fuel supply control system as claimed in claim 4, wherein said oxygen storage amount-estimating means estimates said present value of said storage amount of oxygen by determining said variation amount in said storage amount of oxygen, based on said air-fuel ratio of exhaust gases emitted from said engine at an entrance of said catalytic converter, and adding the determined variation amount to said last value of said storage amount of oxygen estimated.

6. A fuel supply control system as claimed in claim 4, including downstream air-fuel ratio-detecting means arranged in said exhaust system of said engine at a location downstream of said catalytic converter, air-fuel ratio feedback control amount-calculating means for calculating an air-fuel ratio feedback control amount for controlling said air-fuel ratio of said mixture in response to an output from said downstream air-fuel ratio-detecting means, and air-fuel ratio-calculating means for calculating said air-fuel ratio of said exhaust gases, based on a deviation amount of the calculated air-fuel ratio feedback control amount from a central value thereof.

7. A fuel supply control system as claimed in claim 1, including upstream air-fuel ratio-detecting means arranged in said exhaust system of said engine at a location upstream of said catalytic converter, and air-fuel ratio feedback control amount-calculating means for calculating an air-fuel ratio feedback control amount for controlling said air-fuel ratio of said mixture in response to an output from said upstream air-fuel ratio-detecting means, and wherein said air-fuel ratio control means carries out proportional control by using the calculated air-fuel ratio feedback control amount when a predetermined delay time period has elapsed from the time said output from said upstream air-fuel ratio-detecting means was inverted, said air-fuel ratio control means setting said predetermined delay time period, based on said physical amount calculated by said physical amount-calculating means.

8. A fuel supply control system as claimed in claim 7, wherein said air-fuel ratio control means determines a variation amount in said storage amount of oxygen stored in said catalytic converter per a predetermined unit time period as said physical amount having correlation with said purification rate of said catalytic converter, determines an oxygen utilization factor of said catalytic converter, based on the determined variation amount in said storage amount of oxygen, and sets said predetermined delay time period according to the determined variation amount in said oxygen utilization factor.

9. A fuel supply control system as claimed in claim 1, including upstream air-fuel ratio-detecting means arranged in said exhaust system of said engine at a location upstream of said catalytic converter, and air-fuel ratio feedback control amount-calculating means for calculating an air-fuel ratio feedback control amount for controlling said air-fuel ratio of said mixture in response to said output from said upstream air-fuel ratio-detecting means, and wherein said air-fuel ratio control means stepwise changes said air-fuel ratio feedback control amount by a predetermined skip amount when said output from said upstream air-fuel ratio-detecting means has been inverted, said air-fuel ratio control means setting said skip amount, based on said physical amount calculated by said physical amount-calculating means.

10. A fuel supply control system as claimed in claim 9, wherein said air-fuel ratio control means determines said variation amount in said storage amount of oxygen stored in said catalytic converter per a predetermined unit time period as said physical amount having correlation with said purification rate of said catalytic converter, determines an oxygen utilization factor of said catalytic converter, based on the determined variation amount in said storage amount of oxygen, and sets said skip amount according to the determined variation amount in said oxygen utilization factor.

11. A fuel supply control system as claimed in claim 1, including air-fuel ratio forcedly-oscillating means for forcedly oscillating said air-fuel ratio of said mixture with a predetermined repetition period and a predetermined amplitude, and wherein said air-fuel ratio control means sets at least one of said predetermined repetition period and said predetermined amplitude, based on said physical amount calculated by said physical amount-calculating mean.

12. A fuel supply control system as claimed in claim 11, wherein said air-fuel ratio control means determines a variation amount in said storage amount of oxygen stored in said catalytic converter per a predetermined unit time period as said physical amount having correlation with said purification rate of said catalytic converter, determines an oxygen utilization factor of said catalytic converter, based on the determined variation amount in said storage amount of oxygen, and sets said at least one of said predetermined repetition period and said predetermined amplitude according to the determined variation amount in said oxygen utilization factor.

13. A fuel supply control system as claimed in any of claims 1 to 12, wherein said engine includes intake passage having an inner wall surface, and at least one combustion chamber, said fuel supply control system including fuel amount-calculating means for constructing a physical model, based on a first fuel amount which is directly drawn into each of said at least one combustion chamber out of a fuel amount injected into said intake passage, and a second fuel amount which adheres to said inner wall surface of said intake passage and then evaporates to be drawn into said each of said at least one combustion chamber, and for determining a fuel amount to be injected into said intake passage, based on parameters representative of fuel adherence characteristics of fuel according to said physical model constructed.

* * * * *